(12) United States Patent
Ogino

(10) Patent No.: US 7,502,555 B2
(45) Date of Patent: Mar. 10, 2009

(54) INFORMATION TERMINAL DEVICE

(75) Inventor: Takumichi Ogino, Tokyo (JP)

(73) Assignee: Olympus Corporation, Tokyo (JP)

( * ) Notice: Subject to any disclaimer, the term of this patent is extended or adjusted under 35 U.S.C. 154(b) by 535 days.

(21) Appl. No.: 11/237,629

(22) Filed: Sep. 28, 2005

(65) Prior Publication Data

US 2006/0133788 A1    Jun. 22, 2006

(30) Foreign Application Priority Data

Sep. 30, 2004    (JP) .............................. 2004-286967

(51) Int. Cl.
  *G03B 17/00* (2006.01)
  *G03B 17/48* (2006.01)
(52) U.S. Cl. ........................................ 396/56; 396/429
(58) Field of Classification Search .................... 396/56, 396/57, 429; 348/207.1, 222.1, 231.99, 231.3
See application file for complete search history.

(56) References Cited

U.S. PATENT DOCUMENTS 5,737,491 A * 4/1998 Allen et al. .................. 704/270
6,628,899 B1   9/2003 Kito
7,275,043 B2 * 9/2007 Kinjo ........................... 705/26
7,289,236 B2 * 10/2007 Tanaka et al. ............... 358/1.15
7,327,387 B2 * 2/2008 Tanaka et al. ........... 348/207.99
2005/0243189 A1 * 11/2005 Parulski et al. ........... 348/231.3
2005/0249486 A1 * 11/2005 Murray ........................ 396/56

FOREIGN PATENT DOCUMENTS

| JP | 2000-184353 | 6/2000 |
| JP | 2000-209542 | 7/2000 |
| JP | 2001-177750 | 6/2001 |
| JP | 2001-186459 | 7/2001 |
| JP | 2003-018070 | 1/2003 |

* cited by examiner

*Primary Examiner*—Rodney E Fuller
(74) *Attorney, Agent, or Firm*—Straub and Pokotylo; John C. Pokotylo

(57) ABSTRACT

This is an information terminal device for receiving signals transmitted by a camera device. The device comprises information memory for storing information, a receiving unit for receiving a signal wirelessly transmitted by the camera device and a transmitting unit for attaching the information stored in the information memory to image data included in the signal received by the receiving unit and transmitting the image data with the information attached, to a prescribed address.

18 Claims, 33 Drawing Sheets

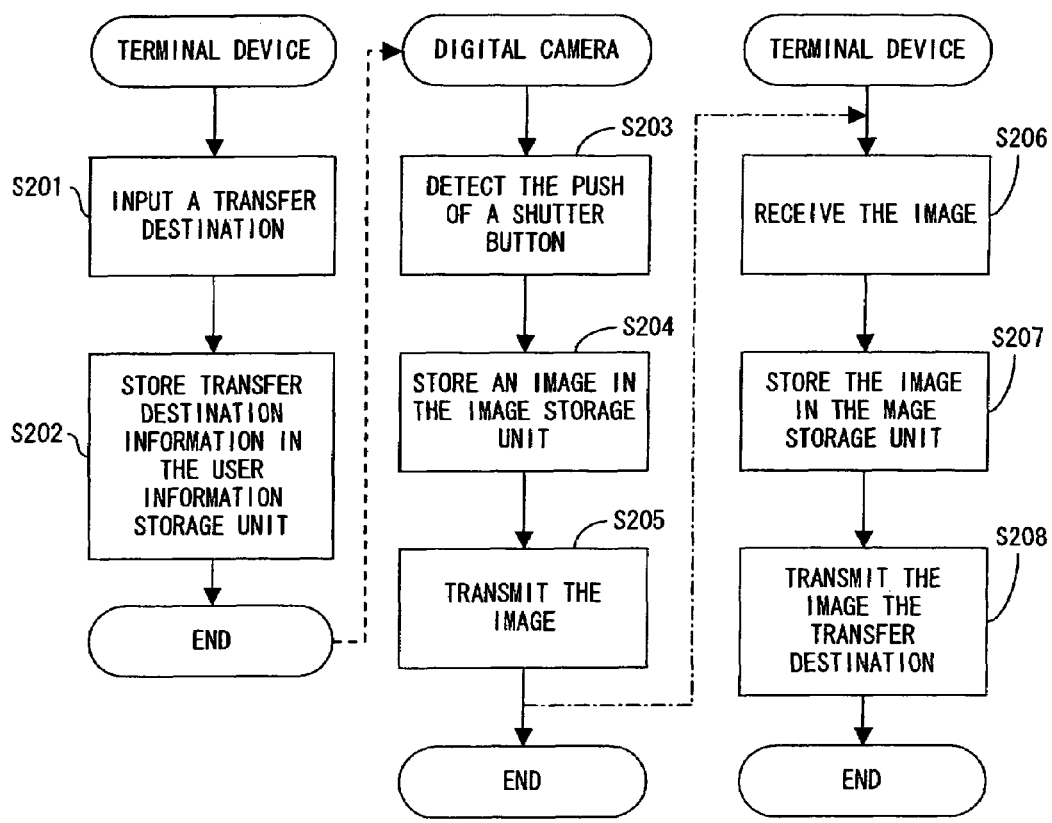
F I G. 2

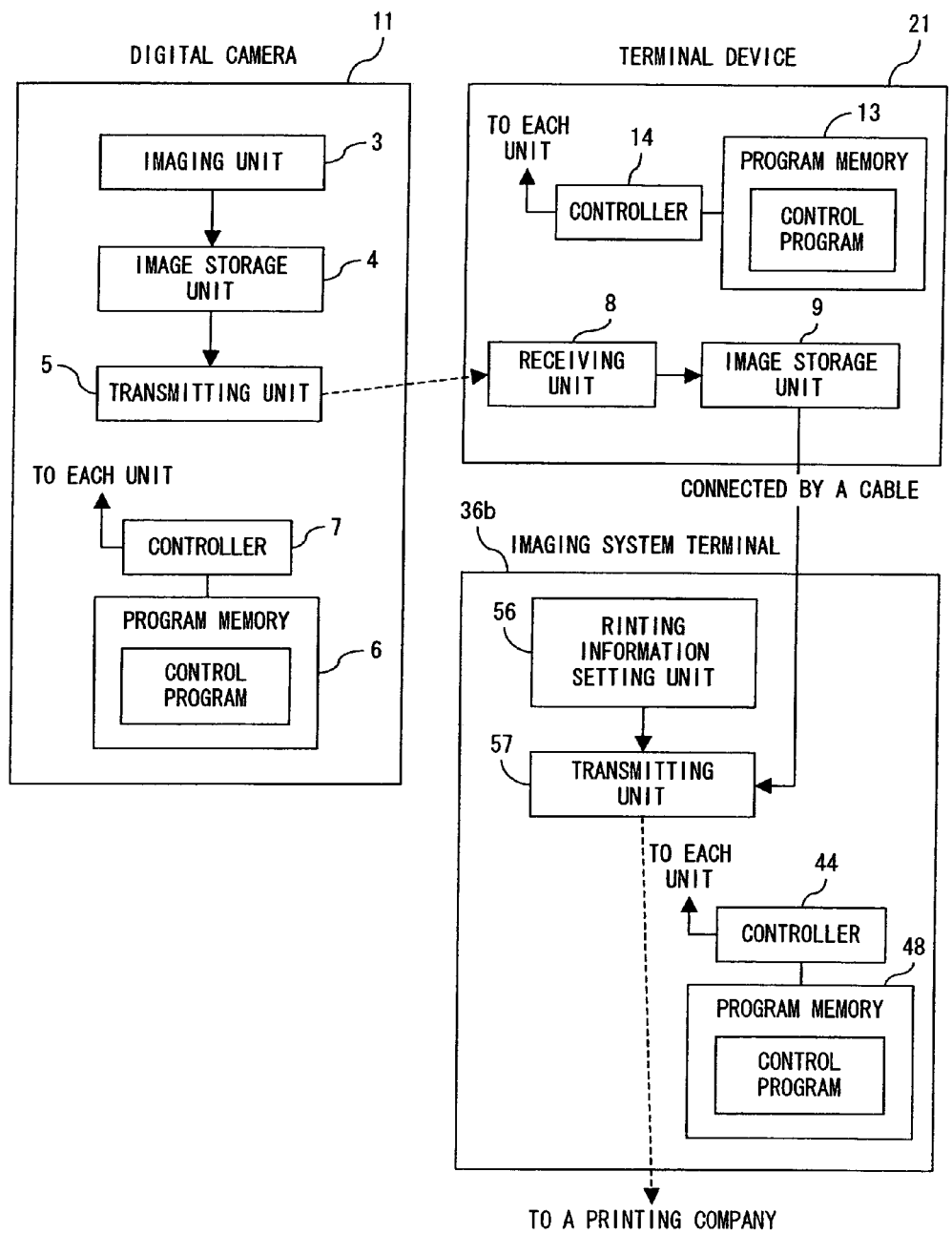
F I G. 26

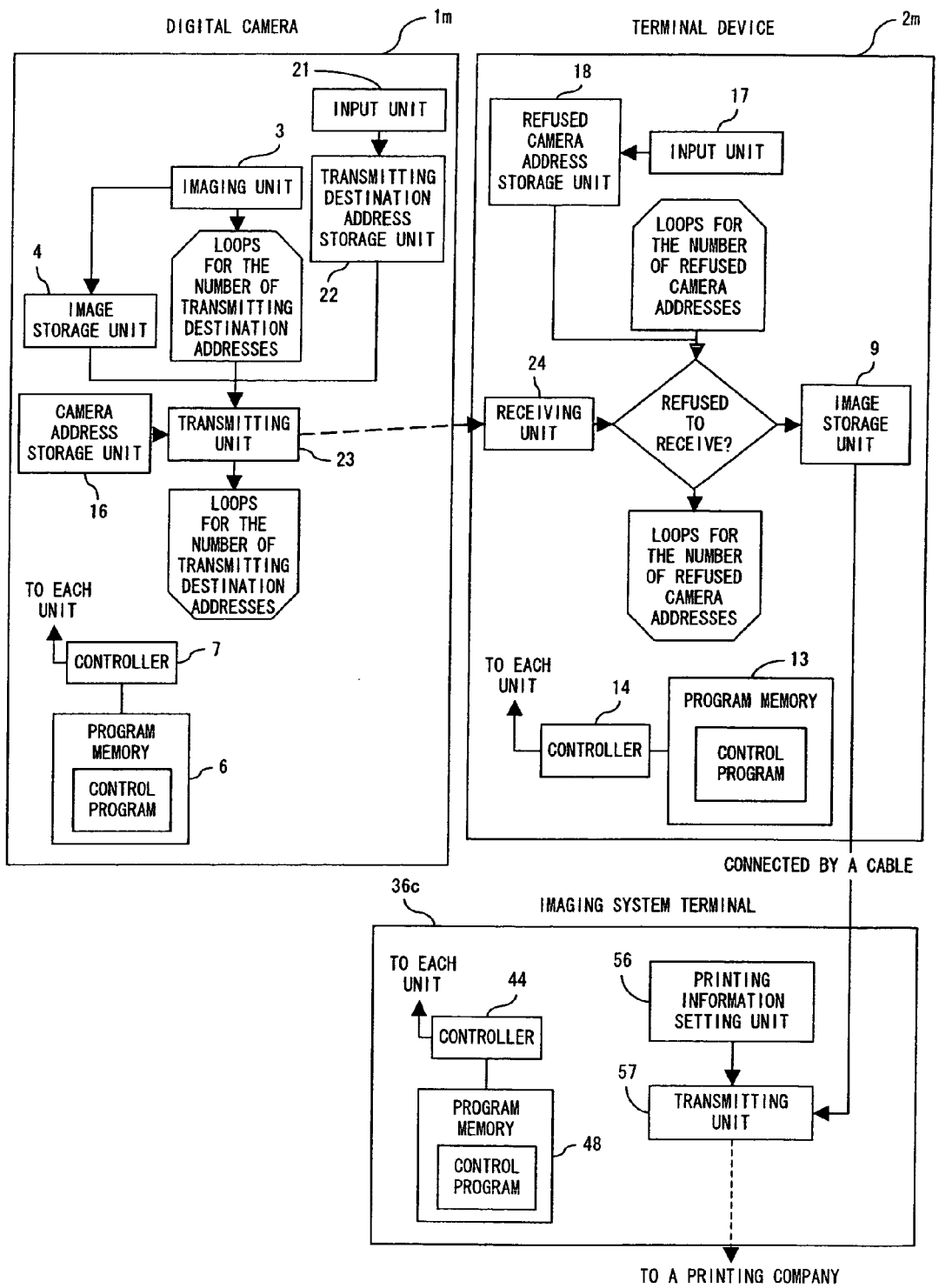
F I G. 28

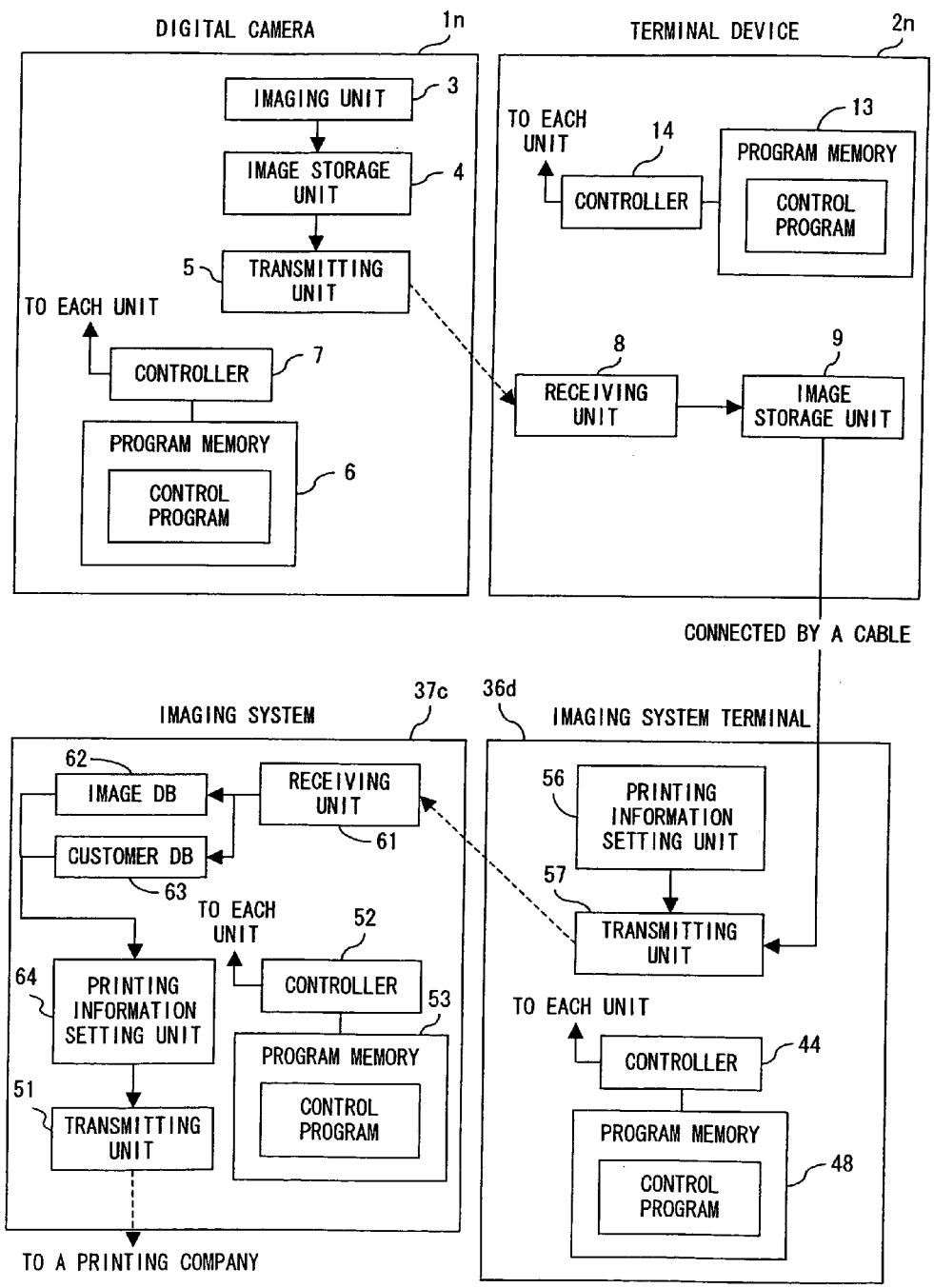
F I G. 30

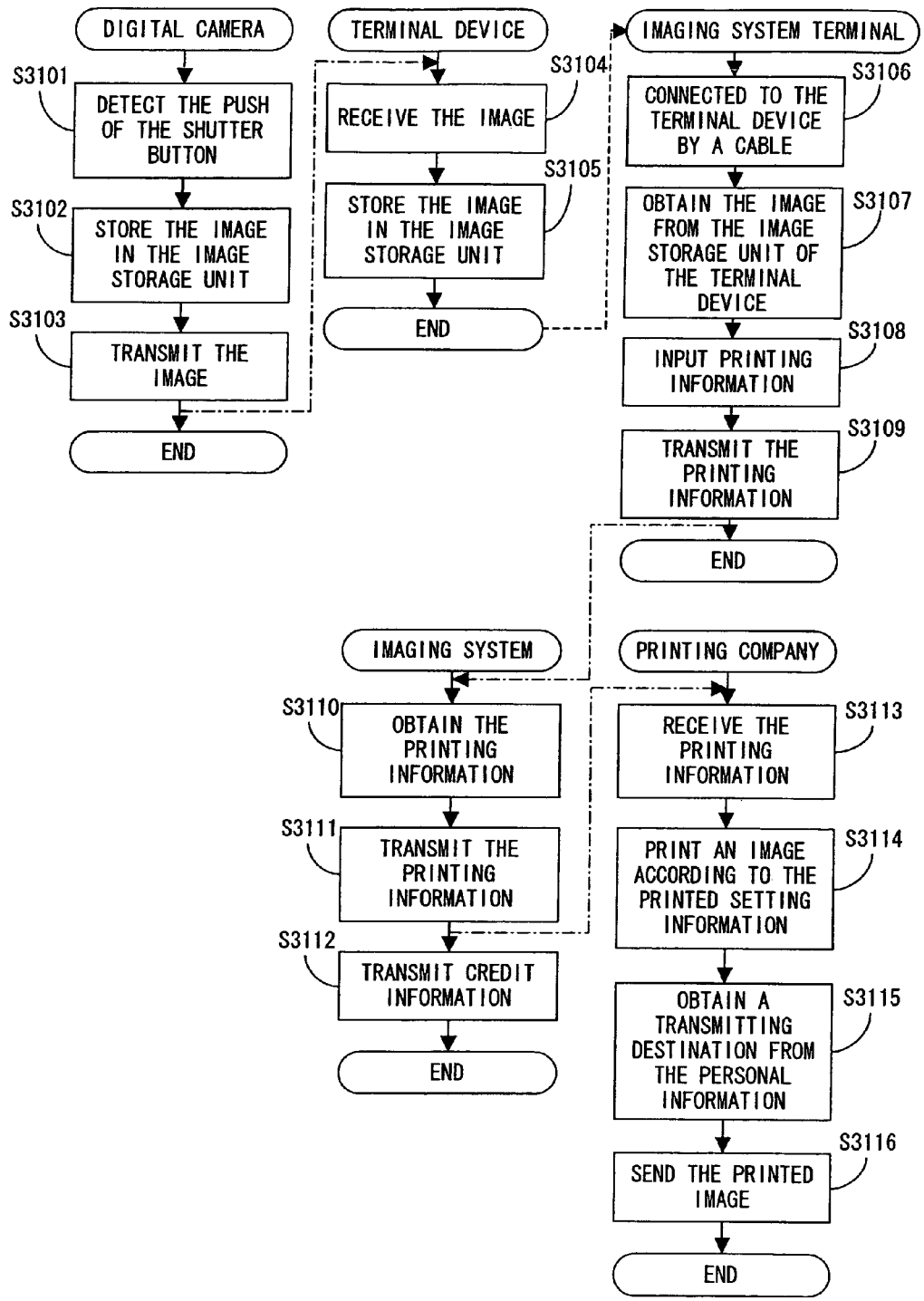
F I G. 3 1

INFORMATION TERMINAL DEVICE

CROSS REFERENCE TO REFERENCE APPLICATIONS

This application is based upon and claims the benefit of priority from the prior Japanese Patent Application No. 2004-286967, filed Sep. 30, 2004, the entire contents of which are incorporated herein by reference.

BACKGROUND OF THE INVENTION

1. Field of the Invention

The present invention relates to a technology applied to an information terminal device for receiving and transmitting data from and to another device and an information system including the information device.

2. Description of the Related Art

Traditionally, in pleasure resorts, such as the sea, mountains, etc., tourist resorts, recreation grounds, theme parks and the like, souvenir pictures are taken in a variety of forms using persons as an object. For example, their images are taken by each other among friends, acquaintances or the like, images are taken using a tripod, the souvenir picture service of a professional photographer is used, another person that happens to be there is requested to take a person's image using his/her camera and so on.

In theme parks or the like, souvenir pictures are also taken using a camera system installed in the main point of an attraction. This camera system can automatically take images when a vehicle approaches and print an image desired by a user (a taken image) at the exit of the attraction. An image shooting system in which each user's images taken thus at each attraction can be collectively stored in a server and his/her images stored in the server can be printed or a storage medium which records the images can be outputted by the user giving a variety of instructions via an image processing system installed in the center later is also proposed (for example, see U.S. Pat. No. 6,628,899).

SUMMARY OF THE INVENTION

The first aspect of the present invention is an information terminal device for receiving signals transmitted by a camera device. The information terminal device comprises information memory for storing information, a receiving unit for receiving signals wirelessly transmitted by the camera device and a transmitting unit for attaching information stored in the information memory to image data included in the signal received by the receiving unit and transmitting the image data with the information attached, to a prescribed address.

The second aspect of the present invention is an information system including a camera device and an information terminal device. The camera device comprises an imaging unit for imaging an object to obtain its image data and a first transmitting unit for wirelessly transmitting a signal including the image data obtained by the imaging unit. The information terminal device comprises information memory for storing information, a receiving unit for receiving the signal wirelessly transmitted by the first transmitting unit of the camera device and a second transmitting unit for attaching the information stored in the information memory to the image data included in the signal received by the receiving unit and transmitting the image data with the information attached, to a prescribed address.

The third aspect of the present invention is a method by which an information terminal device receives image data transmitted by a camera device and processes the received image data. The information terminal device stores information and its address in information memory, attaches the information stored in the information memory to the received image data and transmits the image data with the information attached, to a prescribed address.

BRIEF DESCRIPTION OF THE DRAWINGS

FIG. 2 is a flowchart showing the operations of the digital camera and portable information terminal device of the first preferred embodiment.

FIG. 26 shows an example of the configurations of the digital camera, portable information terminal device and imaging system terminal device which are included in the information system of the thirteenth preferred embodiment.

FIG. 28 shows an example of the configurations of the digital camera, portable information terminal device and imaging system terminal device which are included in the information system of the fourteenth preferred embodiment.

FIG. 30 shows an example of the configurations of the digital camera, portable information terminal device, imaging system terminal device and an imaging system which are included in the information system of the fifteenth preferred embodiment.

FIG. 31 is a flowchart showing the operations of the digital camera, portable information terminal device, imaging system terminal device and imaging system of the fifteenth preferred embodiment.

DESCRIPTION OF THE PREFERRED EMBODIMENTS

The preferred embodiments of the present invention are described below with reference to the drawings.

Figure 1:
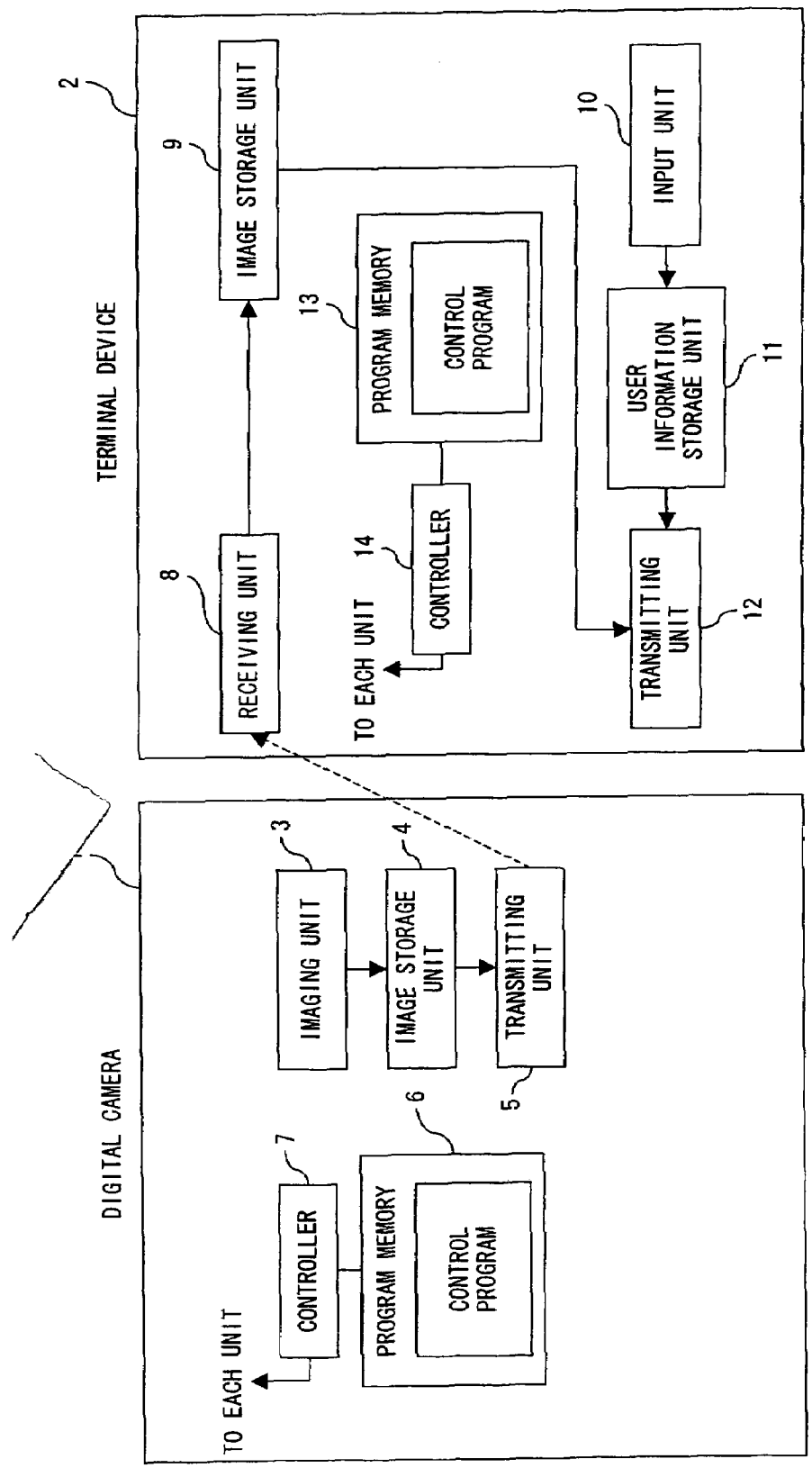
FIG. 1 shows an example of the configurations of a digital camera and a portable information terminal device which are included in the information system of the first preferred embodiment.

FIG. 1 shows an example of the configurations of a digital camera and a portable information terminal device (hereinafter also simply called "terminal device") which are included in the information system of the first preferred embodiment.

The digital camera 1 has a function to wirelessly transmit information, such as shooting image data (the image data of a still image and a moving image) or the like. The digital camera 1 comprises an imaging unit 3 for imaging an object and obtaining image data by pushing a shutter button, which is not shown in FIG. 1, for instructing the start of shooting, an image storage unit 4 for storing the image data obtained by the imaging unit 3, a transmitting unit 5 for wirelessly transmitting a signal including the image data stored in the image storage unit 4, program memory 6 for storing a control program for controlling the operation of the digital camera 1, a controller (CPU) 7 for controlling the operation of the entire digital camera 1 by reading and executing the control program stored in the program memory 6 and the like.

The terminal device 2 is small and has a function to receive a signal wirelessly transmitted from a specific direction and to transmit information included in the signal (image data in this example) to a specific transfer destination. The terminal device 2 can be attached to clothes or the like of a user like a so-called badge taking its portability into consideration. This terminal device 2 comprises a receiving unit 8 having a directivity for receiving signals wirelessly transmitted from a specific direction, an image storage unit 9 for storing image data included in the signal received by the receiving unit 8, an input unit 10 for inputting its transfer destination information according to a user's transfer destination input instruction, a user information storage unit 11 for storing the transfer destination information inputted by the input unit 10, a transmitting unit 12 for transmitting a signal including the image data stored in the image storage unit 9 to the transfer destination of the transfer destination information stored in the user information storage unit 11, program memory 13 for storing a control program (including an information transfer program) for controlling the operation of the terminal device 2, a controller (CPU) 14 for controlling the operation of the entire terminal device 2 by reading and executing the control program stored in the program memory 13 and the like.

The transmitting unit 5 of the digital camera 1 wirelessly transmits a signal using an electro-magnetic wave, an infrared ray, a ultrasonic wave or the like, and the receiving unit 8 of the terminal device 2 receives the signal put on an electro-magnetic wave, an infrared ray, a ultrasonic wave or the like.

The transfer destination information includes information about the electronic mail address of a user, information about the phone number of a cellular phone or a PHS and the like.

In the terminal device 2, no image storage unit 9 can also be provided and the image data included in the signal received by the receiving unit 8 can also be directly transmitted to the transmitting unit 12.

Next, the respective operations of the digital camera 1 and terminal device 2 are described below.

In this example, a shooter shoots a person that has the terminal device 2 being an object, using the digital camera 1

(souvenir picture). However, it is assumed that the person being an object carries the terminal device 2, for example, attaching it to the breast of his/her clothes, in such a way that the (directivity of) receiving unit 8 of the terminal device 2 can be directed to the digital camera 1.

FIG. 2 is a flowchart showing the operations of the digital camera 1 and terminal device 2 in such a case.

In FIG. 2, processes in S201 and S202 and S206 through S208 show the operations of the terminal device 2, and those in S203 through S205 show the operations of the digital camera 1.

Firstly, the processes in S201 and S202 of the terminal device 2, which are the processes of inputting a transfer destination to the terminal device 2, are performed. In S201, one or more pieces of transfer destination information is inputted by the input unit 10 according to the instruction to input one or more desired transfer destinations of the user (object) of the terminal device 2. In S202, the one or more pieces of transfer destination information inputted in S201 are stored in the user information storage unit 11.

Then, the processes in S203 through S205 of the digital camera 1 and those in S206 through S208 of the terminal device 2, in which a shooter shoots a person being an object, are performed.

Firstly, in the digital camera 1, in S203, the shooter's press of the shutter button is detected and the imaging unit 3 images the object. In S204, the image data obtained in S203 is stored in the image storage unit 4. In S205, the transmitting unit 5 wirelessly transmits a signal including the image data stored in S204. Thus, when the shutter button is pressed, an object is shot and image data obtained by the shooting is wirelessly transmitted.

Then, in the terminal device 2, in S206, the receiving unit 8 receives the signal including the image data wirelessly transmitted by the transmitting unit 5 of the digital camera 1.

As described earlier, since when shooting, the directivity of the receiving unit 8 is directed to the digital camera 1, the receiving unit 8 can receive the signal transmitted from the digital camera 1. Then, in S207, the image data included in the signal received in S206 is stored in the image storage unit 9. In S208, the signal including the image data stored in S207 is transmitted to the one or more transfer destinations of the one or more pieces of transfer destination information stored in the user information storage unit 11 in S202.

Thus, if an object is shot in the state where the directivity of the receiving unit 8 of the terminal device 2 is directed to the digital camera 1, image data obtained by the shooting is automatically transmitted from the digital camera 1 to a desired transfer destination registered in the terminal device 2 via the terminal device 2.

As described above, according to the information system of the first preferred embodiment, a shooter can easily transfer shooting image data to a person being an object without any special work.

Next, the information system including the digital camera and portable information terminal device in the second preferred embodiment of the present invention is described. The information system of this preferred embodiment is further configured so that the terminal device can receive no image data transmitted by a specific digital camera in addition to the configuration of the information system of the first preferred embodiment (see FIG. 1).

Figure 3:
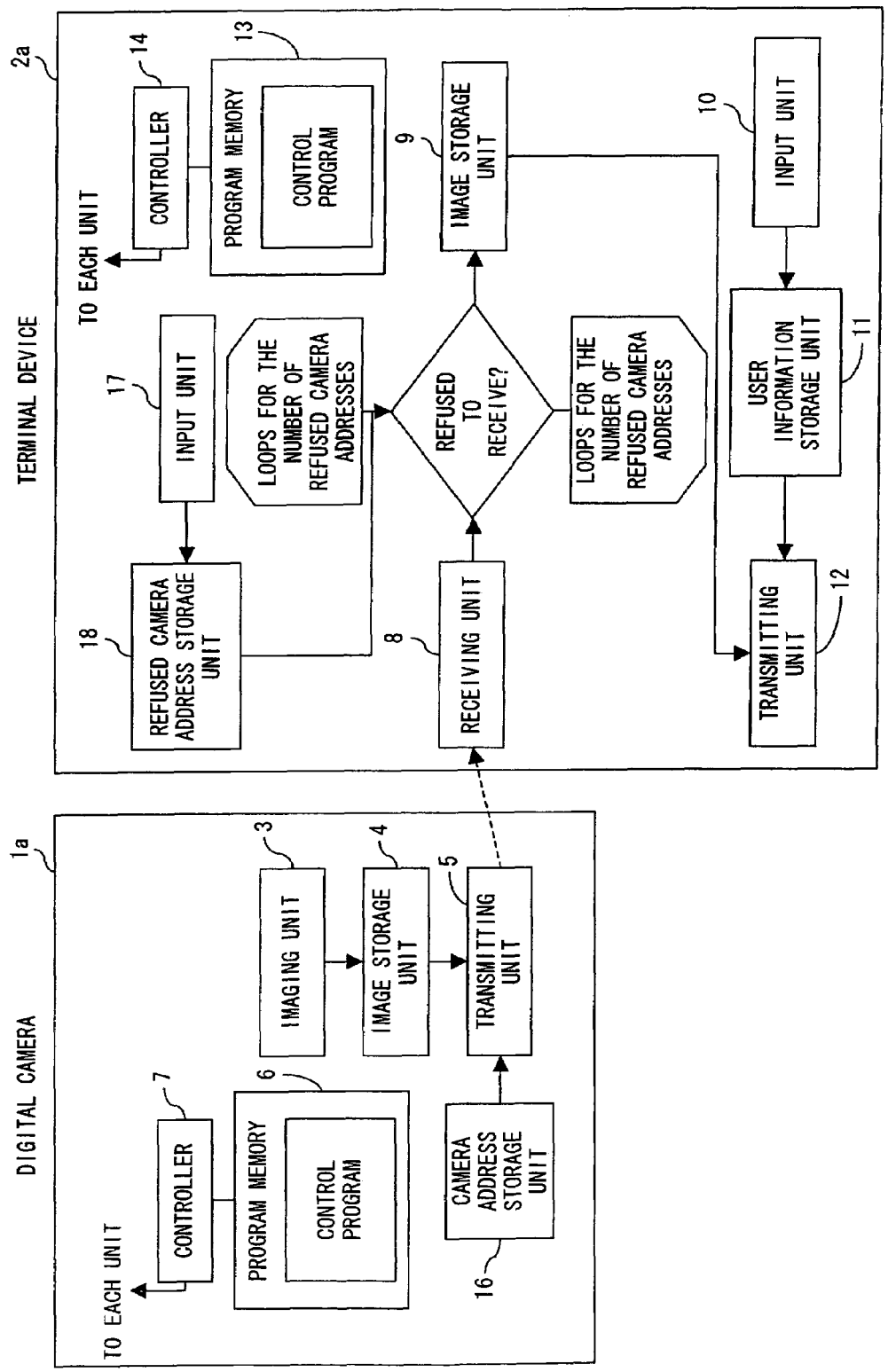
FIG. 3 shows an example of the configurations of the digital camera and portable information terminal device which are included in the information system of the second preferred embodiment.

FIG. 3 shows an example of the configurations of a digital camera and a terminal device which are included in the information system of the second preferred embodiment.

In FIG. 3, a digital camera 1a differs from the digital camera 1 (see FIG. 1) of the first preferred embodiment only in that it further comprises a camera address storage unit 16 for storing information about the camera address (camera address information) of the digital camera 1a. However, in the digital camera 1a, the transmitting unit 5 transmits a signal including the image data stored in the image storage unit 4 and the camera address information stored in the camera address storage unit 16.

The terminal device 2a differs from the terminal device 2 of the first preferred embodiment only in that it further comprises an input unit 17 for inputting the refused camera address information about a refused camera address according to a user's refused camera address input instruction and a refused camera address storage unit 18 for storing the refused camera address information inputted by the input unit 17. However, if camera address information included in a signal coincides with none of the refused camera address information stored in the refused camera address storage unit 18, the terminal device 2a permits to receive the signal and stores the image data included in the signal in the image storage unit 9. Alternatively, if the camera address information coincides with one piece of the refused camera address information stored in the refused camera address storage unit 18, it can refuse to receive the signal and cannot store the image data included in the signal in the image storage unit 9.

Next, the operations of the digital camera 1a and terminal device 2a are described below.

In this example, as in the first preferred embodiment, a shooter shoots a person that carries the terminal device 2a being an object, using the digital camera 1a (souvenir picture).

Figure 4:
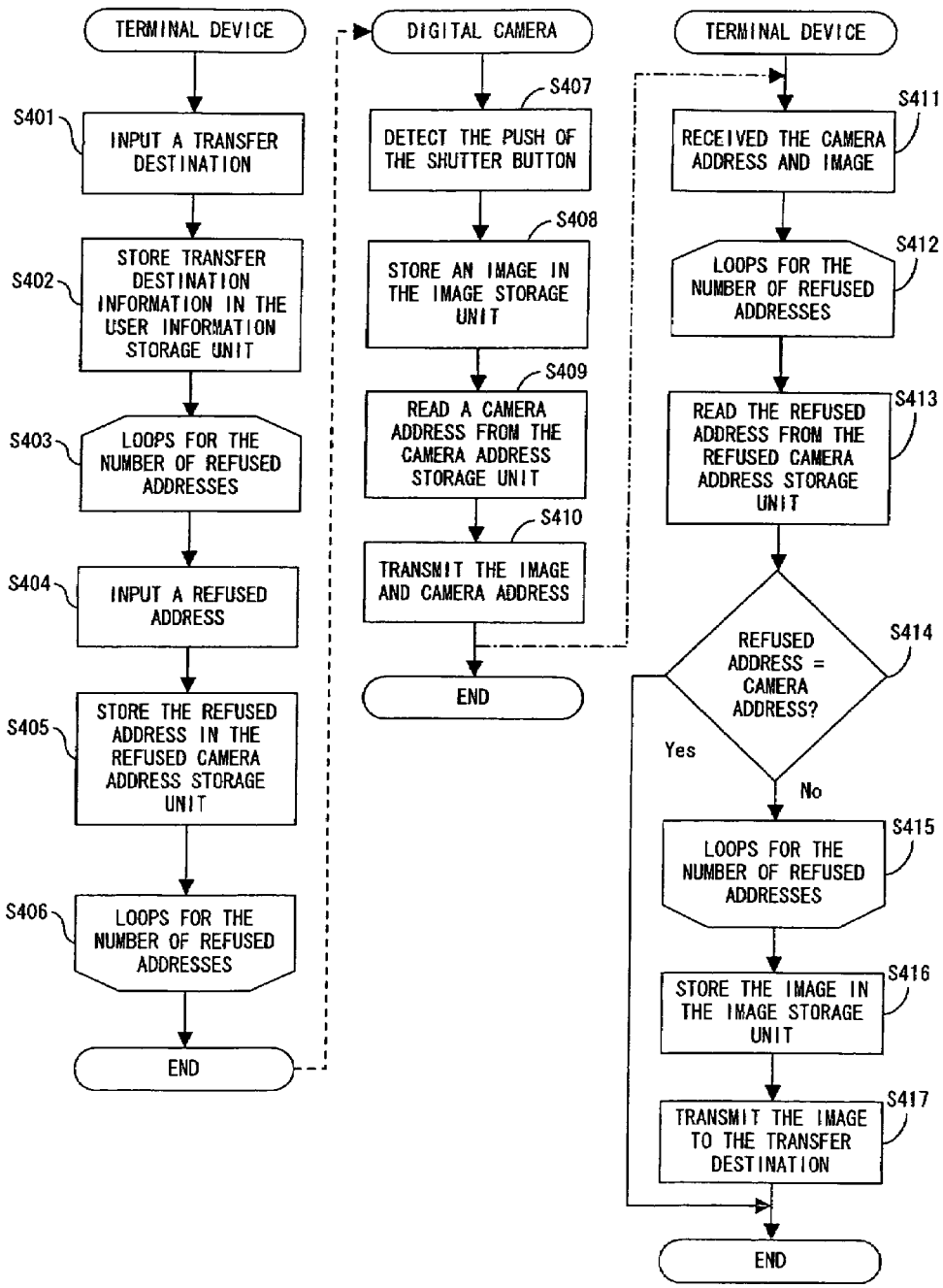
FIG. 4 is a flowchart showing the operations of the digital camera and portable information terminal device of the second preferred embodiment.

FIG. 4 is a flowchart showing the operations of the digital camera 1a and terminal device 2a in such a case.

In FIG. 4, processes in S401 through S406 and S411 through S417 are the operations of the terminal device 2a, and those in S407 through S410 are the operations of the digital camera 1a.

Firstly, the processes in S401 through S406 of the terminal device 2a, in which transfer destinations and refuse camera addresses are inputted to the terminal device 2a, are performed. In S401 and 402, the same processes as in S201 and S202 of FIG. 2 are performed. In the S403 through S406, the processes in S404 and S405 are repeated as requested. Specifically, every time a user instructs to input one refused camera address, camera address information about the refused camera address is inputted by the input unit 17 (S404) and the camera address information is stored in the refused camera address storage unit 18 (S405).

Then, the processes in S407 through S410 of the digital camera 1a and those in S411 through S417 of the terminal device 2a, in which a shooter shoots a person being an object, are performed.

Firstly, in the digital camera 1a, in S407 and S408, the same processes as in S203 and S204 of FIG. 2 are performed. In S409, the camera address information is read from the camera address storage unit 16. In S410, the transmitting unit 5 wirelessly transmits the signal including the camera address information read in S409 and the image data stored in the image storage unit 4 in S408.

Then, in the terminal device 2a, in S411, the receiving unit 8 receives signal including the camera address information and the image data which the transmitting unit 5 of the digital camera 1a has transmitted. As describe earlier, since the directivity of the receiving unit 8 is directed to the digital camera 1a, the receiving unit 8 can receive the signal transmitted by the digital camera 1a. Then, in S412 through S415, processes in S413 and S414 are repeated as requested. Specifically, one piece of refused camera address information not targeted in S414, which is later described, is read from the refused camera address storage unit 18 (S413) and it is determined whether the refused camera address information read in S413 coincides with the camera address information included in the signal received in S411 (S414). If the determination result is yes, the signal is refused, and the process terminates without storing the image data included in the signal in the image storage unit 9. If the determination result is no, the process returns to S413. Then, the determination in S414 is applied to each piece of all the refused camera address information stored in the refused camera address storage unit 18. If there is no matching camera address information, the signal is allowed to receive and the process proceeds to S416. In S416 and S417, the same processes as in S207 and S208 are performed.

Thus, if the address of a digital camera whose signals are not desired to receive is registered in advance in the terminal device 2a as a refused camera address, signals transmitted by such a digital camera is refused to receive and signals transmitted digital cameras other than the digital camera are allowed to receive.

As described above, according to the information system of the second preferred embodiment, the terminal device can be prevented from receiving image data transmitted by specific digital cameras. Thus, the person being an object can be prevented from receiving image data obtained by the specific digital cameras.

Next, the information system including a digital camera and a portable information terminal device in the third preferred embodiment of the present invention is described. The information system of this preferred embodiment is further configured so that the digital camera can transmit a signal including image data only to specific terminal devices in addition to the configuration of the information system of the first preferred embodiment (see FIG. 1).

Figure 5:
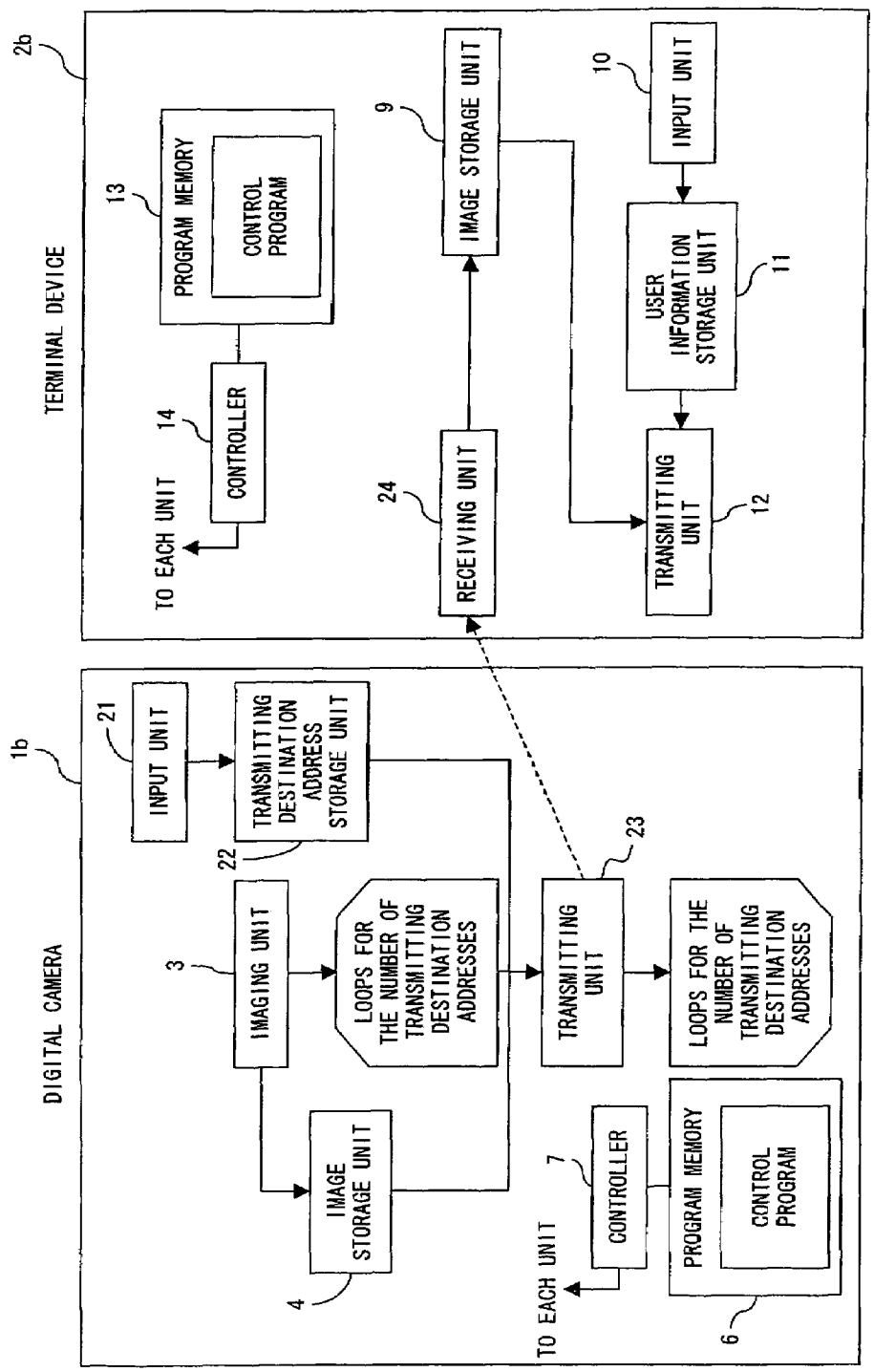
FIG. 5 shows an example of the configurations of the digital camera and portable information terminal device which are included in the information system of the third preferred embodiment.

FIG. 5 shows an example of the configurations of the digital camera and portable information terminal device which are included in the information system of the third preferred embodiment.

In FIG. 5, a digital camera 1b differs from the digital camera 1 of the first preferred embodiment (see FIG. 1) only in that it further comprises an input unit 21 for inputting transmitting destination address information of a transmitting destination address according to a user's instruction to input the transmitting destination address and a transmitting destination address storage unit 22 for storing the transmitting destination address inputted by the input unit 21 and a transmitting unit 23 for wirelessly transmitting the signal including the image data stored in the image storage unit 4 to the transmitting destination address of the transmitting destination address information stored in the transmitting destination address storage unit 22, instead of the transmitting unit 5.

However, the terminal device 2b differs from the terminal device 2 of the first preferred embodiment only in that it comprises a receiving unit 24 for receiving only signals wirelessly transmitted to the address of the terminal device 2b, instead of the receiving unit 8. Image data included in a signal received by this receiving unit 24 is stored in the image storage unit 9.

The transmitting unit 23 of the digital camera 1b wirelessly transmits a signal using an electro-magnetic wave, an infrared ray, a ultrasonic wave or the like, and the receiving unit 24 of the terminal device 2b receives the signal put on an electro-magnetic wave, an infrared ray, a ultrasonic wave or the like.

In the terminal device 2b, no image storage unit 9 can also be provided and the image data included in the signal received by the receiving unit 24 can also be directly transmitted to the transmitting unit 12.

Next, the respective operations of the digital camera 1b and terminal device 2b are described below.

In this example, a shooter shoots a person being an object, using the digital camera 1b (souvenir picture). However, it is assumed that the person being an object carries the terminal device 2b or the terminal device 2b is located in a position of a range where a signal wirelessly transmitted by the digital camera 1b can be received.

Figure 6:
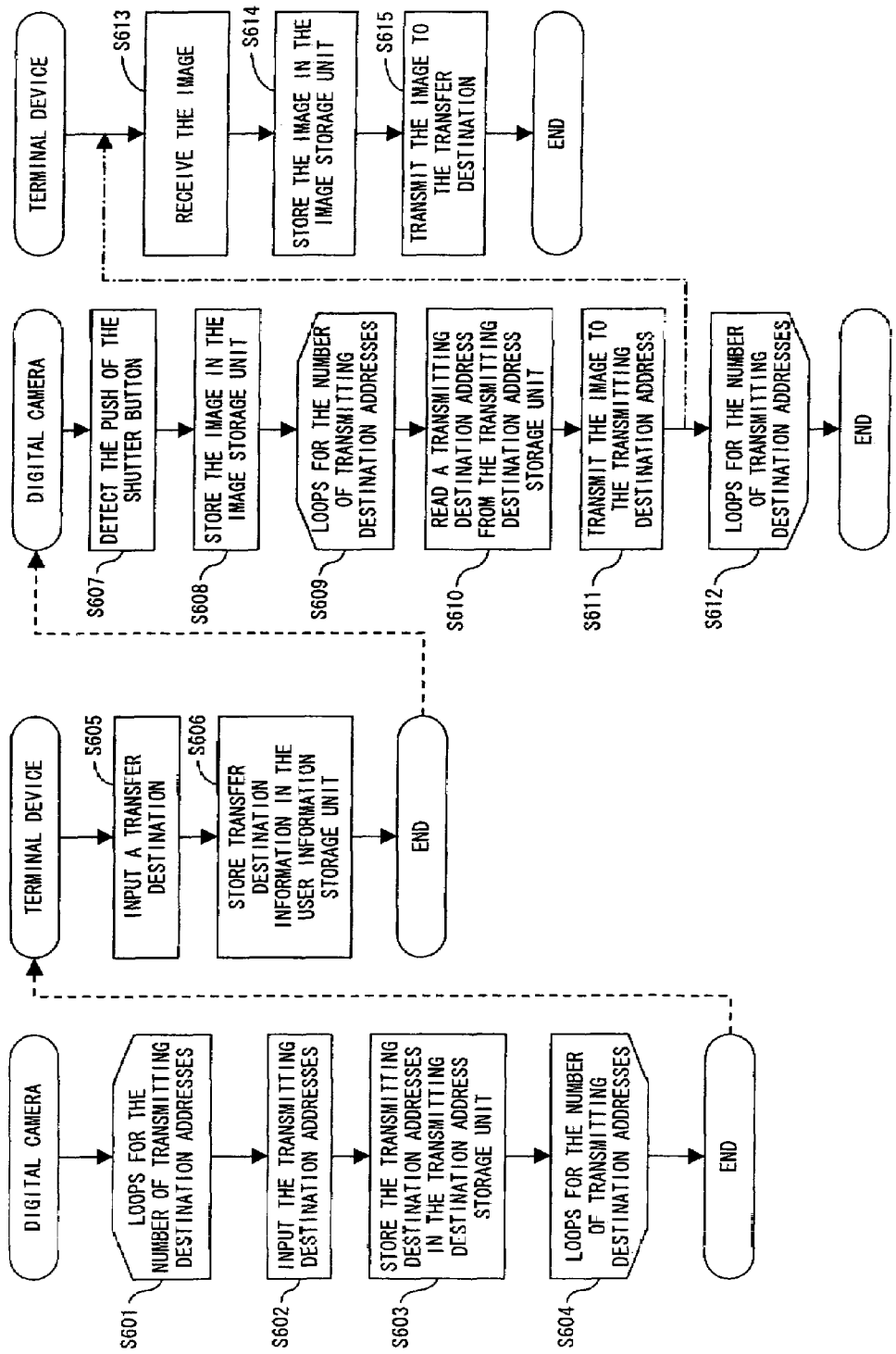
FIG. 6 is a flowchart showing the operations of the digital camera and portable information terminal device of the third preferred embodiment.

FIG. 6 is a flowchart showing the operations of the digital camera 1b and terminal device 2b in such a case.

In FIG. 6, processes in S601 through S604 and S607 through S612 are the operations of the digital camera 1b, and those in S605, S606 and S613 through S615 are the operations of the terminal device 2b.

Firstly, the processes in S601 through S604 of the digital camera 1b, in which transmitting destination addresses are inputted to the digital camera 1b, and the processes in S605 and S606 of the terminal device 2b, in which transfer destinations are inputted to the terminal device 2b, are performed. Either of the processes in S601 through S604 of the digital camera 1b and those in S605 and S606 of the terminal device 2b can be performed first. Alternatively, both can also be performed in parallel.

Firstly, in the digital camera 1b, in S601 through S604, the processes in S602 and S603 are repeated as requested. Specifically, every time a user instructs to input one transmitting destination address, which is a transmitting destination of image data, the input unit 21 inputs transmitting destination address information about the transmitting destination address (S602) and the transmitting destination address information is stored in the transmitting destination address storage unit 22 (S405). For example, if one or more persons desire to obtain the image data when there is a plurality of persons being objects, the input of the respective addresses of the persons that desires it is instructed. The information of the addresses are inputted and stored. In this example, it is assumed that the input of at least the address of the terminal device 2b is instructed.

Then, in the terminal device 2b, in S605 and S606, the same processes as in S201 and S202 of FIG. 2 are performed.

Then, the processes in S607 through S612 of the digital camera 1b and the processes in S613 through S615 of the terminal device 2b, in which a shooter shoots a person being an object, are performed.

Firstly, in the digital camera 1b, in S607 and S608, the same processes as in S203 and S204 of FIG. 2 are performed. In S609 through S612, the processes in S601 and S611 are repeated as requested. Specifically, it is repeated that one piece of transmitting destination address information which is not targeted in S611, which is described later, is read from the transmitting destination address storage unit 22 (S610) and the transmitting unit 23 wirelessly transmits the signal including the image data stored in the image storage unit 4 in S608 to the transmitting destination address of the transmitting destination address information read in S610 (S611). Thus, the signal including the image data is wirelessly transmitted to the transmitting destination addresses of all pieces of the transmitting destination address information stored in the transmitting destination address storage unit 22.

Then, in the terminal 2b, in S613, the signal including the image data that the transmitting unit 23 of the digital camera 1b has wirelessly transmitted to the address of the terminal device 2b is received. In S614 and S615, the same processes as in S207 and S208 of FIG. 2 are performed.

Thus, if transmitting destination addresses being the transmitting destination of image data are registered in advance in the digital camera 1b, the signal included the image data is transmitted only to the transmitting destination addresses.

As described above, according to the information system of the third preferred embodiment, the digital camera can transmit its image data only to specific terminal devices. Thus, a shooter can transmit shooting image data only to specific persons.

Since the digital camera can restrict the transmitting destinations of its image data thus, for example, a business cameraman for providing a charged souvenir picture service in tourist resorts or the like can provide the souvenir picture service using this digital camera.

Next, the information system including the digital camera and portable information terminal device in the fourth preferred embodiment of the present invention is described. The information system of this preferred embodiment can be obtained by combining the digital camera of the third preferred embodiment (see FIG. 5) with the terminal device of the second preferred embodiment (see FIG. 3).

Figure 7:
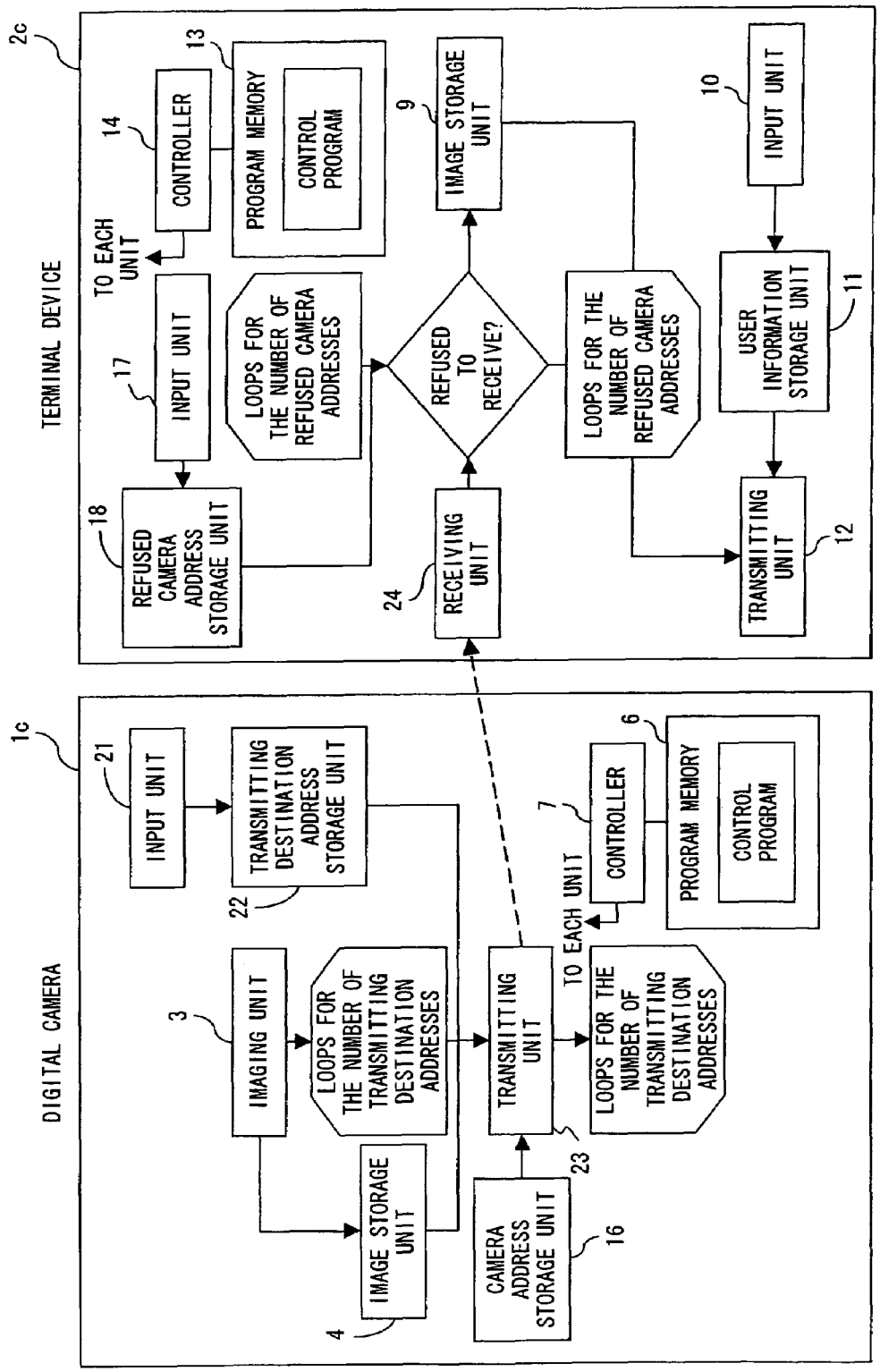
FIG. 7 shows an example of the configurations of the digital camera and portable information terminal device which are included in the information system of the fourth preferred embodiment.

FIG. 7 shows an example of the configurations of the digital camera and portable information terminal device which are included in the information system of the fourth preferred embodiment.

In FIG. 7, a digital camera 1c differs from the digital camera 1b of the third preferred embodiment (FIG. 5) only in that it further comprises a camera address storage unit 16 for storing the information about the camera address (camera address information) of the digital camera 1c. However, in the digital camera 1c, the transmitting unit 23 transmits a signal including the image data stored in the image storage unit 4 and the camera address information stored in the camera address storage unit 16.

However, the terminal device 2c differs from the terminal device 2a of the second preferred embodiment (see FIG. 3) only in that it comprises a receiving unit 24 for receiving only signals wirelessly transmitted to the address of the terminal device 2c instead of the receiving unit 8.

Next, the respective operations of the digital camera 1c and terminal device 2c are described below.

In this example, a shooter shoots a person being an object (souvenir picture) using the digital camera 1c as in the third preferred embodiment.

Figure 8:
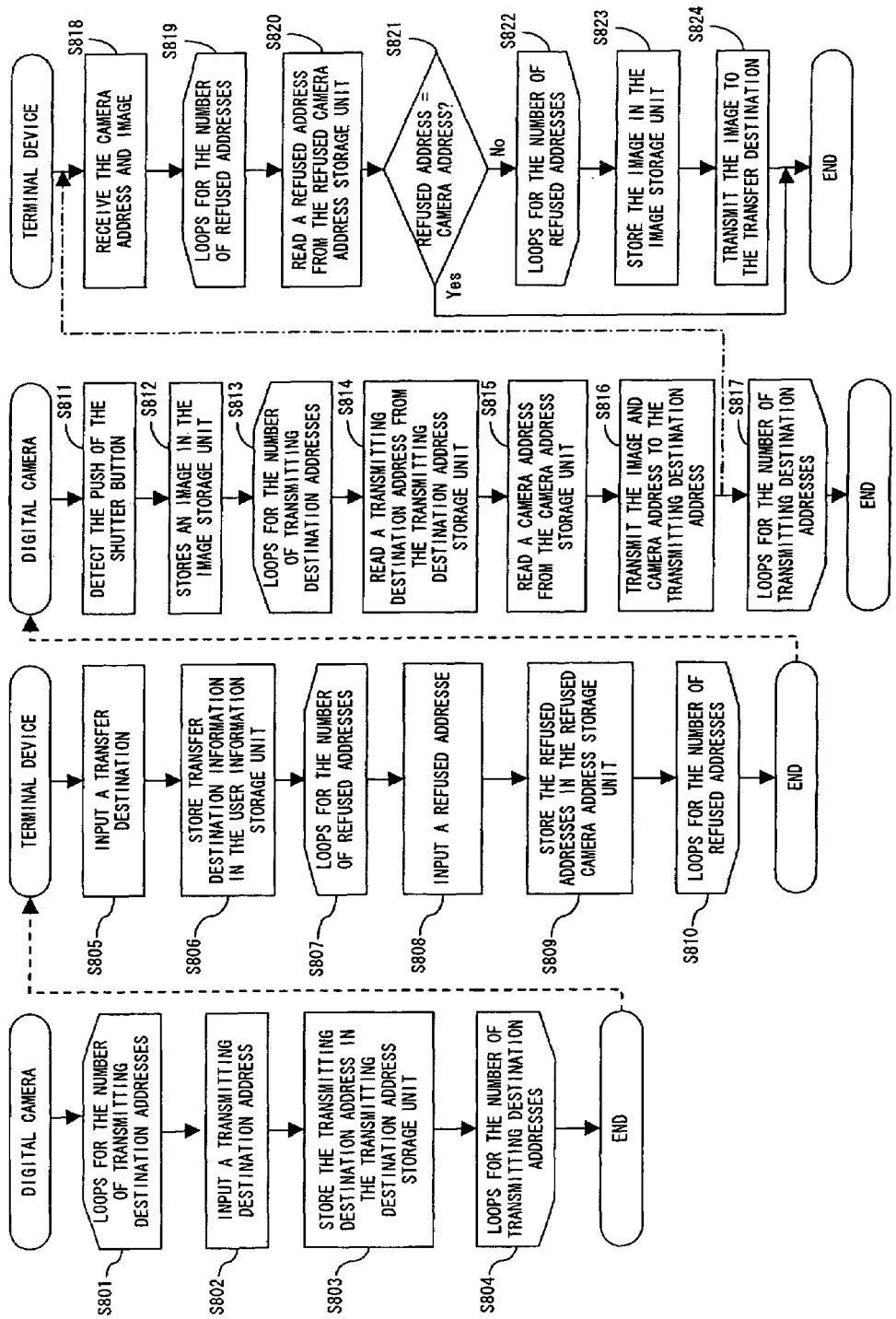
FIG. 8 is a flowchart showing the operations of the digital camera and portable information terminal device of the fourth preferred embodiment.

FIG. 8 is a flowchart showing the operations of the digital camera 1c and terminal device 2c in such a case.

In FIG. 8, processes in S801 through S804 and S811 through S817 are the operations of the digital camera 1c, and those in S805 through S810 and S818 through S824 are the operations of the terminal device 2c.

Firstly, the processes in S801 through S804 of the digital camera 1c, in which transmitting destination addresses are inputted to the digital camera 1c, and those in S805 through S810 of the terminal device 2c, in which transfer destinations and refused camera addresses are inputted to the terminal device 2c, are performed. In this case, either of the processes in S801 through S804 of the digital camera 1c and those in S805 through S810 of the terminal device 2c can be performed first. Alternatively, both can also be performed in parallel.

Firstly, in the digital camera 1c, in S801 through S804, the same processes in S601 through S604 of FIG. 6 are performed.

Then, in the terminal device 2c, in S805 through S810, the same processes as in S401 through S406 of FIG. 4 are performed.

Then, the processes in S811 through S817 of the digital camera 1c and in S818 through S824 of the terminal device 2c, in which a shooter shoots a person being an object, are performed.

Firstly, in the digital camera 1c, in S811 and S812, the same processes as S607 and 608 of FIG. 6 are performed. In S813 through S817, the processes in S814 through S816 are repeated as required. Specifically, it is repeated that one piece of transmitting destination address information that is not targeted in S816, which is described later, is read from the transmitting destination address storage unit 22 (S814), then the camera address information is read from the camera address storage unit 16 (S815) and then the transmitting unit 23 wirelessly transmits a signal including the camera address information read in S815 and the image data stored in the image storage unit 4 in S812 to the transmitting destination addresses of the transmitting destination address information read in S814 (S816). Thus, the signal including the camera address information and image data are wirelessly transmitted to the transmitting destination addresses of all pieces of the transmitting destination address information stored in the transmitting destination address storage unit 22.

Then, in the terminal device 2c, in S818 through 824, the same processes in S411 through S417 of FIG. 4 are performed.

Thus, if transmitting destination addresses being the transmitting destinations of image data is registered in advance in the digital camera 1c, the signal including the image data is wirelessly transmitted only to the transmitting destination addresses. If the addresses of digital cameras whose signals is not desired to receive are registered in advance as refused camera addresses in the terminal device 2c, the signals transmitted by the digital camera can be refused to receive and only signals transmitted by digital cameras other than the digital camera can be allowed to receive.

As described above, according to the information system of the fourth preferred embodiment, any digital camera can transmit image data only to specific terminal devices, and any terminal device can be prevented from receiving image data specific digital cameras. Therefore, a shooter can transmit shooting image data only to specific terminal devices, and a person being an object can be prevented from receiving the shooting image data using the special digital cameras.

Next, an information system including the digital camera and portable terminal device in the fifth preferred embodiment of the present invention is described below. The information system of this preferred embodiment is configured so that the printing of an image represented by image data is requested via the terminal device.

Figure 9:
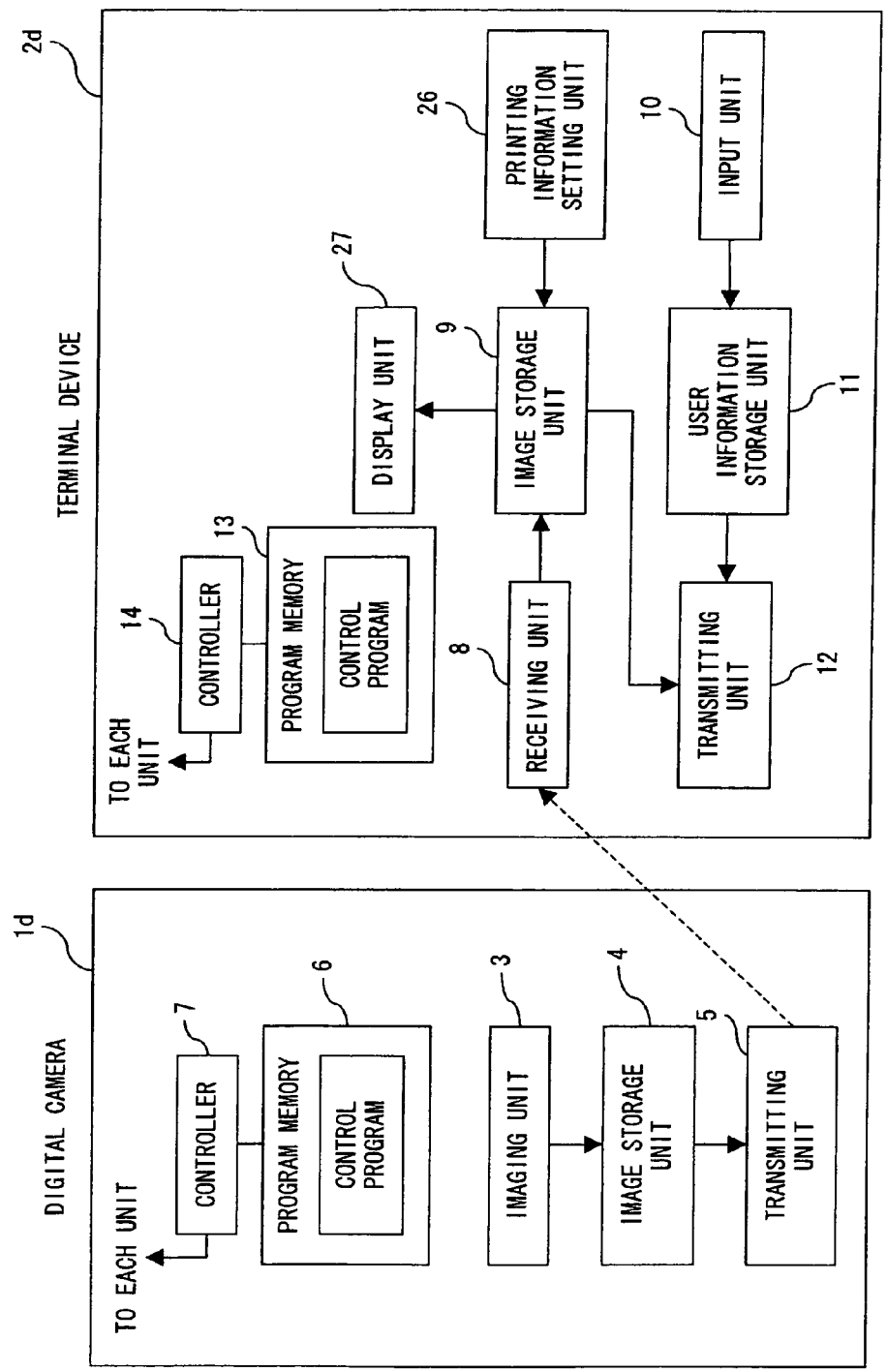
FIG. 9 shows an example of the configurations of the digital camera and portable information terminal device which are included in the information system of the fifth preferred embodiment.

FIG. 9 shows an example of the configurations of the digital camera and portable information terminal device which are included in the information system of the fifth preferred embodiment.

In FIG. 9, a digital camera 1d is the same as the digital camera 1 of the first preferred embodiment (see FIG. 1).

However, a terminal device 2d differs from the terminal device 2 of the first preferred embodiment only in that it further comprises a printing information setting unit 26 for setting the information of print setting (such as a print size, the number of prints, etc.) according to a user's instruction and a display unit 27 for displaying an image represented by image data stored in the image storage unit 9 or the like. However, in the terminal device 2d, the input unit 10 inputs information about the name and address of a user and its print requester destination (transfer destination) according to a user's instruction to input the name, address and print requester destination. The user information storage unit 11 stores the information of the name, address and print requester destination that are inputted by the input unit 10. The transmitting unit 12 transmits a signal including the image data to be printed, printing information set by the printing information setting unit 26 and personal information about the user's name and address stored in the user information storage unit 11 to the print requester destination (image printing system of a printing company) stored in the user information storage unit 11.

Next, the respective operations of the digital camera 1*d* and terminal device 2*d* are described below.

In this example, as in the first preferred embodiment, a shooter shoots a person being an object that carries the terminal device 2*d* (souvenir picture) using the digital camera 1*d* and requests a printing company to print desired shooting image data, via the terminal device 2*d*.

Figure 10:
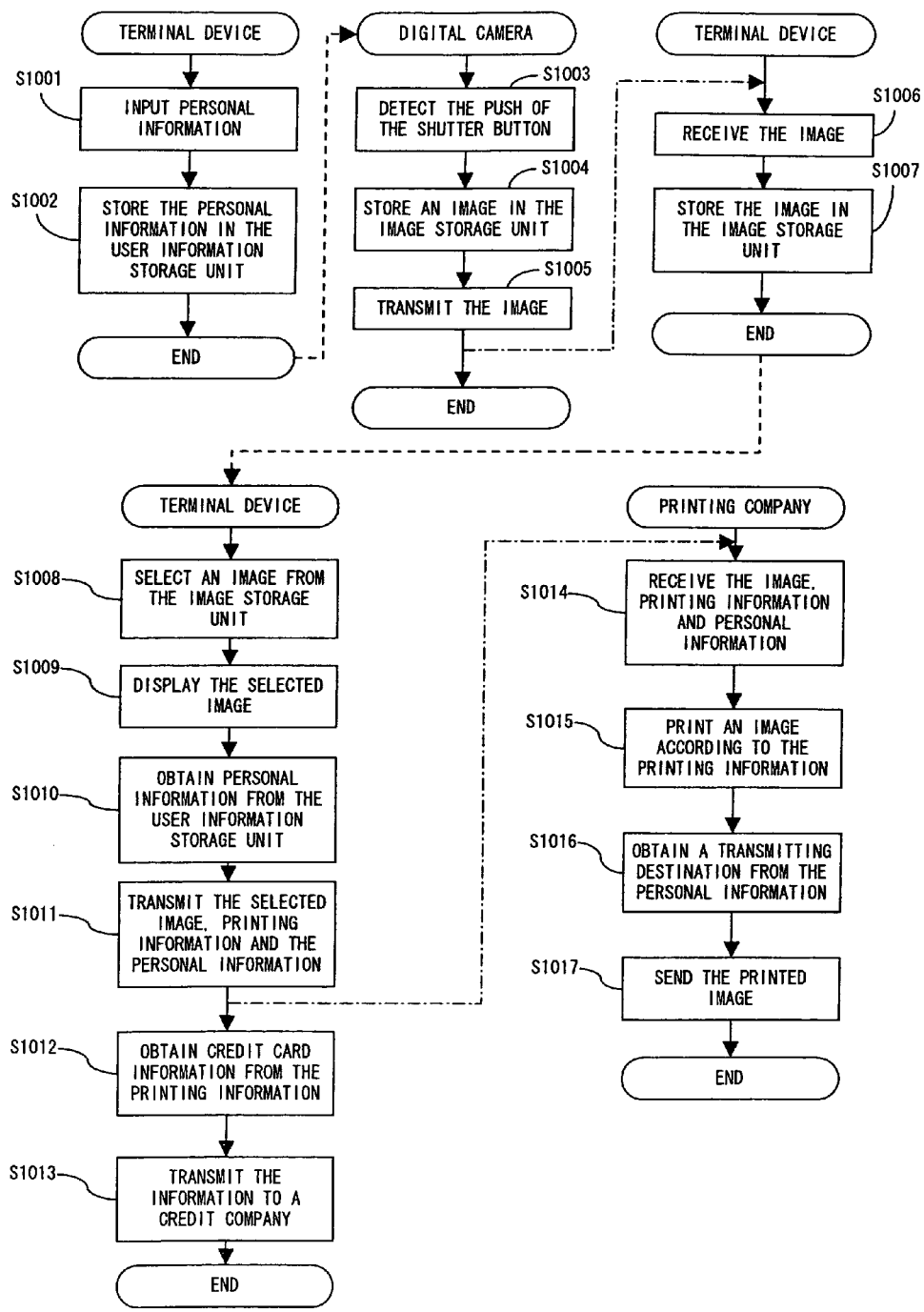
FIG. 10 is a flowchart showing the operations of the digital camera and portable information terminal device of the fifth preferred embodiment.

FIG. 10 is a flowchart showing the operations of the digital camera 1*d* and terminal device 2*d* in such a case.

In FIG. 10, processes in S1003 through S1005 are the operations of the digital camera 1*d*, those in S1001, S1002, S1006, S1007 and S1008 through S1013 are the operations of the terminal device 2*d*, and those in S1014 through S1017 are the operations of the image printing system of the printing company, which is not shown in FIG. 9.

Firstly, the processes in S1001 and S1002 of the terminal device 2*d*, in which personal information and the like (information about name, address of a user and a print requester destination) is inputted to the terminal device 2*d*, are performed. In S1001, the input unit 10 inputs the personal information (information about the name and address) and information about the print requester destination according to the instruction to input the name and address of the user and the print requester destination of the user (a person being an object) of the terminal device 2*d*. In S1002, the personal information and print requester destination information that are inputted in S1001 are stored in the user information storage unit 11.

Then, the processes in S1003 through S1005 of the digital camera 1*d* and those in S1006 and S1007 of the terminal device 2*d*, in which a shooter shoots a person being an object, are performed.

Firstly, in the digital camera 1*d*, in S1003 through S1005, the same processes in S203 through S205 of FIG. 2 are performed.

Then, in the terminal device 2*d*, in S1006 and S1007, the same processes as in S206 and S207 of FIG. 2 are performed.

The number of shots can be one or more. If a plurality of shots is taken, the image storage unit 9 stores a plurality of pieces of image data.

In this example, after personal information and the like is inputted to the terminal device 2*d*, the process of the shooter shooting the person being an object is performed. However, the shooting process can also be performed first.

After shooting, the processes in S1008 through S1013 of the terminal device 2*d*, in which a person being an object (user of the terminal device 2*d*) requests for its printing, are performed. In S1008, the display unit 27 displays images represented by the image data stored in the image storage unit 9 and desired images to be printed is selected according to the user's instruction. In this case, if the number of image data stored in the image storage unit 9 is large, when displaying images represented by a prescribed number of image data are displayed by the button operations or the like of the user. In S1009, the images selected to print in S1008 are displayed and the printing information (a print size, the number of prints, etc.) of the displayed images are set by the printing information setting unit 26 according to the user's instruction. In this example, since it is assumed that the payment of the printing charge to the printing company is settled via a credit company, when setting the printing information, the user also instructs it to input the credit card number of the credit company, and printing information including the information about the credit card (settlement information) is set. In S1010, the personal information (information about the name and address of the user) stored in S1002 is read from the user information storage unit 11. In S1011, a signal including the image data representing the images selected to print in S1008, printing information set for the images (printing information set in S1009) and personal information read in S1010 is transmitted to the print requester destination (image printing system of the printing company) indicated by the print requester destination information stored in the user information storage unit 11. In S1012, the credit card information is obtained from the printing information set in S1009. In S1013, the credit card information obtained in S1012 is transmitted to the credit company.

In the printing company, the processes in S1014 through S1017 of the image printing system are performed. In S1015, the signal including the image data, printing information and personal information that is transmitted by the terminal device 2*d* is received. In S1015, based on the image data and printing information that are included in the signal received in S1014, the images represented by the image data are printed according to the printing information. In S1016, information about a name and an address being the transmitting destination of the printed images is obtained from the personal information included in the signal received in S1014. In S1017, the printed images are sent to the name and address of the information obtained in S1016. Thus, the printed images is delivered to the address of the user of the terminal device 2*d* later. The printing company settles this printing charge via the credit company.

Thus, shooting image data is stored in the image storage unit 9 of the terminal device 2*d*, and by selecting image data desired to print from the stored image data and performing the printing setting of the image data and the like, the print request of the image data can be issued to a printing company.

As described above, according to the information system of the fifth preferred embodiment, a person being an object can easily request for the printing of desired taken images via the terminal device 2*d*. Thus, for example, a souvenir picture can be taken in a tourist resort or the like, and its printing can be requested for on the spot via the terminal device 2*d*.

Next, the information system including the digital camera and portable information terminal device in the sixth preferred embodiment of the present invention is described below. The information system of this preferred embodiment is configured so that a terminal device receives no image data transmitted by a specific camera, in addition to the configuration of the information system of the fifth preferred embodiment (see FIG. 9).

Figure 11:
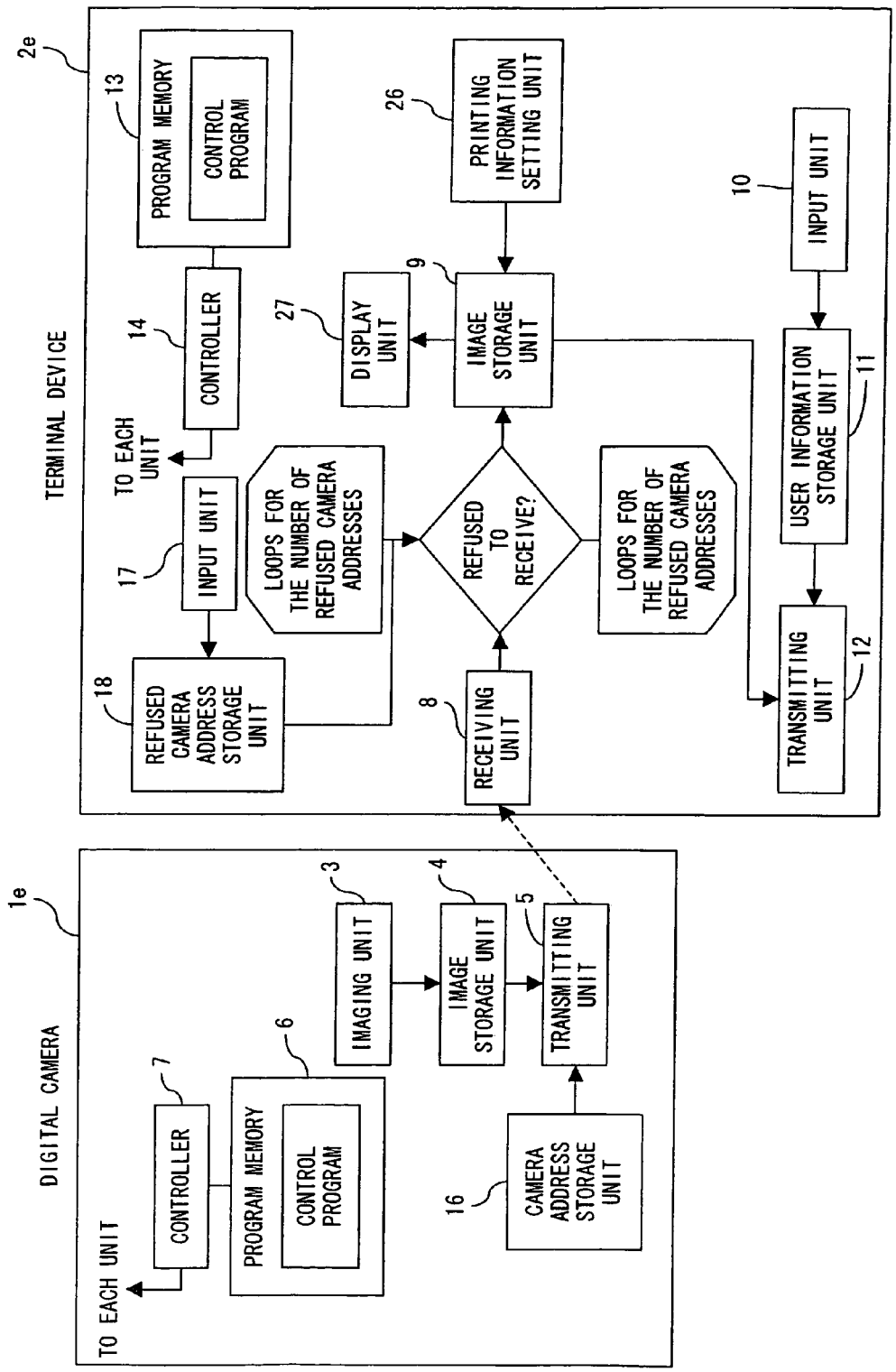
FIG. 11 shows an example of the configurations of the digital camera and portable information terminal device which are included in the information system of the sixth preferred embodiment.

FIG. 11 shows an example of the configurations of the digital camera and portable information terminal device which are included in the information system of the sixth preferred embodiment.

In FIG. 11, a digital camera 1*e* differs from the digital camera 1*d* of the fifth preferred embodiment (see FIG. 9) only in that it further comprises a camera address storage unit 16 for storing information about of the camera address (camera address information) of the digital camera 1*e*. However, in the digital camera 1*e*, the transmitting unit 5 transmits a signal including the image data stored in the image storage Unit 4 and the camera address information stored in the camera address storage unit 16.

However, the terminal device 2e differs from the terminal device 2d of the fifth preferred embodiment only in that it further comprises an input unit 17 for inputting refused camera address information about refuse camera addresses according to a user's instruction to input the refused camera addresses and a refused camera address storage unit 18 for storing the refused camera address information inputted by the input unit 17.

However, if the camera address information coincides with no refused camera address information stored in the refused camera address storage unit 18 when the receiving unit 8 receives the signal including the camera address information, the signal is allowed to receive and the image data included in the signal is stored in the image storage unit 9. If the camera address information coincides with any piece of the refused camera address information stored in the refused camera address storage unit 18, the signal is refused to receive and the image data included in the signal is not stored in the image storage unit 9.

Next, the respective operations of the digital camera 1e and terminal device 2e are described below.

In this example, as in the first preferred embodiment, a shooter shoots a person being an object that carries the terminal device 2e (souvenir picture) using the digital camera 1e and requests a printing company to print desired shooting image data, via the terminal device 2e.

Figure 12:
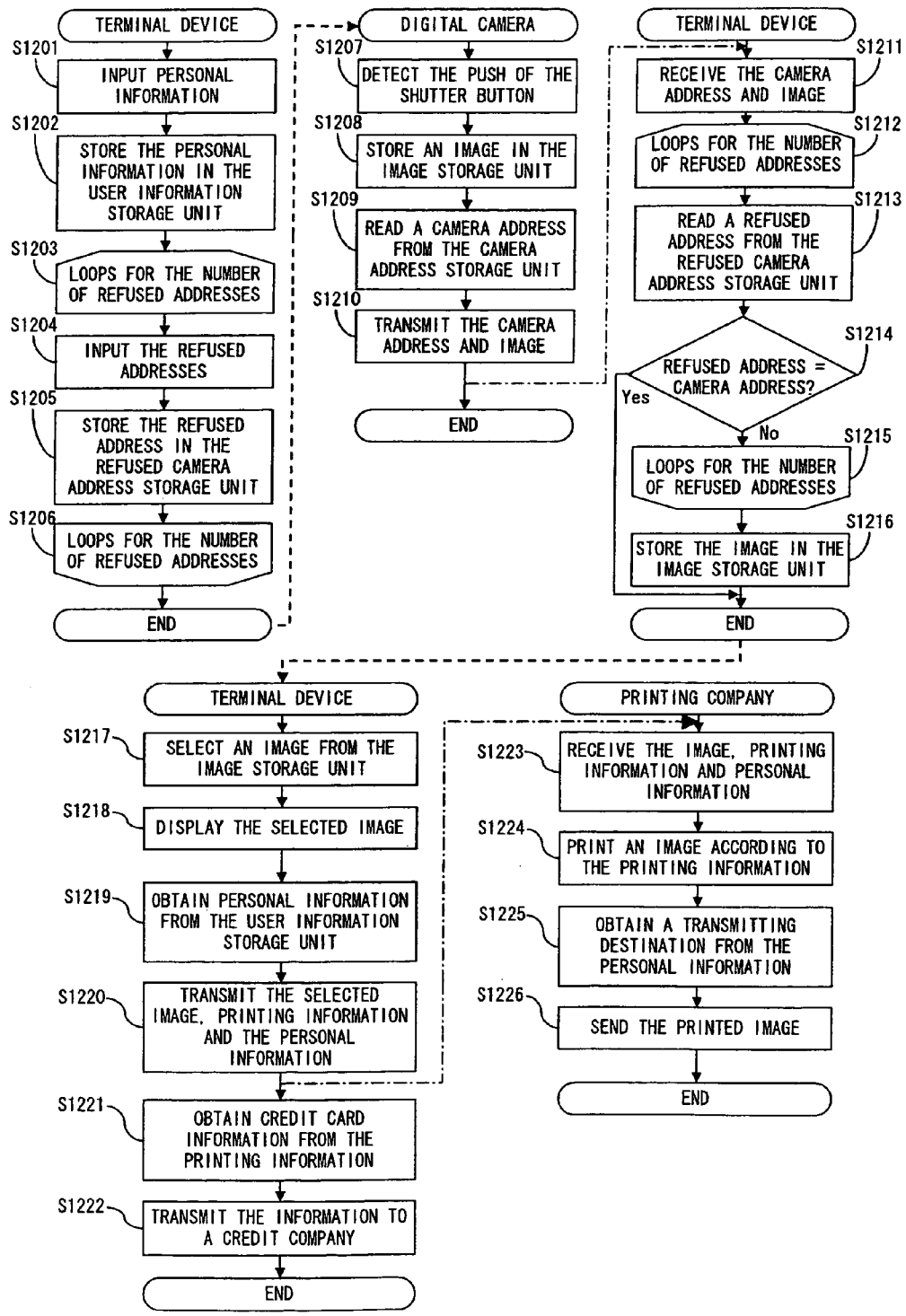
FIG. 12 is a flowchart showing the operations of the digital camera and portable information terminal device of the sixth preferred embodiment.

FIG. 12 is a flowchart showing the operations of the digital camera 1e and terminal device 2e in such a case.

In FIG. 12, processes in S1207 through S1210 are the operations of the digital camera 1e, those in S1201 through S1206, S1211 through S1216 and S1217 through S1222 are the operations of the terminal device 2e, and those in S1223 through S1226 are the operations of the image printing system of the printing company, which is not shown in FIG. 11.

Firstly, the processes in S1201 through S1206 of the terminal device 2e, in which personal information (information about the name and an address of a user), print requester destination information and refused camera addresses are inputted to the terminal device 2e, are performed. In S1201 and S1202, the same processes as in S1001 and S1002 of FIG. 10 are performed. Then, in S1203 through S1206, the same processes as in S403 through S406 of FIG. 4 are performed.

Then, the processes in S1207 through S1210 of the digital camera 1e and those in S1211 through S1216 of the terminal device 2e, in which a shooter shoots a person being an object, are performed.

Firstly, in the digital camera 1e, in S1207 through S1210, the same processes in S407 through S410 of FIG. 4 are performed.

Then, in the terminal device 2e, in S1211 through S1216, the same processes as in S411 through S416 of FIG. 4 are performed.

The number of shots can be one or more. If a digital camera with a camera address other than the refused camera address takes a plurality of shots, the image storage unit 9 stores a plurality of pieces of image data.

After shooting, the processes in S1217 through S1222 of the terminal device 2e, in which a person being an object (user of the terminal device 2e) requests for its printing, are performed. In S1217 through S1222, the same processes as in S1008 through S1013 of FIG. 10 are performed.

In the printing company, the processes in S1223 through S1226 of the image printing system are performed. In S1223 through S1226, the same processes as in S1014 through 1017 of FIG. 10 are performed. Thus, the printed images reach the address of the user of the terminal device 2e later.

Thus, if the address of a digital camera whose signals are not desired to receive is registered in advance in the terminal device 2e as a refused camera address, the signals transmitted by the digital camera is refused to receive, and signals transmitted by digital cameras other than the digital camera are allowed to receive. Thus, only image data included in the signal which is allowed to receive is stored in the image storage unit 9.

As described above, according to the information system of the sixth preferred embodiment, the terminal device can receive no image data transmitted by a specific digital camera, and only image data transmitted by digital cameras other than the specific digital camera can be image data to be printed.

Next, the information system including the digital camera and portable information terminal device in the seventh preferred embodiment of the present invention is described below. The information system of this preferred embodiment is configured so that the digital camera can transmit a signal including image data only to a specific terminal device, in addition to the configuration of the information system of the fifth preferred embodiment (see FIG. 9).

Figure 13:
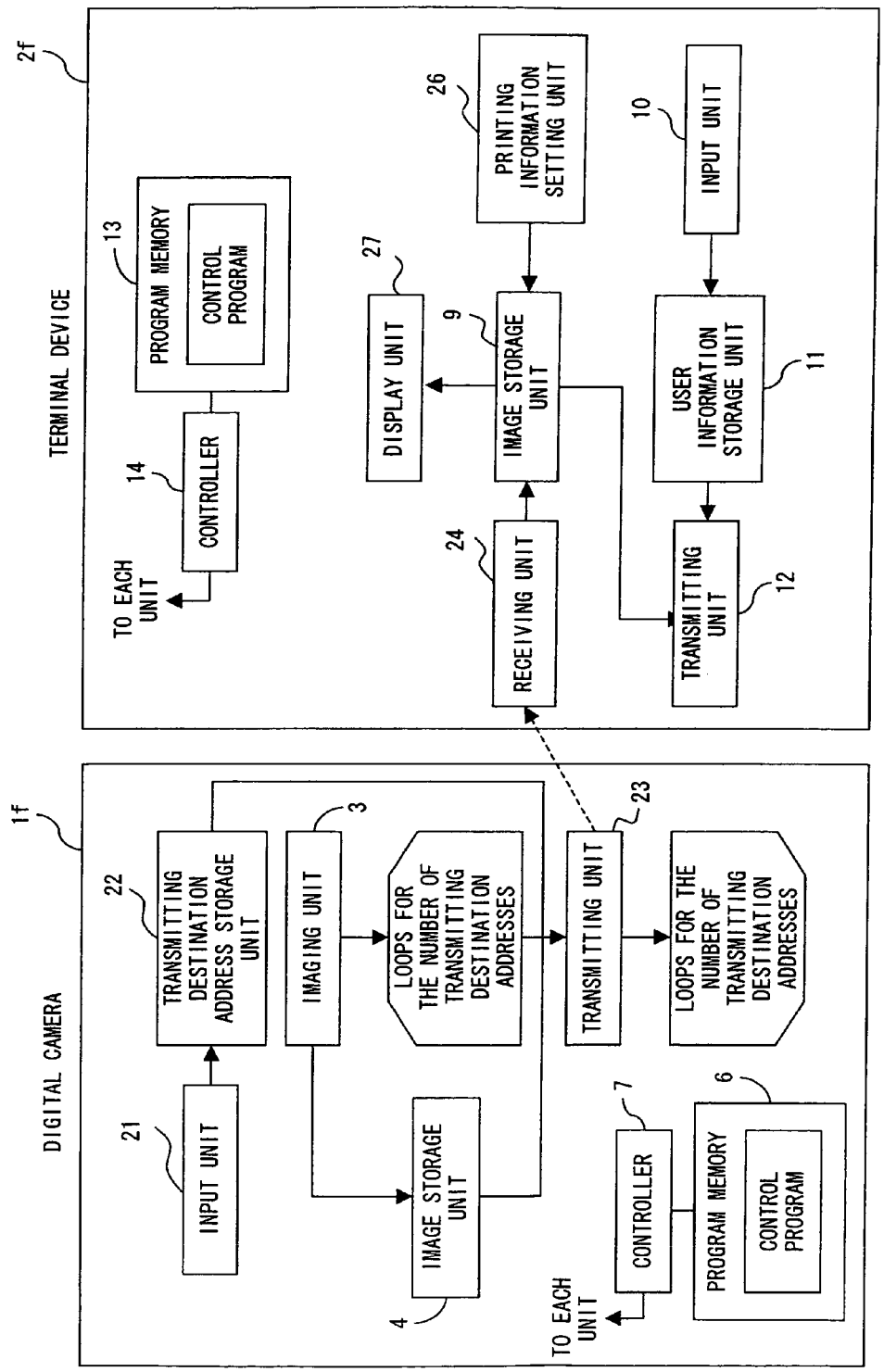
FIG. 13 shows an example of the configurations of the digital camera and portable information terminal device which are included in the information system of the seventh preferred embodiment.

FIG. 13 shows an example of the configurations of the digital camera and portable information terminal device which are included in the information system of the seventh preferred embodiment.

In FIG. 13, a digital camera 1f differs from the digital camera 1d of the fifth preferred embodiment (see FIG. 9) only in that it further comprises an input unit 21 for inputting transmitting destination address information of a transmitting destination address according to a user's instruction to input the transmitting destination address and a transmitting destination address storage unit 22 for storing the transmitting destination address inputted by the input unit 21 and a transmitting unit 23 for wirelessly transmitting the signal including the image data stored in the image storage unit 4 to the transmitting destination address of the transmitting destination address information stored in the transmitting destination address storage unit 22 instead of the transmitting unit 5.

However, the terminal device 2f differs from the terminal device 2d of the fifth preferred embodiment only in that it comprises a receiving unit 24 for receiving only signals wirelessly transmitted to the address of the terminal device 2f, instead of the receiving unit 8. Image data included in a signal received by this receiving unit 24 is stored in the image storage unit 9.

Next, the respective operations of the digital camera 1f and terminal device 2f are described below.

In this example, as in the third preferred embodiment, a shooter shoots a person being an object (souvenir picture), using the digital camera 1f and requests a printing company to print desired shooting image data, via the terminal device 2f.

Figure 14:
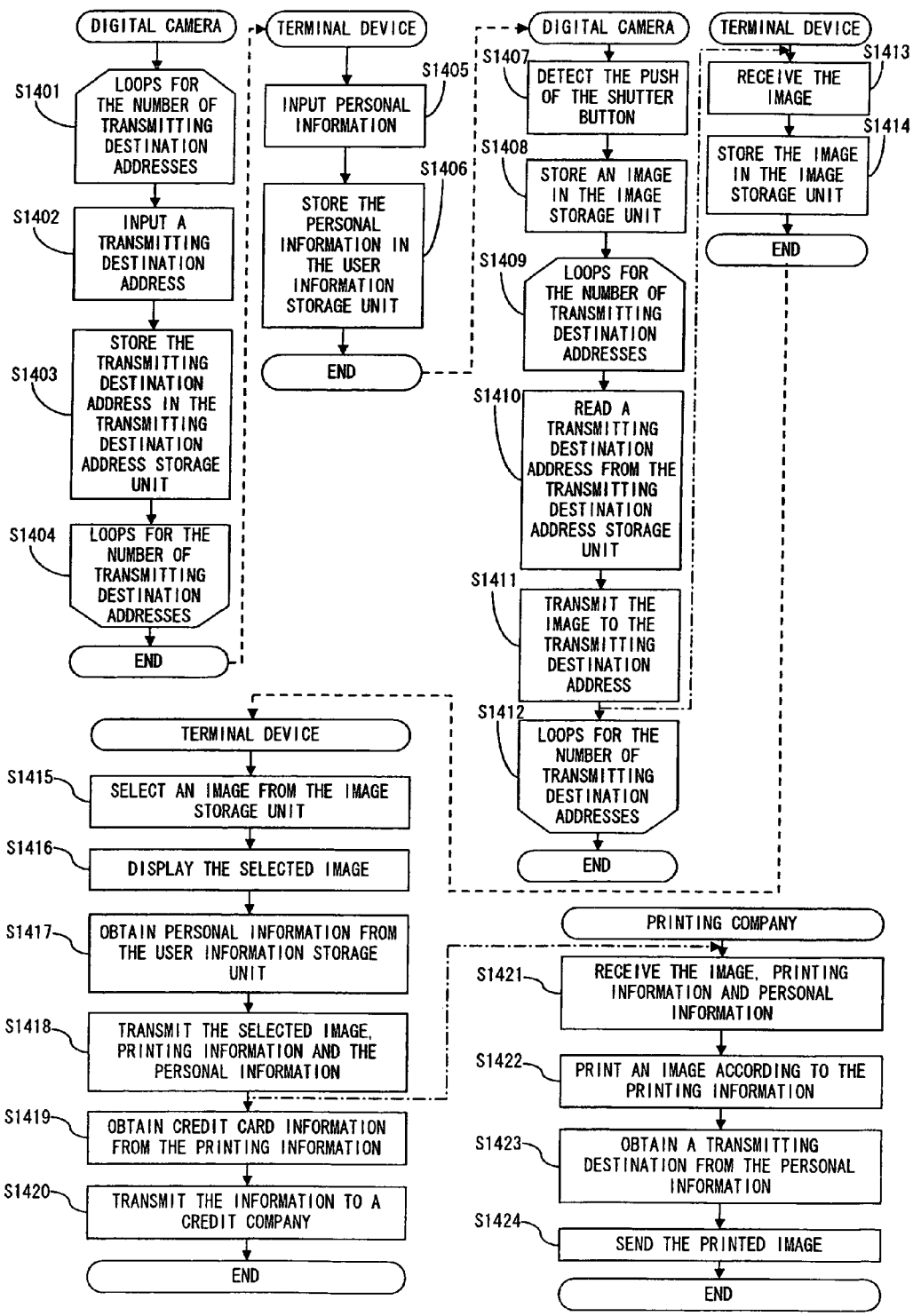
FIG. 14 is a flowchart showing the operations of the digital camera and portable information terminal device of the seventh preferred embodiment.

FIG. 14 is a flowchart showing the operations of the digital camera 1f and terminal device 2f in such a case.

In FIG. 14, processes in S1401 through S1404 and S1407 through S1412 are the operations of the digital camera 1f, those in S1405, S1406, S1413, S1414 and S1415 through S1420 are the operations of the terminal device 2f, and those in S1421 through S1424 are the operations of the image printing system of the printing company, which is not shown in FIG. 13.

Firstly, processes in S1401 through S1404 of the digital camera 1f, in which a transmitting address is inputted to the digital camera 1f, and those in S1405 and 1406 of the terminal device 2f, in which personal information and the like is inputted to the terminal device 2f, are performed. In this case, either of the processes in S1401 through S1404 of the digital camera 1f and those in S1405 and S1406 of the terminal device 2f can be performed first. Alternatively, both can also be performed in parallel.

Firstly, in the digital camera 1f, in S1401 through S1404, the same processes as those in S601 through S604 of FIG. 6 are performed.

Then, in the terminal device 2f, in S1405 and S1406, the same processes as those in S1001 and S1002 of FIG. 10 are performed.

Then, the processes in S1407 through S1412 of the digital camera 1f, in which a shooter shots a person being an object, and those in S1413 through 1415 of the terminal device 2f are performed.

Firstly, in the digital camera 1f, in S1407 through S1412, the same processes as those in S607 through S612 of FIG. 6 are performed.

Then, in the terminal 2f, in S1413 and S1414, the processes in S1006 and S1007 of FIG. 10 are performed.

In this case, the number of shootings can be one or more. In case of the plurality of shootings, a plurality of pieces of image data is stored in the image storage unit 9.

After shooting, the processes in S1415 through S1420 of the terminal device 2f, in which a person being an object (user of the terminal device 2f) requests for printing, are performed. In S1415 through S1420, the same processes as those in S1008 through S1013 of FIG. 10 are performed.

In the printing company, the processes in S1421 through S1424 of the image printing system are performed. In S1421 through S1424, the same processes as those in S1014 through S1017 of FIG. 10 are performed. Thus, a printed image is delivered to the address of the user of the terminal device 2f later.

By registering a transmitting destination address being the transmitting destination of image data in the digital camera 1f in advance in this way, a signal including image data is wirelessly transmitted only to the transmitting destination address.

As described above, according to the information system of the seventh preferred embodiment, a digital camera can transmit image data only to a specific terminal device. Thus, a shooter can transmit image data obtained by shooting only to a specific person. In a terminal device, only image data included in a signal addressed to the terminal device can be made a print target.

Next, the information system including the digital camera and portable information terminal device of the eighth preferred embodiment is described. The information system of this preferred embodiment can be obtained by combining the digital camera of the seventh preferred embodiment (see FIG. 13) with the terminal device of the sixth preferred embodiment (see FIG. 11).

Figure 15:
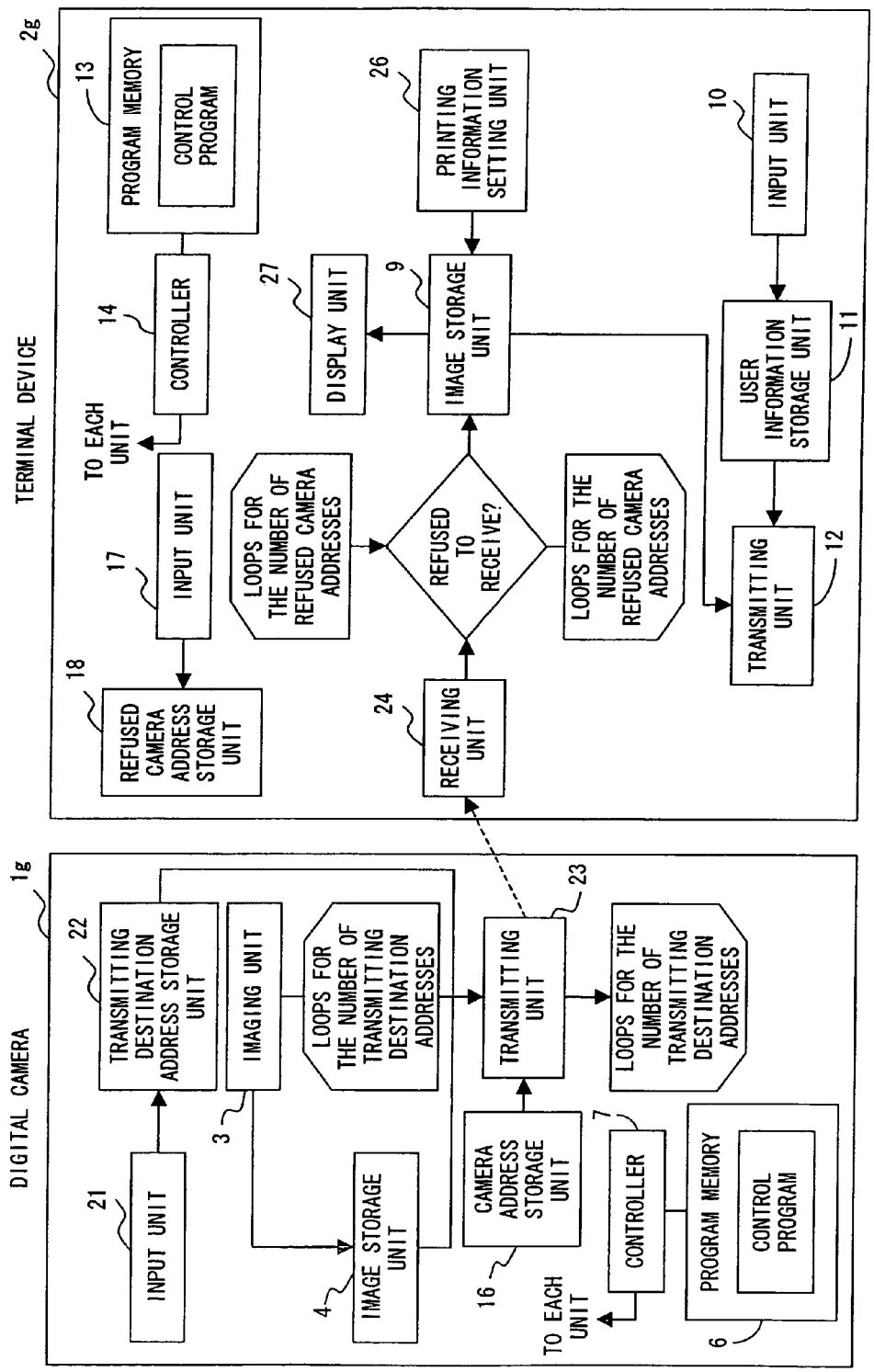
FIG. 15 shows an example of the configurations of the digital camera and portable information terminal device which are included in the information system of the eighth preferred embodiment.

FIG. 15 shows an example of the configurations of the digital camera and terminal device included in the information system of the eight preferred embodiment.

In FIG. 15, a digital camera 1g differs from the digital camera 1f of the seventh preferred embodiment (see FIG. 13) only in that it further comprises a camera address storage unit 16 for storing information about the camera address (camera address information) of the digital camera 1g. However, in the digital camera 1g, the transmitting unit 23 transmits a signal including image data stored in the image storage unit 4 and camera address information stored in the camera address storage unit 16.

A terminal device 2g differs from the terminal device 2e of the sixth preferred embodiment (see FIG. 11) only in that it comprises a receiving unit 24 for receiving only a signal wirelessly transmitted to the address of the terminal device 2g, instead of the receiving device 8.

Next, the operations of the digital camera 1g and terminal device 2g are described.

In this example, as in the third preferred embodiment, a shooter shots a person being an object (souvenir picture) using the digital camera 1g and requests a printing company to print desired image data obtained by shooting via the terminal device 2g.

Figure 16:
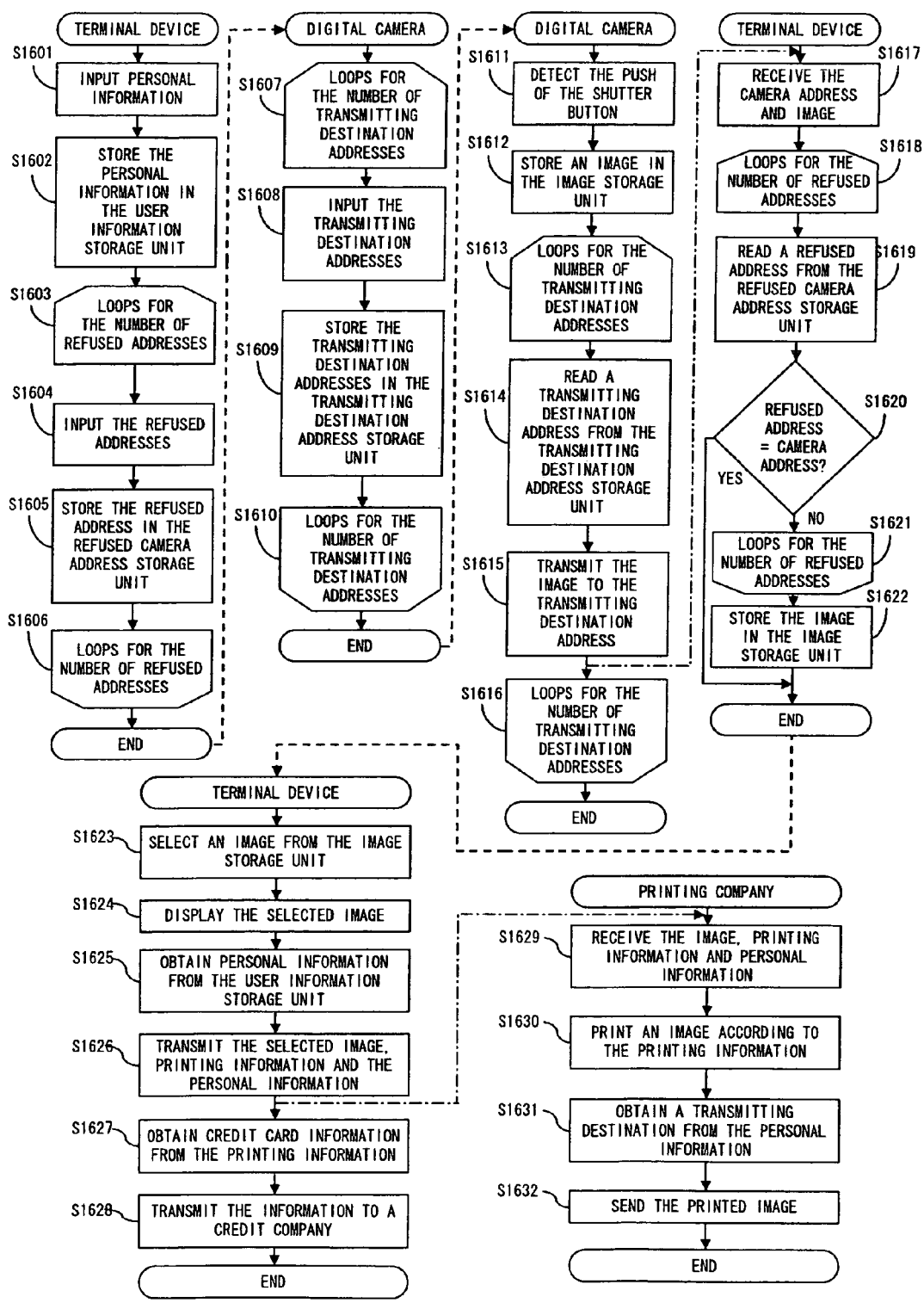
FIG. 16 is a flowchart showing the operations of the digital camera and portable information terminal device of the eighth preferred embodiment.

FIG. 16 is a flowchart showing the operations of the digital camera 1g and terminal device 2g in such a case.

In FIG. 16, the processes in S1607 through S1610 and S1611 through S1616 are the operations of the digital camera 1, those in S1601 through S1606 and S1617 through S1622 and S1623 through S1628 are those of the terminal device 2g and those in S1629 through S1632 are those of the image printing system, which is not shown in FIG. 15 of the printing company.

Firstly, the processes in S1601 through 1606 of the terminal device 2g, in which personal information (information about the name and address of a user), information about print request destination and a refused camera address are inputted to the terminal device 2, and those in S1607 through S1610 of the digital camera 1g, in which a transmitting destination address is inputted to the digital camera 1g, are performed. Any of the processes in S1601 through S1606 of the terminal device 2g and those in S1607 through S1610 of the digital camera 1g can be first performed. Alternatively, they can be performed in parallel.

Firstly, in the terminal device 2g, in S1601 through S1606, the same process as those S1201 through S1206 of FIG. 12 are performed.

Then, in the digital camera 1g, in S1607 through S1610, the same processes as those in S1401 through S1404 of FIG. 14 are performed.

Then, the processes in S1611 through S1616 of the digital camera 1g, in which a shooter shots a person being an object, and those in S1617 through S1622 of the terminal device 2g are performed.

Firstly, in the digital camera 1g, in S1611 through S1616, the same processes as those in S1407 through S1412 of FIG. 14 are performed.

Then, in the terminal device 2g, in S1617 through S1622, the same processes as those in S1211 through S1216 of FIG. 12 are performed.

The number of shootings can be one or more. If a plurality of shootings is conducted by a digital camera whose address is not refused, a plurality of pieces of image data is stored in the image storage unit 9.

Then, the processes in S1623 through S1628 of the terminal device 2g, in which a person being an object (user of the terminal device 2g) requests for printing after shooting, are performed. In S1623 through S1628, the same processes as those in S1014 through S1017 of FIG. 10 are performed. Thus, a printed image is delivered to the address of the user of the terminal device 2g later.

By registering a transmitting destination address being the transmitting destination of image data in the digital camera 1g in advance in this way, a signal including image data is wirelessly transmitted from the digital camera 1g only to the transmitting destination address. By registering the address of a digital camera whose signal is not desired to receive in the terminal device 2g as a refused camera address, a signal from the digital camera is refused and signals from digital cameras other than the digital camera are allowed to receive. Thus, only image data included in the permitted signal is stored in the image storage unit 9.

As described above, according to the information system of the eighth preferred embodiment, a digital camera can transmit image data only to a specific terminal device, and a terminal device cannot receive image data from a specific digital camera. Thus, only image data which is addressed to the terminal device and is included in a signal from digital cameras other than the specific digital camera can be printed.

Next, the information system including the digital camera and portable information terminal device of the ninth preferred embodiment is described.

Although in the information system of the second preferred embodiment (see FIG. 3), a terminal device receives no signals transmitted by a digital camera with a registered refused camera address, in the information system of this preferred embodiment, a terminal device receives only signals transmitted by a digital camera with a registered permitted camera address.

Figure 17:
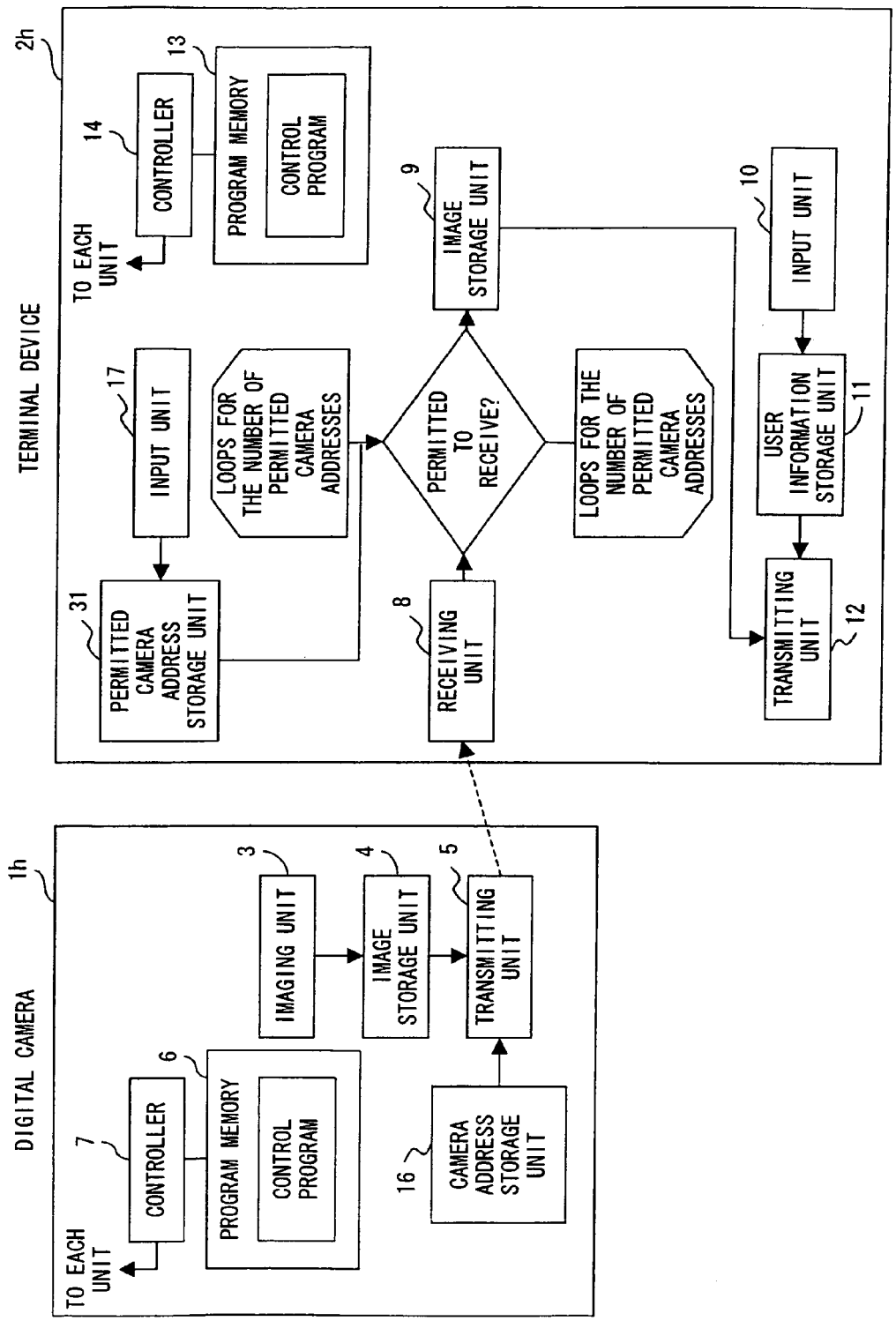
FIG. 17 shows an example of the configurations of the digital camera and portable information terminal device which are included in the information system of the ninth preferred embodiment.

FIG. 17 shows an example of the configurations of the digital camera and portable information terminal device which are included in the information system of the ninth preferred embodiment.

In FIG. 17, a digital camera 1h has the same configuration as the digital camera 1a of the second preferred embodiment (see FIG. 3).

However, a terminal device 2h differs from the terminal device 2a of the second preferred embodiment only in that it comprises a permitted camera address storage unit 31 for storing permitted camera address information inputted by the input unit 17, instead of the refused camera address storage unit 18. However, in the terminal device 2h, the input unit 17 inputs the permitted camera address information of the permitted camera address, according to a user's instruction to input the permitted camera address. If the camera address information coincides with any of the permitted camera address information stored in the permitted camera address storage unit 31 when the receiving unit 8 receives a signal including camera address information, the terminal device 2h permits to receive the signal and stores image data included in the signal in the image storage unit 9. If the camera address information coincides with no piece of the permitted camera address information stored in the permitted camera address storage unit 31, the terminal device 2h refuses to receive the signal and cannot store image data included in the signal in the image storage unit 9.

Next, the respective operations of the digital camera 1h and terminal device 2h are described.

In this example, as in the first preferred embodiment, a shooter shoots a person that carries the terminal device 2h being an object, using the digital camera 1h (souvenir picture).

Figure 18:
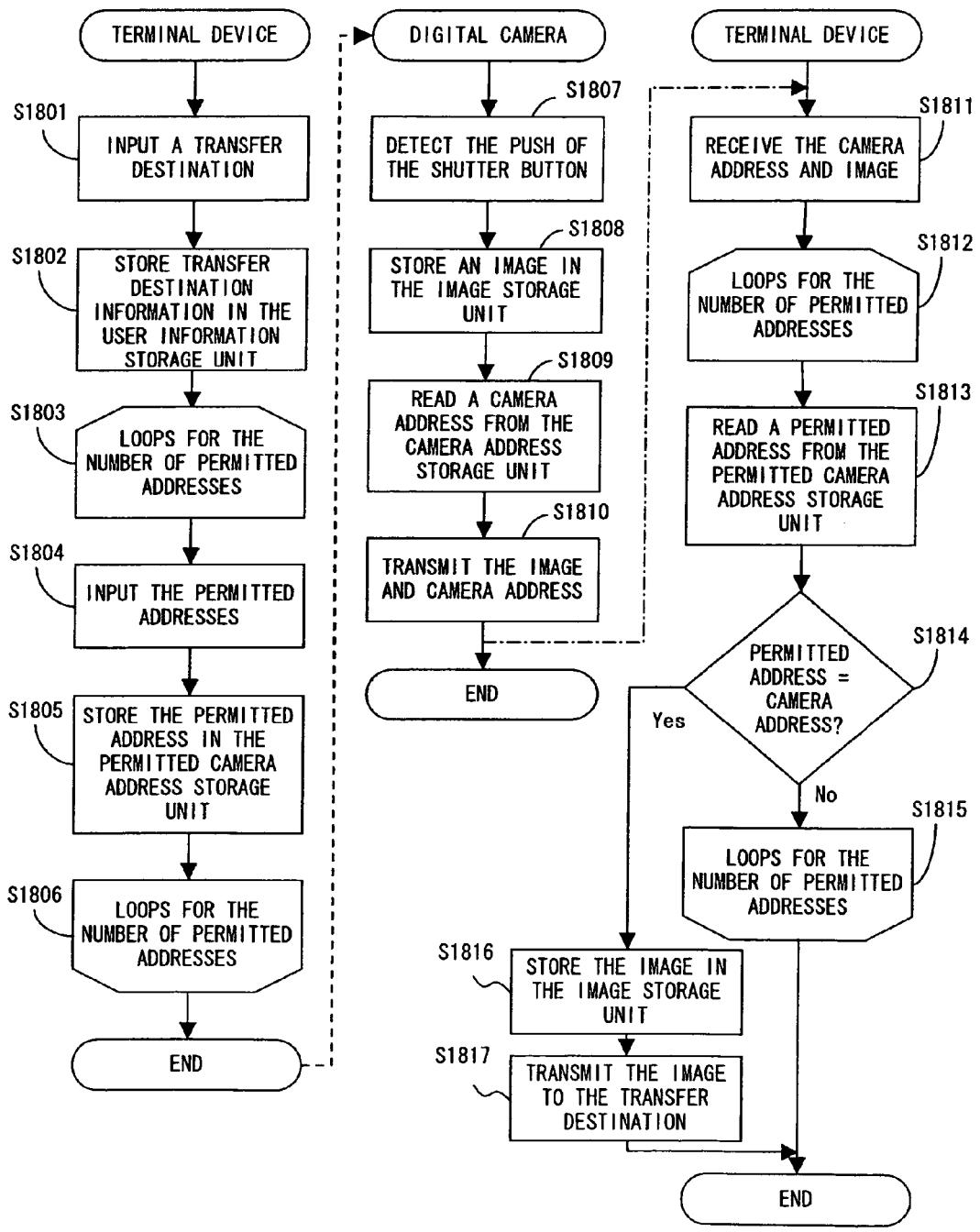
FIG. 18 is a flowchart showing the operations of the digital camera and portable information terminal device of the ninth preferred embodiment.

FIG. 18 is a flowchart showing the operations of the digital camera 1h and terminal device 2h in such a case.

In FIG. 18, processes in S1801 through S1806 and S1811 through S1817 are the operations of the terminal device 2h, and those in S1807 through S1810 are the operations of the digital camera 1h.

Firstly, the processes in S1801 through S1806, in which a transfer destination and a permitted camera address are inputted to the terminal device 2h, are performed. In S1801 and S1802, the same processes in S201 and S202 of FIG. 2 are performed. Then, in S1803 through S1806, the processes in S1804 and S1805 are repeated as required. Specifically, every time a user instructs to input one permitted camera address, the permitted camera address information of the permitted camera address is inputted by the input unit 17 (S1804) and the permitted camera address information is stored in the permitted camera address storage unit 31 (S1805).

Then, the processes in S1807 through S1810 of the digital camera 1h, in which a shooter shoots a person being an object, and those in S1811 through S1817 of the terminal device 2h are performed.

Firstly, in the digital camera 1h, in S1807 through S1810, the same processes as in S407 through S410 of FIG. 4 are performed.

Then, in the terminal device 2h, in S1811, the receiving unit 8 receives a signal including camera address information and image data that the transmitting unit 5 of the digital camera 1h wirelessly transmits. Then, in S1812 through S1815, the processes in S1813 and S1814 are repeated as required. Specifically, one piece of permitted camera address information that is not to be determined in S1814, which is described later, is read from the permitted camera address storage unit 31 (S1813) and it is determined whether the permitted camera address information read in S1813 coincides with camera address information included in the signal received in S1811 (S1814). If the determination result is yes, the process proceeds to S1817. If the determination result is no, the process returns to S1814. In S1816 and S1817, the same processes in S207 and S208 of FIG. 2 are performed. If there is no matching camera address when the determination in S1814 is applied to each piece of the permitted camera address information stored in the permitted camera address storage unit 31, the signal is refused to receive and the process terminates without storing image data included in the signal in the image storage unit 9.

Thus, if the address of a digital camera whose signals are allowed to receive is registered in advance in the terminal device 2h as a permitted camera address, signals transmitted by the digital camera is allowed to receive, and signals transmitted by any digital camera other than the digital camera is refused to receive.

As described above, according to the information system of the ninth preferred embodiment, a terminal device can receive only image data transmitted by a specific digital camera. Thus, a person being an object can receive only image data shot by a specific camera.

Next, the information system including the digital camera and portable information terminal device in the tenth preferred embodiment of the present invention is described.

Although in the information system of the sixth preferred embodiment (see FIG. 11), a terminal device receives no signals transmitted by a digital camera with a registered refused camera address, the information system of this preferred embodiment receives only signals transmitted by a digital camera with a registered permitted camera address.

Figure 19:
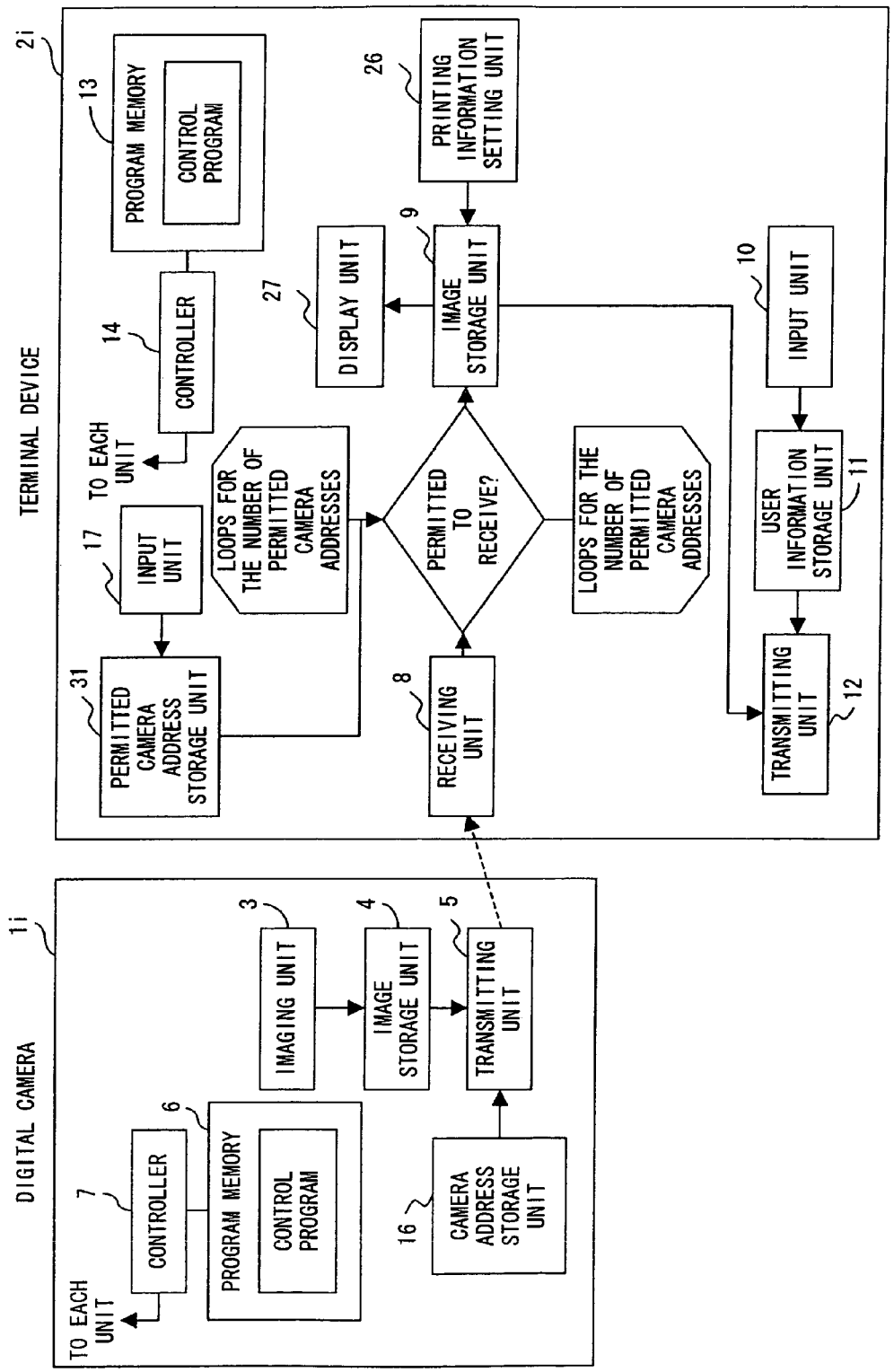
FIG. 19 shows an example of the configurations of the digital camera and portable information terminal device which are included in the information system of the tenth preferred embodiment.

FIG. 19 shows an example of the configurations of the digital camera and portable information terminal device which are included in the information system of the tenth preferred embodiment.

In FIG. 19, a digital camera 1i has the same configuration the digital camera 1e of the sixth preferred embodiment (see FIG. 11).

However, a terminal device 2i differs from the terminal device 2e of the sixth preferred embodiment only in that it comprises a permitted camera address storage unit 31 for storing permitted camera address information inputted by the input unit 17, instead of the refused camera address storage unit 18.

However, the input unit 17 of the terminal device 2i inputs permitted camera address information about the permitted camera address, according to a user's instruction to input a permitted camera address. If when the receiving unit 8 receives a signal including camera address information, the camera address information coincides with any piece of permitted camera address information stored in the permitted camera address storage unit 31, the terminal device 2*i* permits to receive the signal and stores image data included in the signal in the image storage unit 9. If the camera address information coincides with no piece of permitted camera address information stored in the permitted camera address storage unit 31, the terminal device 2*i* refuses to receive the signal and image data included in the signal is not stored in the image storage unit 9.

Next, the respective operations of the digital camera 1*i* and terminal device 2*i* are described.

In this example, as in the first preferred embodiment, a shooter shoots a person that carries the terminal device 2*i* being an object, using the digital camera 1*i* (souvenir picture) and requests a printing company to print desired shooting image data via the terminal device 2*i*.

Figure 20:
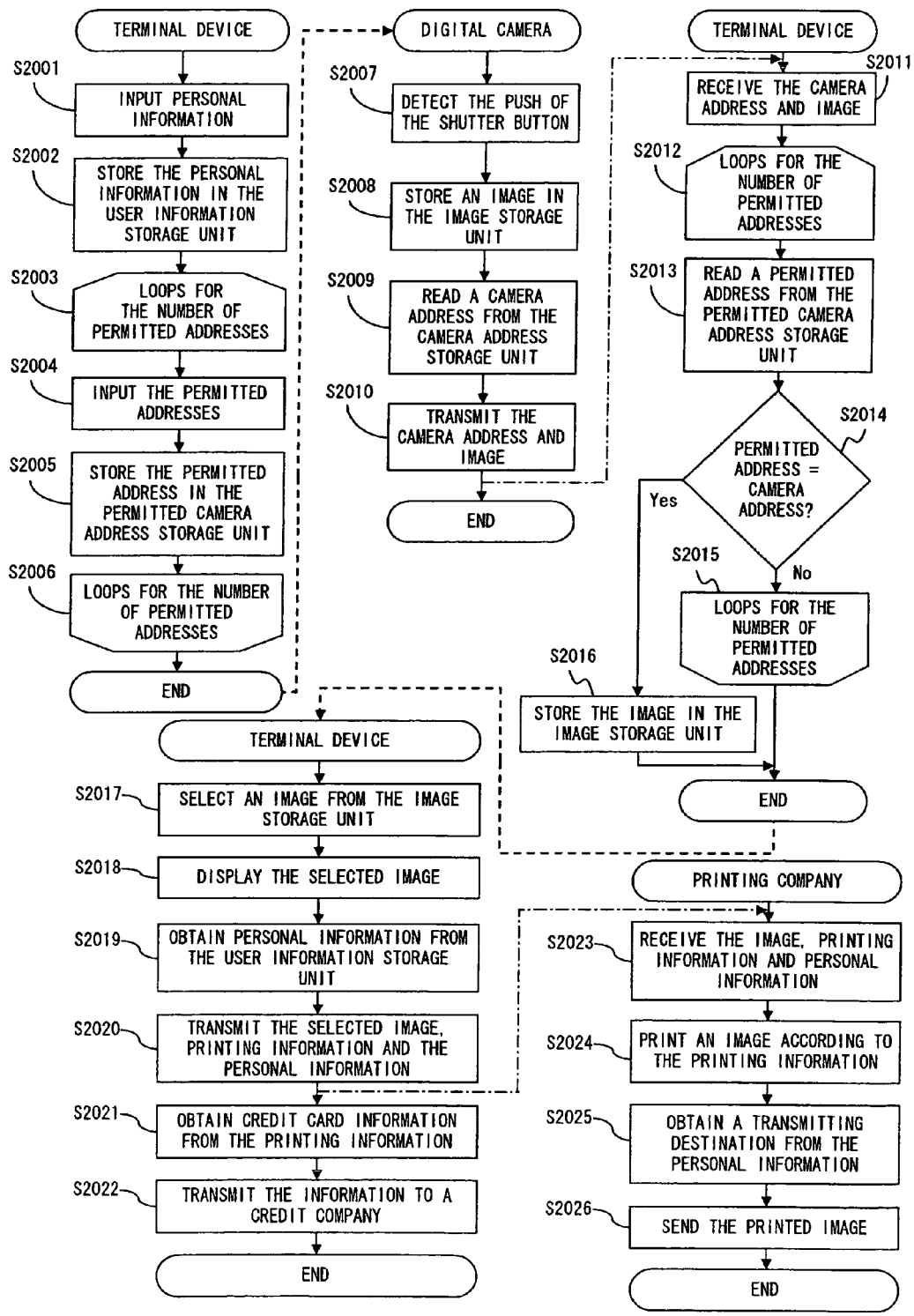
FIG. 20 is a flowchart showing the operations of the digital camera and portable information terminal device of the tenth preferred embodiment.

FIG. 20 is a flowchart showing the operations of the digital camera 1*i* and terminal device 2*i* in such a case.

In FIG. 20, processes in S2007 through S2010 are the operations of the digital camera 1*i*, those in S2001 through S2006, S2011 through S2016 and S2017 through S2022 are those of the terminal device 2*i* and those in S2023 through S2026 are those of the image printing system of the printing company, which is not shown in FIG. 19.

Firstly, the processes in S2001 through S2006 of the terminal device 2*i*, in which personal information (information about the name and address of a user), print requester destination information and a permitted camera address are inputted to the terminal device 2*i*, are performed. In S2001 and S2002, the same processes in S1001 and S1002 of FIG. 10 are performed. Then, in S2003 through 2006, the same processes in S1803 through S1806 of FIG. 18 are performed.

Then, the processes in S2007 through S2010 of the digital camera 1*i*, in which a shooter shoots a person being an object, and those in S2011 through S2016 of the terminal device 2*i* are performed.

Firstly, in the digital camera 1*i*, in S2007 through S2010, the same processes in S1807 through S1810 of FIG. 18 are performed.

Then, in the terminal device 2*i*, in S2011 through S2016, the same processes in S1811 through S1816 of FIG. 18 are performed.

In this case, the number of shots can be one or more. If a digital camera with the permitted camera address takes a plurality of shots, a plurality of pieces of image data is stored in the image storage unit 9.

After shooting, the processes in S2017 through S2022 of the terminal device 2*i*, a person being an object (user of the terminal device 2*i*) requests for its printing, are performed. In S2017 through S2022, the same processes as in S1008 through S1013 of FIG. 10 are performed.

However, in the printing company, the processes in S2023 through S2026 of the image printing system are performed. In S2023 through S2026, the same processes in S1014 through S1017 of FIG. 10 are performed. Thus, the printed images reach the address of the user of the terminal device 2*i* later.

Thus, if the address of a digital camera whose signals are desired to receive is registered in advance in the terminal device 2*i* as a permitted camera address, signals transmitted by the digital camera are allowed to receive, and those transmitted by any digital camera other than the digital camera are refused to receive. Thus, only image data included in a signal that is permitted to receive is stored in the image storage unit 9.

As described above, according to the information system of the tenth preferred embodiment, a terminal device can receive only signals transmitted by a specific digital camera, and only its image data can be specified as one to be printed.

Next, the information system including the digital camera and portable information terminal device in the eleventh preferred embodiment of the present invention is described.

Although in the information system of the fifth preferred embodiment (see FIG. 9), image printing is requested by a terminal device, in the information system of this preferred embodiment, the printing is requested by a device installed on a street or the like, like a so-called "photo-KIOSK" (imaging system terminal device in this preferred embodiment) (hereinafter simply called "imaging system terminal").

Figure 21:
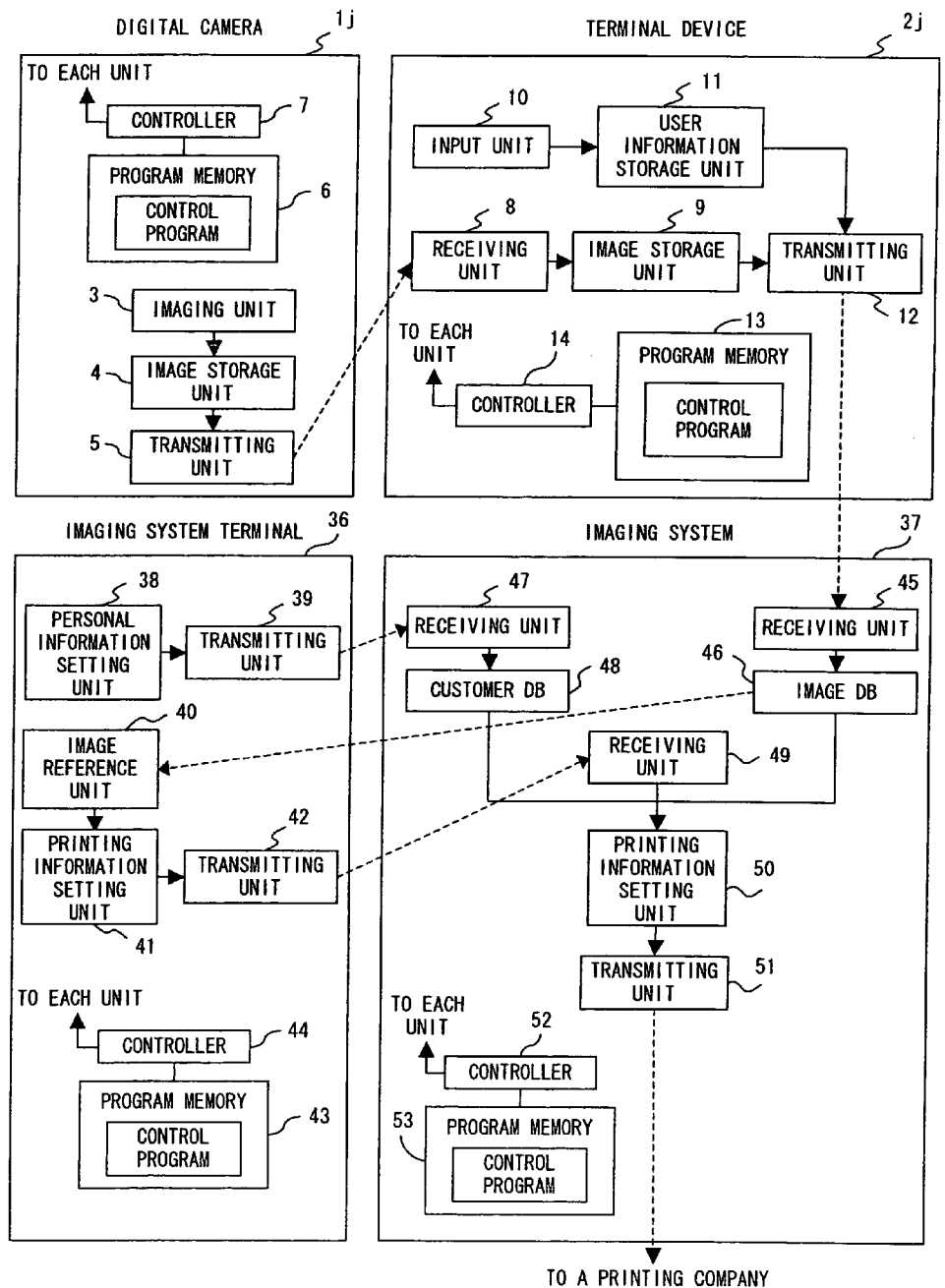
FIG. 21 shows an example of the configurations of the digital camera, portable information terminal device, imaging system terminal device and an imaging system which are included in the information system of the eleventh preferred embodiment.

FIG. 21 shows an example of the configurations of the digital camera, portable information terminal device, imaging system terminal device and an imaging system which are included in the information system of the eleventh preferred embodiment.

In FIG. 21, a digital camera 1*j* and a terminal device 2*j* have the same configurations of the digital camera 1 and terminal device 2, respectively, of the first preferred embodiment (see FIG. 1). However, in the terminal device 2*j*, the user information storage unit 11 stores information about a user ID, according to a user instruction to input a user ID. This user ID is user identification information for identifying a user and is used when in an imaging system 37, which is described later, obtaining information about the name and address of a customer (a user) stored in the customer DB 48 and when in an imaging system terminal 36, which is described later, the image data of an image, which can be referenced by an image reference unit 40 is obtained from the image DB 46 of the imaging system 37. The user information storage unit 11 stores imaging system address information about the address of the imaging system 37 as transmitting destination information (transfer destination information). The transmitting unit 12 of the terminal device 2*j* transmits a signal including the image data stored in the image storage unit 9 and the user ID information stored in the user information storage unit 11 to the address of the imaging system address information stored in the user information storage unit 11.

However, the imaging system terminal device 36 comprises a personal information setting unit 38 for setting information about the name and address of a user and an user ID (called personal information), according to the user's instruction to input the name and address of a user and an user ID, a transmitting unit 39 for wirelessly transmitting a signal including the personal information set by the personal information setting unit 38 to the imaging system 37, an image reference unit 40 for enabling the reference of the image by displaying the image of the image data related to the user ID which is stored in the image DB 46 of the imaging system 37, according to the user's input of the user ID, a printing information setting unit 41 for setting printing information including the discrimination ID of the image data of an image selected from images, which can be referenced by the image reference unit 40, as a print target, the print settings of the image (a print size, the number of prints, etc.) and the above-described user ID, according to the user's input instruction, a transmitting unit 42 for wirelessly transmitting the signal including the printing information set by the printing information setting unit 41 to the imaging system 37, program memory 43 for storing a control program for controlling the operation of the imaging system terminal 36, a controller (CPU) 44 for controlling the entire imaging system terminal 36 by reading and executing the control program stored in the program memory 43 and the like. The image data of the image, the reference of which the above-described image reference unit 40 is transmitted from the imaging system 37.

In this example, since the settlement of a printing cost with a printing company for printing the image is made via a credit company, the printing information set by the above-described printing information setting unit 41 includes credit card information (settlement information) about the credit card number of the credit company also instructed to input at the time of the user's print instruction.

The imaging system terminal 36 with such a configuration is, for example, installed in a so-called "photo-KIOSK" on the street or the like.

The imaging system 37 comprises a receiving unit 45 for receiving the signal including the image data and user ID information that are transmitted by the transmitting unit 12 of the terminal device 2j, an image DB 46 for relating the image data to the user ID information that are included in the signal received by the receiving unit 45, attaching discrimination ID to the image data in order to identify it and storing the image data, a receiving unit 47 for receiving the signal including the personal information transmitted by the transmitting unit 39 of the imaging system terminal 36, a customer database (DB) 48 for storing the personal information included in the signal received by the receiving unit 47, a receiving unit 49 for receiving the signal including the printing information transmitted by the transmitting unit 42 of the imaging system terminal 36, a printing information setting unit 50 for setting the image data read from the image DB 46 according to the discrimination ID of the image data, print setting information of the image of the image data and information about the name and address of a user read from the customer DB 48 according to the user ID, based on the printing information received by the receiving unit 49, as a requested printing information, a transmitting unit 51 for transmitting the requested printing information set by the printing information setting unit 50 to a printing company, program memory 52 for storing a control program for controlling the operation of the imaging system 37, a controller (CPU) 53 for controlling the operation of the entire imaging system 37 by reading and executing the control program stored in the program memory 52 and the like.

The imaging system 37 with such a configuration is, for example, installed in the vicinity of the above-described imaging system terminal 36 or a remote place.

Next, the respective operations of the digital camera 1j, terminal device 2j, imaging system terminal 36 and imaging system 37 are described.

In this example, as in the first preferred embodiment, a shooter shoots a person being an object that carries the terminal device 2j (souvenir picture), using the digital camera 1j and requests a printing company to print desired shooting image data, via the imaging system terminal 36.

Figure 22:
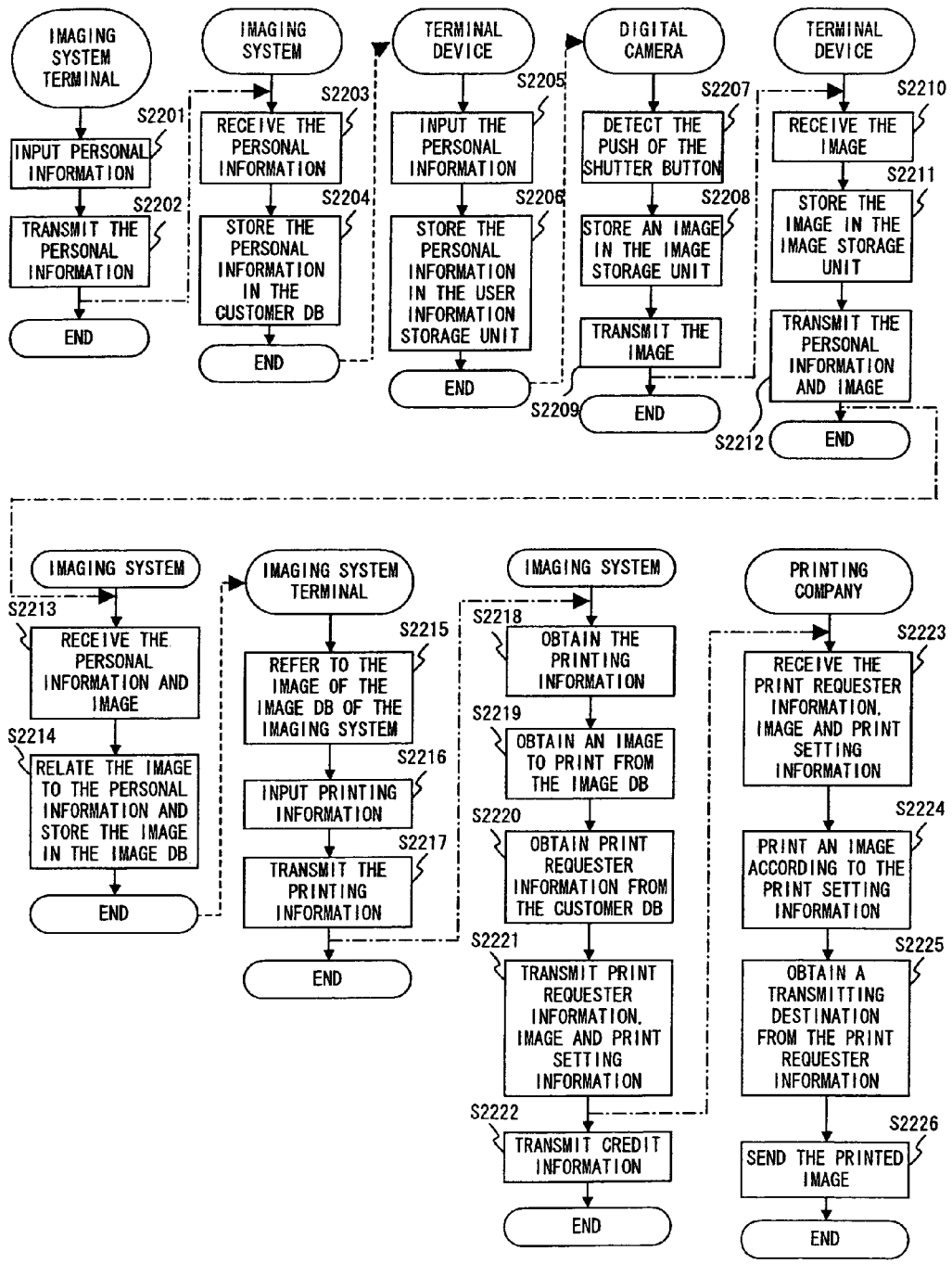
FIG. 22 is a flowchart showing the operations of the digital camera, portable information terminal device, imaging system terminal device and imaging system of the eleventh preferred embodiment.

FIG. 22 is a flowchart showing the operations of the digital camera 1j, terminal device 2j, imaging system terminal 36 and imaging system 37.

In FIG. 22, processes in S2207 through S2209 are the operations of the digital camera 1j, those in S2205, S2206 and S2210 through S2212 are those of the terminal device 2j, those in S2201, S2202 and S2215 through S2217 are those of the imaging system terminal 36, those in S2203, S2204, S2213, S2214 and S2218 through S2222 are those of the imaging system 37 and those in S2223 through S2226 are those of the image printing system, which is not shown in FIG. 21, of the printing company.

Firstly, the processes in S2201 and S2202 of the imaging system terminal 36, in which personal information (information about the name, address and ID of a user) are inputted to the imaging system terminal 36 are performed. In S2201, the personal information setting unit 38 sets the personal information of the name, ID and address of a user, according to the instruction to input the name and address of a user and a user ID of a person requesting to print (the user of the terminal device 2j). In S2202, the transmitting unit 39 transmits a signal including the personal information set in S2201 to the imaging system 37.

Then, the processes in S2203 and S2204 of the imaging system 37, in which the personal information is registered in the imaging system 37, are performed. In S2203, the receiving unit 47 receives the signal including the personal information transmitted by the transmitting unit 39 of the imaging system terminal 36. In S2204, the customer DB 48 stores the personal information included in the signal that is received in S2203.

Then, the processes in S2205 and S2206 of the terminal device 2j, in which personal information (user ID) is inputted to the terminal device 2j, are performed. In S2205, the input unit 10 inputs the personal information of the user ID, according to the instruction to input the user ID (the same user ID as instructed to input in S2201) of the user of the terminal device 2j. In S2206, the user information storage unit 11 stores the personal information inputted in S2205.

Then, the processes in S2207 through S2209 of the digital camera 1j, in which a shooter shoots a person being an object, those in S2210 through S2212 of the terminal device 2j and those in S2213 and S2214 of the imaging system 37 are performed.

Firstly, in the digital camera 1j, in S2207 through S2209, the same processes as in S203 through S205 of FIG. 2 are performed.

Then, in the terminal device 2j, in S2210 and S2211, the same processes as in S206 and S207 of FIG. 2 are performed. In S2212, the transmitting unit 12 transmits the image data stored in the image storage unit 9 in S2211 and the personal information (user ID) stored in the user information storage unit 11 in S2206 to the address of the imaging system 37 of the imaging system address information stored in the user information storage unit 11.

Then, in the imaging system 37, in S2213, the receiving unit 45 receives a signal including the image data and personal information (user ID) that are transmitted by the transmitting unit 12 of the terminal device 2j. In S2214, the image data and personal information (user ID) included in the signal received in S2213 are related to each other, and discrimination ID is attached to the image data. Then, the image DB 46 stores them.

The number of shots can be one or more. If a plurality of shots is taken, the image DB 46 stores a plurality of pieces of image data.

After shooting, the processes in S2215 through S2217 of the imaging system terminal 36, in which a person being an object (the user of the terminal device 2i) requests for its printing, and those in S2218 through S2222 of the imaging system 37 are performed.

Firstly, in the imaging system terminal 36, in S2215, the user ID is transmitted to the imaging system 37 by a user inputting it and the like, the imaging system 37 transmits the image data related to the user ID and the discrimination ID of the image data that are read from the image DB 46 to the imaging system terminal 36 and the image can be referenced by the image reference unit 40 by displaying an image represented by the image data or so on. If a plurality of pieces of image data is related to the user ID and stored in the image DB 46, all the images represented by them can be referenced. In S2216, the printing information setting unit 41 sets printing information including the discrimination ID of the image data of the image selected from images which can be made to refer in S2215 as a print target, the print setting information (such as a print size, the number of prints, etc.) of the image, the user ID information, the credit card information of the user and the like, according to a user's instruction to select an image to be printed and to input print settings, a user ID, a credit card number and the like. In S2217, the transmitting unit 41 transmits the printing information set in S2216 to the imaging system 37.

Then, in the imaging system 37, in S2218, the receiving unit 49 receives the printing information transmitted by the transmitting unit 42 of the imaging system terminal 36 and obtains the printing information. In S2219, image data corresponding to the discrimination ID of the image data included in the printing information obtained in S2218 is read from the image DB 46. In S2220, information about the name and address of a user being a print requester information (personal information) corresponding to the user ID included in the printing information obtained in S2218 is read from the customer DB 48. In S2221, the printing information setting unit 50 sets the print requester information read in S2220, the image data read in S2219 and the printing setting information included the printing information obtained in S2218 as printing information for requesting the printing company to print it, and the transmitting unit 51 transmits a signal including the printing information for requesting the printing company to print it to the image printing system of the printing company. In S2222, the credit card information included in the printing information that is obtained in S2218 is transmitted to the credit card company.

In the printing company, the processes in S2223 through S2226 of the image printing system are performed. In S2223, the signal including the printing information of print request transmitted by the imaging system terminal 36 is received. In S2224, using the image data and printing setting information included in the signal that is received in S2223, an image represented by the image data is printed according to the print setting information. In S2225, information about the name and address being the transmitting destination of the printed image is obtained from the print requester information included in the signal received in S2223. In S2226, the printed image is sent to the name and address of the information obtained in S2225. Thus, the printed image is delivered to the address of the user of the terminal device 2j later. The printing company settles the printing cost via the credit company.

As described above, by inputting personal information via imaging system terminal 36, the personal information is registered in the customer DB 48 of the imaging system 37. By shooting by the digital camera 1j, obtained image data is stored in the image DB 46 of the imaging system 37 via the terminal device 2j. By instructing the selection of desired image data to be printed, the input of the printing setting of the image data and so on, a request to print the image is made for a printing company.

As described above, according to the information system of the eleventh preferred embodiment, a person being an object can easily request to print a desired image obtained by shooting via the imaging system terminal 36 installed on the street or the like. Since personal information is stored in the customer DB 48, a person which manages an imaging system can easily collect customer information.

Next, the information system including the digital camera and portable information terminal device in the twelfth preferred embodiment of the present invention is described. The information system of this preferred embodiment can be configured by replacing the digital camera 1j and terminal device 2j in the information system of the eleventh preferred embodiment (see FIG. 21) with the digital camera 1c and terminal device 2c of the information of the fourth preferred embodiment (see FIG. 7).

Figure 23:
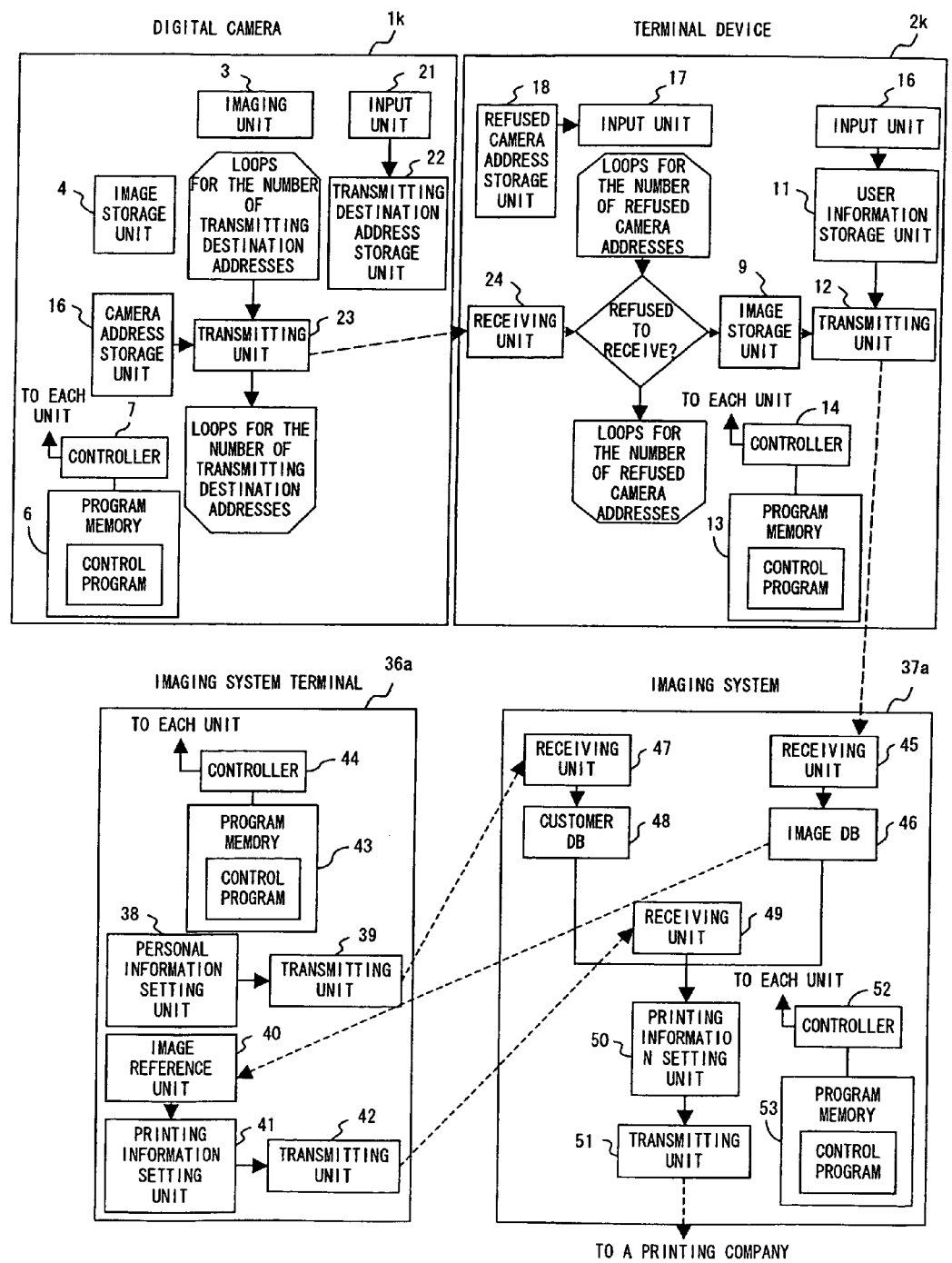
FIG. 23 shows an example of the configurations of the digital camera, portable information terminal device, imaging system terminal device and an imaging system which are included in the information system of the twelfth preferred embodiment.

FIG. 23 shows an example of the configurations of the digital camera, terminal device, imaging system terminal and an imaging system which are included in the information system of the twelfth preferred embodiment.

In FIG. 23, the digital camera 1k and terminal device 2k are the same as the digital camera 1c and terminal device 2c of the fourth preferred embodiment (see FIG. 7). However, in the terminal device 2k, the user information storage unit 11 stores its user ID information, according to a user's instruction to input its user ID. The user information storage unit 11 stores imaging system address information about the address of an imaging system 37a as transmitting destination information (transfer destination information). The transmitting unit 12 of the terminal device 2k transmits a signal including the image data stored in the image storage unit 9 and the user ID information stored in the user information storage unit 11 to the address in the imaging system address information stored of the user information storage unit 11.

However, an imaging system terminal 36a and an imaging system 37a have the same configurations as the imaging system terminal 36 and imaging system 37, respectively, of the eleventh preferred embodiment (see FIG. 21).

Next, the respective operations of the digital camera 1k, terminal device 2k, imaging system terminal 36a and imaging system 37a are described.

In this example, as in the third preferred embodiment, a shooter shoots a person being an object (souvenir picture), using the digital camera 1k and requests a printing company to print desired shooting image data, via the imaging system terminal 36a.

Figure 24:
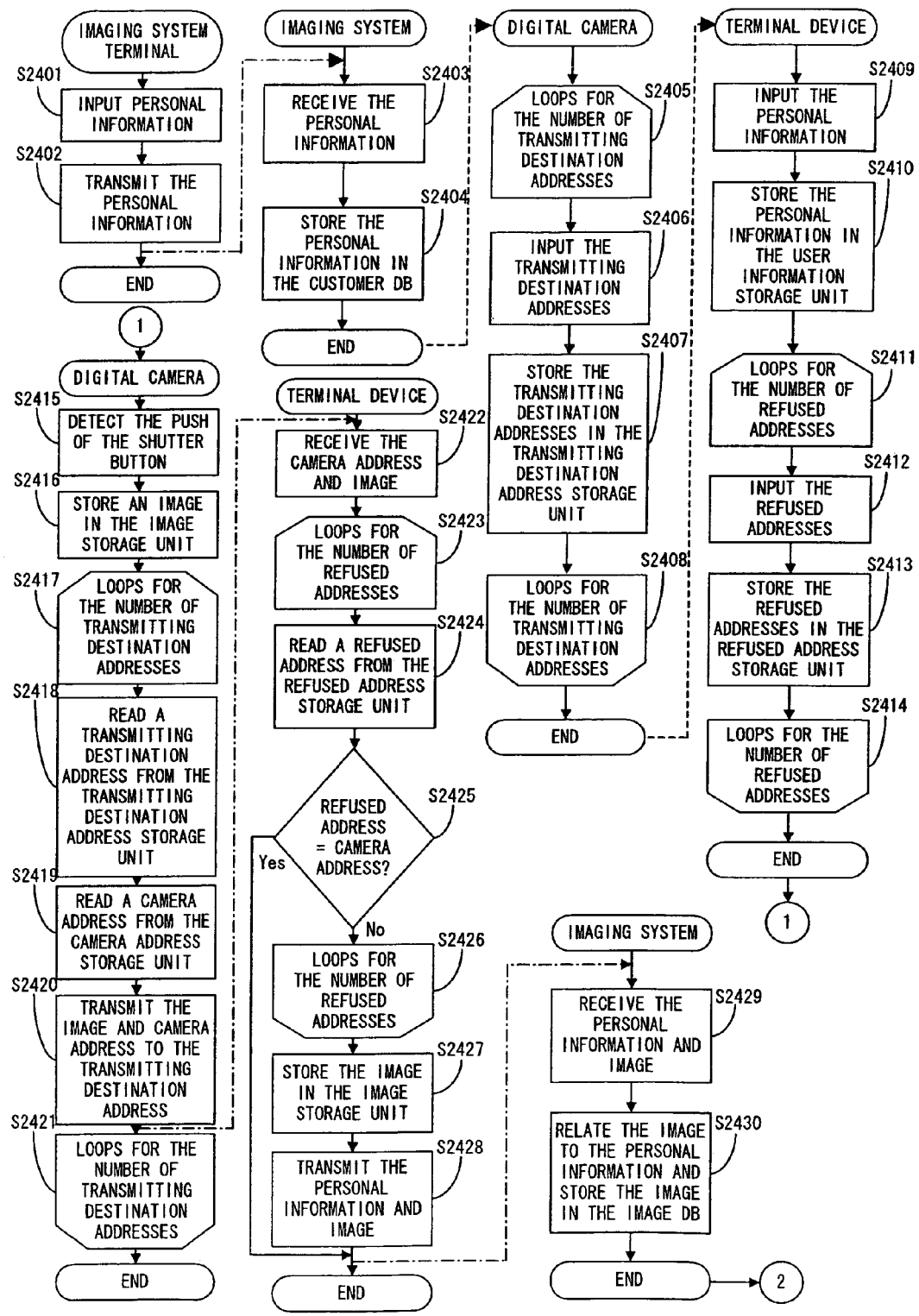
FIG. 24 is a flowchart showing the operations of the digital camera, portable information terminal device, imaging system terminal device and imaging system of the twelfth preferred embodiment (No. 1).
Figure 25:
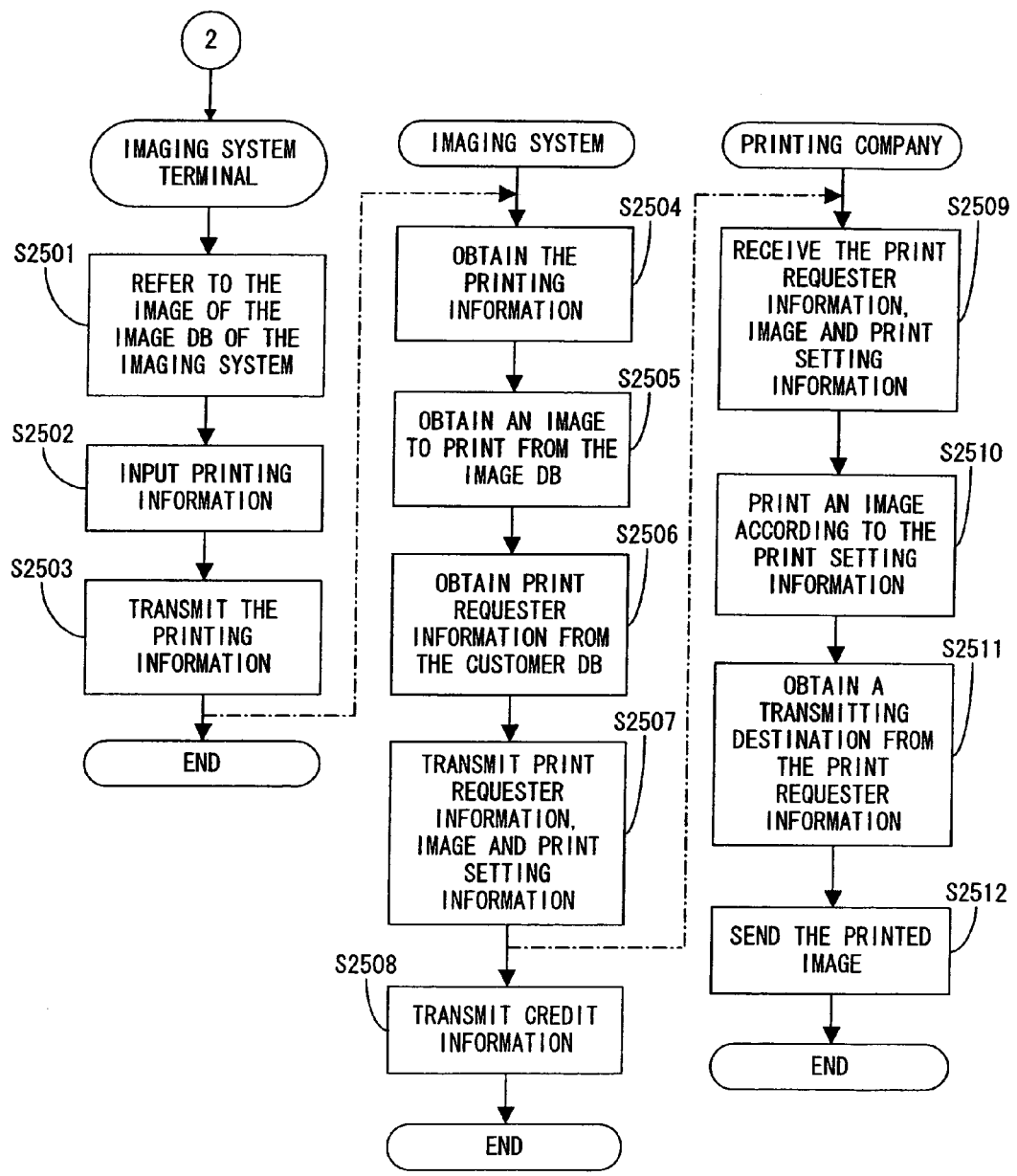
FIG. 25 is a flowchart showing the operations of the digital camera, portable information terminal device, imaging system terminal device and imaging system of the twelfth preferred embodiment (No. 2).

FIGS. 24 and 25 are flowcharts showing the operations of the digital camera 1k, terminal device 2k, imaging system terminal 36a and imaging system 37a in such a case.

In FIGS. 24 and 25, processes in S2405 through S2408 and S2415 through S2421 are the operations of digital camera 1k, those in S2409 through S2414 and S2422 through S2428 are those of the terminal device 2k, those in S2401, S2402 and S2501 through S2503 are those of the imaging system terminal 36a, those in S2403, S2404, S2429, S2430 and S2504 through S2508 are those of the imaging system 37a and those in S2509 through S2512 are those of the image printing system, which is not shown in FIG. 23, of a printing company.

Firstly, the processes in S2401 and S2402 of the imaging system terminal 36a, in which personal information (information about the name, address and ID of a user) is inputted to the imaging system terminal 36a), are performed. In S2401 and S2402, the same processes as in S2201 and S2202 of FIG. 22 are performed.

Then, the processes in S2403 and S2404 of the imaging system 37a, in which the personal information is registered in the imaging system 37a, are performed. In S2403 and S2404, the same processes as in S2203 and S2204 of FIG. 22 are performed.

Then, the processes in S2405 through S2408 of the digital camera 1k, in which a transmitting destination address is inputted to the digital camera 1k, are performed. In S2405 through S2408, the same processes as in S801 through S804 of FIG. 8 are performed.

Then, the processes in S 2409 through S2414 of the terminal device 2k, in which the personal information and a refused camera address are inputted to the terminal device 2k, are performed. Firstly, in S2409 and 2410, the same processes as in S2205 and S2206 of FIG. 22 are performed. In S2411 through S2414, the same processes as in S807 through S810 of FIG. 8 are performed.

Any of the processes in S2401 and S2402, and S2403 and S2404 of the imaging system terminal 36a and imaging system 37a, respectively, those in S801 through S804 of the digital camera 1k and those in S805 through S 910 of the terminal device 2k can be performed first. Alternatively, they can be performed in parallel.

Then, the processes in S 2415 through S2421 of the digital camera 1k, in which a shooter shoots a person being an object, those in S2422 through S2428 of the terminal device 2k and those in S2429 and S2430 of the imaging system 37a are performed.

Firstly, in the digital camera 1k, in S2415 through S2421, the same processes as in S811 through S817 of FIG. 8 are performed.

Then, in the terminal device 2k, in S2422 through S2427, the same processes as in S818 through S823 of FIG. 8 are performed. In S2428, the same process as in S2212 of FIG. 22 is performed.

Then, in the imaging system 37a, in S2429 and S2430, the same processes as in S2213 and 2214 of FIG. 22 are performed.

In this case, the number of shots can be one or more. If a plurality of shots is taken, the image DB 46 stores a plurality of pieces of image data.

After shooting, the processes in S2501 through S 2503 of the imaging system terminal 36a, in which a person being an object (the user of the terminal device 2k) requests for its printing, and those in S2504 through S2508 of the imaging system 37a are performed.

Firstly, in the imaging system terminal 36a, in S2501 through S2503, the same processes as in S2215 through S2217 of FIG. 22 are performed.

Then, in the imaging system 37a, in S2504 through S2508, the same processes as in S2218 through S2222 of FIG. 22 are performed.

In the printing company, the processes in S2509 through S2512 of the image printing system are performed. In S2509 through S2512, the same processes as in S2223 through S2226 of FIG. 22 are performed. Thus, the printed image is delivered to the address of the user of the terminal device 2k later.

Thus, by registering in advance a transmitting destination address being the transmitting destination of image data in the digital camera 1k, a signal including the image data is wirelessly transmitted from the digital camera 1k only to the transmitting destination address. By registering in advance the address of a digital camera whose signals are not desired to receive in the terminal device 2k as a refused camera address, a signal from the digital camera is refused to receive and only a signal transmitted by a digital camera other than the digital camera are allowed to receive, and only the image data included in the signal allowed to receive is stored in the image DB 46 of the imaging system 37a.

As described above, according to the information system of the twelfth preferred embodiment, a digital camera can transmit image data only to a specific terminal device, and a terminal device cannot receive image data transmitted by the specific digital camera. Thus, only image data included in a signal which is addressed to the relevant terminal device and which is allowed to receive can be made a print target.

Next, the information system including the digital camera and portable information terminal device in the thirteenth preferred embodiment of the present invention is described. In the information system of this preferred embodiment, a terminal device stores image data obtained by shooting, then the terminal device is electrically connected to an imaging system terminal by a communication cable and its printing is requested for a printing company via the imaging system terminal.

FIG. 26 shows an example of the configurations of the digital camera, portable information terminal device and terminal device which are included in the information system of the thirteenth preferred embodiment.

In FIG. 26, a digital camera 1l has the same configuration as the digital camera 1 of the first preferred embodiment (see FIG. 1).

A terminal device 2l can be obtained by deleting the input unit 10, user information storage unit 11 and transmitting unit 12 from the terminal device 2 of the first preferred embodiment. If image data stored in the image storage unit 9 is requested to print, the terminal device 2l is electrically connected to an imaging system terminal 36b via a communication cable and is used.

However, the imaging system terminal 36b comprises a printing information setting unit 56 sets printing information including image data selected from image data stored in the image storage unit 9 of the terminal device 2l connected to it via a communication cable as a print target, printing setting information (a print size, the number of prints, etc.) of an image represented by the image data and personal information (information about the name, address and credit card number, etc.), according to a user's input instruction, a transmitting unit 57 for wirelessly transmitting a signal including the printing information set by the printing information setting unit 56 to the image printing system, which is not shown in FIG. 26, of a printing company and the like.

The imaging system terminal 36b with such a configuration is installed in a so-called "photo-KIOSK" in the street or the like.

Next, the respective operations of the digital camera 1l, terminal device 2l and imaging system terminal 36b are described.

In this example, as in the first preferred embodiment, a shooter shoots a person being an object that carries the terminal device 2l (souvenir picture), using the digital camera 1l, and requests a printing company to print desired shooting image data via the imaging system terminal 36b.

Figure 27:
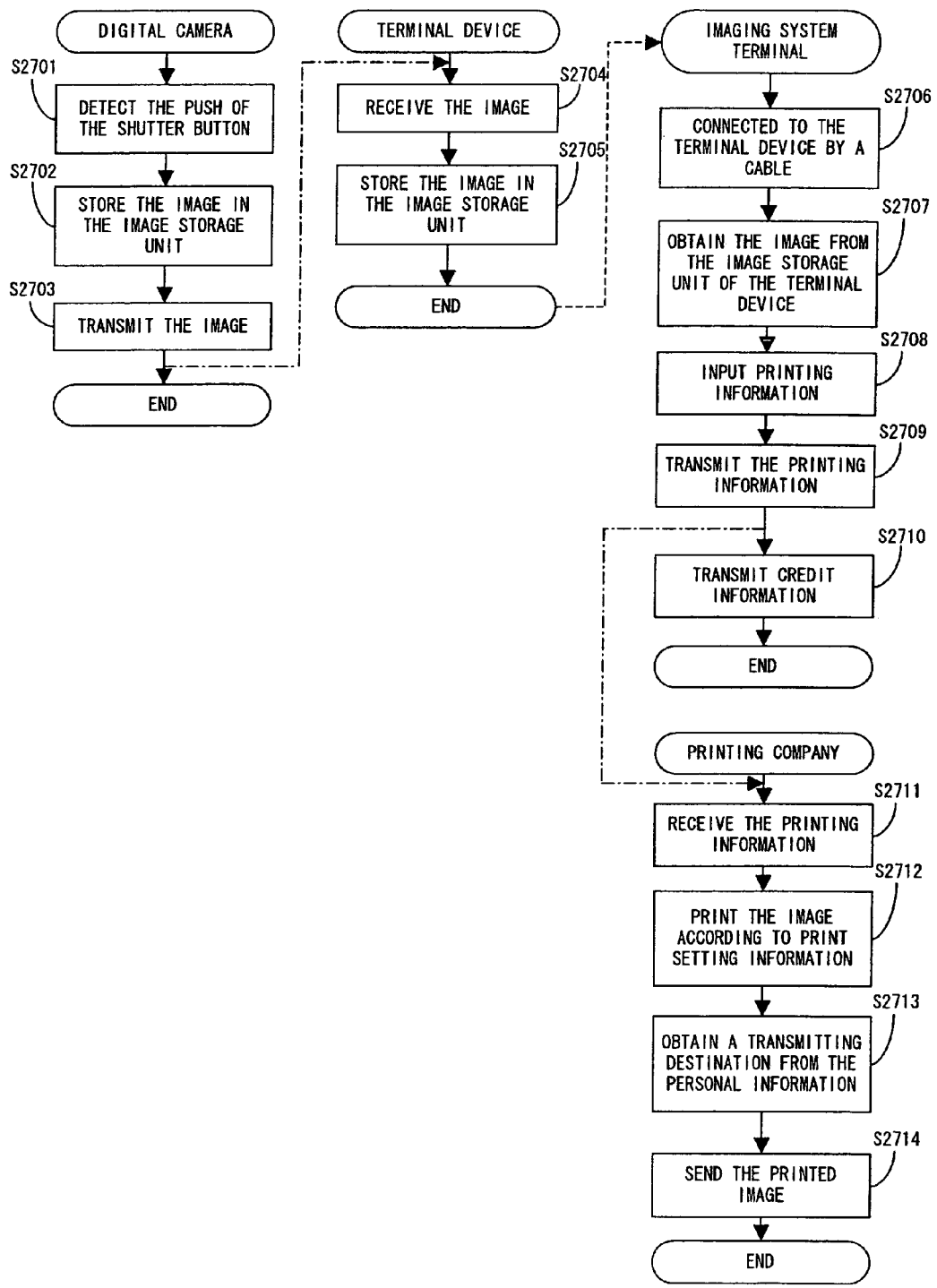
FIG. 27 is a flowchart showing the operations of the digital camera, portable information terminal device and imaging system terminal device of the thirteenth preferred embodiment.

FIG. 27 is a flowchart showing the operations of the digital camera 1l, terminal device 2l and imaging system terminal 36b in such a case.

In FIG. 27, processes in S2701 through S2703 are the operations of digital camera 1l, those in S2704 and S2705 are those of the terminal device 2l, those in S2706 through S2710 are those of the imaging system terminal 36b and those in S2711 through S2714 are those of the image printing system, which is not shown in FIG. 26, of a printing company.

Firstly, the processes in S2701 through S2703 of the digital camera 1l, in which a shooter shoots a person being an object, and those in S2704 and S2705 of the terminal device 2l are performed.

In the digital camera 1l, in S2701 through S2703, the same processes as in S203 through S205 of FIG. 2 are performed.

Then, in the terminal device 2l, in S2704 and S2705, the same processes in S206 and S207 of FIG. 2 are performed.

In this case, the number of shots can be one or more. If a plurality of shots is taken, the image DB 46 stores a plurality of pieces of image data.

After shooting, the processes in S2706 through S2710 of the imaging system terminal 36b, in which a person being an object (the user of the terminal device 2l) requests for its printing, are performed.

In the imaging system terminal 36b, in S2706, it is detected that the terminal device 2l is electrically connected to the imaging system terminal 36b by a user connecting the terminal device 2l to the imaging system terminal 36b by a communication cable. In S2707, image data stored in the image storage unit 9 of the terminal device 2l is obtained via the communication cable. In S2708, the printing information setting unit 56 sets image data to be printed, print setting information, personal information (information about the name and address) and credit card information as printing information, by the user's instruction to select the image data to be printed from the image data obtained in S2707, to input the print settings (a print size, the number of prints, etc.) of image data represented by the image data to be printed, to input the name and address of the user and to input the credit card number of the user. In S2709, the transmitting unit 57 transmits the printing information set in S2708 to the image printing system of the printing company. In S2710, the credit card number information inputted in S2708 is transmitted to the credit company.

In the printing company, the processes in S2711 through S2714 of the image printing system are performed. In S2711, the signal including the printing information, transmitted by the terminal device 2l in S2709 is received. In S2712, the image represented by the image data is printed according to the print setting information, using the image data and print setting information that are included in the signal received in S2711. In S2713, information about the name and address of the user being the transmitting destination of the printed image is obtained from the personal information included in the signal received in S2711. In S2714, the Printed image is sent to the name and address of the information obtained in S2713. Thus, the printed image is delivered to the address of the user of the terminal device 2l later. The printing company settles this printing cost via the credit company.

Thus, by shooting using the digital camera 1l, obtained image data is stored in the image storage unit 9 of the terminal device 2l. By selecting desired image data to be printed from image data stored in the image storage unit 9 and inputting the print settings of the image data and so on via the image system terminal 36b after connecting the terminal device 2l to the imaging system terminal 36b by a communication cable, the image is requested to print for the printing company.

As described above, according to the information system of the thirteenth preferred embodiment, a person being an object can easily request for the printing of desired taken image via an imaging system terminal installed on the street or the like after wire-connecting a terminal device to the imaging system terminal.

Next, the information system including the digital camera and portable information terminal device in the fourteenth preferred embodiment of the present invention is described. In the information system of this preferred embodiment, the information system of the fourth preferred embodiment (see FIG. 7) and the imaging system terminal of the thirteenth preferred embodiment (see FIG. 26) are combined.

FIG. 28 shows an example of the configurations of the digital camera, terminal device and imaging system terminal which are included in the information system of the fourteenth preferred embodiment.

In FIG. 28, a digital camera 1m has the same configuration as the digital camera 1c of the fourth preferred embodiment (see FIG. 7).

A terminal device 2m can be obtained by deleting the input unit 10, user information storage unit 11 and transmitting unit 12 from the terminal device 2c of the fourth preferred embodiment. When image data stored in the image storage unit 9 is requested to print, the terminal device 2m is electrically connected to an imaging system terminal 36c via a communication cable and is used.

However, the imaging system terminal 36c has the same configuration as the imaging system terminal 36b of the thirteenth preferred embodiment (see FIG. 26).

Next, the respective operations of the digital camera 1m, terminal device 2m and imaging system terminal 36c are described.

In this example, as in the third preferred embodiment, a shooter shoots a person being an object (souvenir picture), using the digital camera 1m, and requests a printing company to print desired shooting image data via the imaging system terminal 36c.

Figure 29:
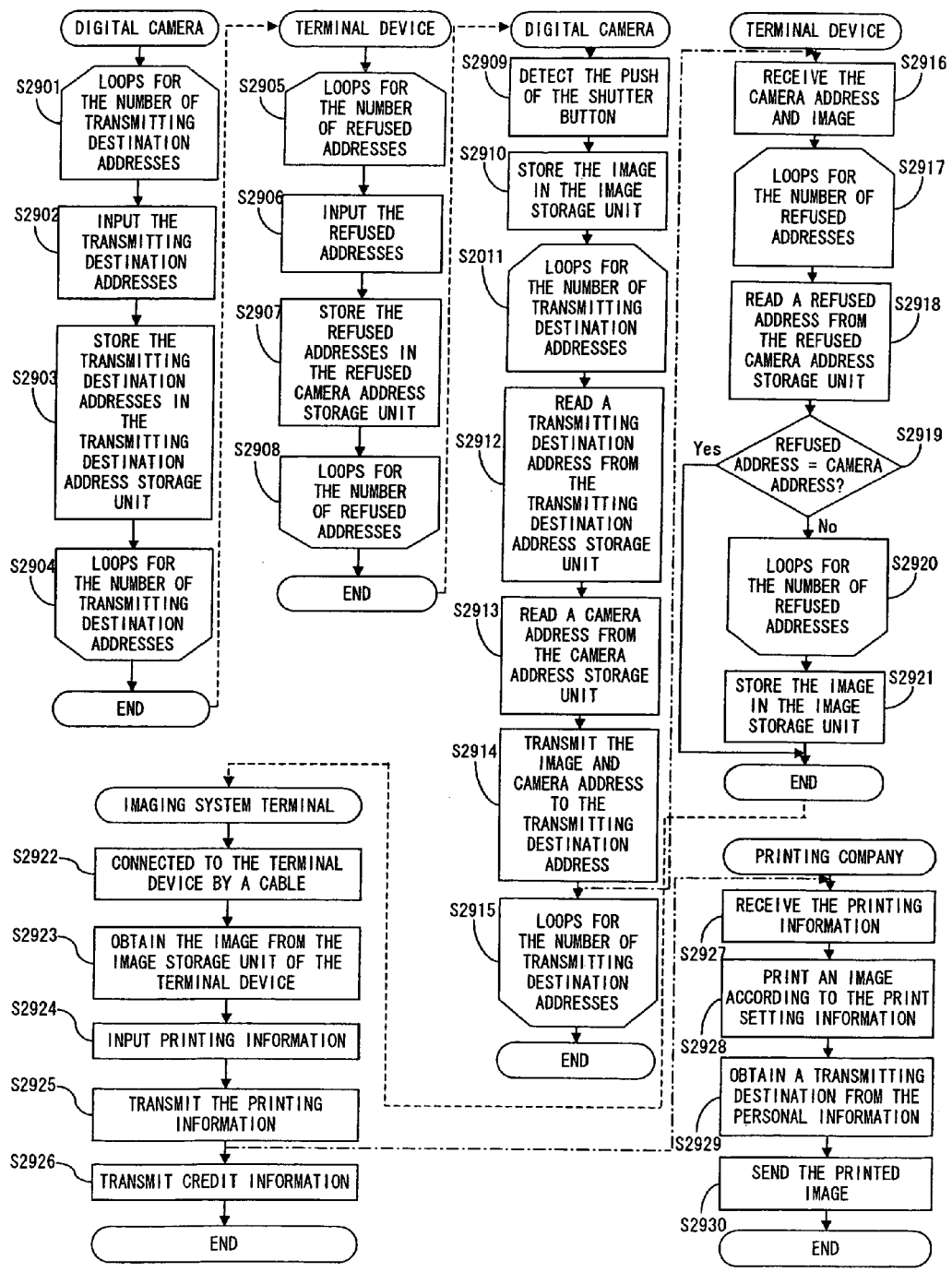
FIG. 29 is a flowchart showing the operations of the digital camera, portable information terminal device and imaging system terminal device of the fourteenth preferred embodiment.

FIG. 29 is a flowchart showing the operations of the digital camera 1m, terminal device 2m and imaging system terminal 36c in such a case.

In FIG. 29, processes in S2901 through S2904 and S2909 through S2915 are the operations of digital camera 1m, those in S2905 through S2008 and S2916 through S2921 are those of the terminal device 2m, those in S2922 through S2926 are those of the imaging system terminal 36c and those in S2927 through S2930 are those of the image printing system, which is not shown in FIG. 28, of a printing company.

Firstly, the processes in S2901 through S2904 of the digital camera 1m, in which a transmitting destination address is inputted to the digital camera 1m, and those in S2905 and S2908 of the terminal device 2m, in which a refused camera address is inputted to the terminal device 2m, are performed. Any of the processes in S2901 and S2904 of the digital camera 1m and those in S2905 through S2908 of the terminal device 2m can be performed first. Alternatively, they can be performed in parallel.

Firstly, in the digital camera 1m, in S2901 through S2904, the same processes as in S801 through S804 of FIG. 8 are performed.

Then, in the terminal device 2m, in S2905 through S2908, the same processes as in S807 through S810 of FIG. 8 are performed.

Then, the processes in S2909 through S2915 of the digital camera 1m, in which a shooter shots a person being an object, and those in S2916 through S2921 of the terminal device 2m are performed.

Firstly, in the digital camera 1m, in S2909 through S2915, the same processes as those in S811 through S817 of FIG. 8 are performed.

Then, in the terminal device 2m, in S2916 through S2921, the same processes as those in S818 through S823 of FIG. 8 are performed.

In this case, the number of shots can be one or more. If a plurality of shots is taken, the image storage unit 9 stores a plurality of pieces of image data.

After shooting, the processes in S2922 through S2926 of the imaging system terminal 36c, in which a person being an object (user of the terminal device 2m) requests for printing, are performed.

In the imaging system terminal 36c, in S2922 through S2926, the same processes as those in S2706 through S2710 of FIG. 27 are performed.

In the printing company, the processes in S2927 through S2930 of the image printing system are performed. In S2927 through S2930, the same processes as those in S2711 through S2714 of FIG. 27 are performed. Thus, the printed image is delivered to the address of the user of the terminal device 2m later.

Thus, by registering in advance a transmitting destination address being the transmitting destination of image data in the digital camera 1*m*, a signal including the image data is wirelessly transmitted only to the transmitting destination address. By registering in advance the address of a digital camera whose signal is not desired to receive in the terminal device 2*m* as a refused camera address, the signal from the digital camera is refused and a signal from a digital camera other than the digital camera is allowed to receive. Thus, only the image data allowed to receive is stored in the image storage unit 9.

As described above, according to the information system of the fourteenth preferred embodiment, a digital camera can transmit image data only to a specific terminal device, while a terminal device cannot receive image data from a specific digital camera. Thus, only image data included in a signal which is addressed to the terminal device and is transmitted from the digital camera other than the specific one can be targeted to print.

In this preferred embodiment, the terminal device 2*m* can also be configured by deleting the input unit 10, user information storage unit 11 and transmitting unit 12 from the terminal device 2*h* of FIG. 17 and by providing the receiving unit 24 (see FIG. 7) for receiving only signals wirelessly transmitted to the address of the terminal device, instead of the receiving unit 8. In this case, if a camera address included in a signal received by the receiving unit 24 is included in the permitted camera addresses stored in the permitted camera address storage unit 31, the signal can also be allowed to receive. If the camera address is not included in the permitted camera addresses, the signal can also be refused to receive.

Next, the information system including the digital camera and portable information terminal device in the fifteenth preferred embodiment of the present invention is described. In the information system of this preferred embodiment, the information system of the thirteenth preferred embodiment (see FIG. 26) and the above-described imaging system (see FIG. 21) are combined.

FIG. 30 shows an example of the configurations of the digital camera, terminal device, imaging system terminal and image system which are all included in the information system of the fifteenth preferred embodiment.

In FIG. 30, a digital camera 1*n*, a terminal device 2*n*, an imaging system terminal 36*d* have the same configurations as the digital camera 1*l*, terminal device 2*l* and imaging system terminal 36*b*, respectively of the thirteenth preferred embodiment (FIG. 26). However, the transmitting unit 57 of the imaging system terminal 36*d* transmits printing information set by a printing information setting unit 56 to an imaging system 37*c*.

The imaging system 37*c* differs from the imaging system 37 of the eleventh preferred embodiment (see FIG. 21) only in that it comprises a receiving unit 61 for receiving a signal including printing information transmitted by the transmitting unit 57 of the imaging system terminal 36*d*, an image DB 62 for storing image data obtained from the printing information which is included in a signal received by the receiving unit 61, a customer DB 63 for storing personal information (information about the name and address) obtained from the printing information which is included in the signal received by the receiving unit 61, a printing information setting unit 64 for setting printing information including the printing information included the signal received by the receiving unit 61 (or also including the printing information included image data stored in the image DB 62 and personal information stored in the customer DB 63) as printing information to be transmitted to a printing company and a transmitting unit 65 for transmitting the signal including the printing information set by the printing information setting unit 64 to the printing company, instead of the receiving units 45, 47 and 49, image DB 46, customer DB 48, printing information setting unit 50 and transmitting unit 51, respectively of the imaging system 37 of the eleventh preferred embodiment (see FIG. 21).

Next, the operations of the above-described digital camera 1*n*, terminal device 2*n*, imaging system terminal 36*d* and imaging system 37*c* are described.

In this example, as in the first preferred embodiment, a shooter shoots a person being an object (souvenir picture) using the digital camera 1*n* and then requests a printing company to print desired shooting image data, via the imaging system terminal 36*c*.

FIG. 31 shows an example of the configurations of the digital camera 1*n*, terminal device 2*n*, imaging system terminal device 36*d* and image system 37*c* in such a case.

In FIG. 31, processes in S3101 through S3103 are the operations of the digital camera 1*n*, those in S3104 and S3105 are those of the terminal device 2*n*, those in S3106 through S3109 are those of the imaging system terminal 36*d*, those in S3110 through S3112 are those of the imaging system 37*c* and those in S3113 through S3116 are those of the image printing system, which is not shown in FIG. 30, of the printing company.

Firstly, the processes in S3101 through S3103 of the digital camera 1*n*, in which a shooter shots a person being an object, and those in S3104 and S3105 of the terminal device 2*n* are performed.

Firstly, in the digital camera 1*n*, in S3101 through S3103, the same processes as those in S2701 through S2703 of FIG. 27 are performed.

Then, in the terminal device 2*n*, in S3104 and S3105, the same processes as those in S2704 and S2705 of FIG. 27 are performed.

In this case, the number of shots can be one or more. If a plurality of shots is taken, the image storage 9 stores a plurality of pieces of image data.

After shooting, the processes in S3106 through S3109 of the imaging system terminal 36*d*, in which a person being an object (user of the terminal device 2*n*) requests for printing and those in S3110 through S3112 of the imaging system 37*c*, are performed.

In the imaging system terminal 36*d*, in S3106 through S3108, the same processes as those in S2706 through S2708 of FIG. 27 are performed. In S3109, a signal including the printing information set in S3108 is transmitted to the imaging system 37*c*.

Then, in the imaging system 37*c*, in S3110, the signal transmitted by the imaging system terminal 36*d* is received by the receiving unit 61 and the printing information included in the signal is obtained. Image data and personal information are extracted from the printing information, and the image data and personal information are stored in the image DB 62 and the customer DB 63, respectively. In S3111, the printing information setting unit 64 sets the printing information obtained in S3110 as printing information to be transmitted to a printing company, and the transmitting unit 65 transmits the printing information to the image printing system of the printing company. In S3112, credit card information is extracted from the printing information obtained in S3110, and is transmitted to the credit company.

In the printing company, the processes in S113 through S3116 of the image printing system are performed. In S3113 through S3116, the same processes as those in S2711 through S2714 of FIG. 27 are performed. Thus, a printed image is delivered to the address of the user of the terminal device 2*n* later.

Thus, when printing is requested via the imaging system terminal 36*d* as described above, the signal transmitted by the imaging system terminal 36*d* is transmitted to the printing company via the imaging system 37*c*. In the imaging system 37*c*, the image data and personal information obtained from the printing information are stored in the image DB 62 and customer DB 63, respectively. Thus, printing information is transmitted from the imaging system terminal 36*d* to the imaging system 37*c*, and in the imaging system 37*c*, image data and personal information which are obtained from the printing information are stored in the image DB 62 and customer DB 63, respectively. Then, the printing information is transmitted to a printing company.

As described above, according to the information system of the fifteenth preferred embodiment, by transmitting printing information which is directly transmitted from an imaging system terminal to a printing company via an imaging system, personal information and image data included the printing information can be collected.

Next, the information system including the digital camera and portable information terminal device of the sixteenth preferred embodiment is described. In the information system of this preferred embodiment, the information system of the fourteenth preferred embodiment (see FIG. 28) and the imaging system of the fifteenth preferred embodiment (see FIG. 30) are combined.

Figure 32:
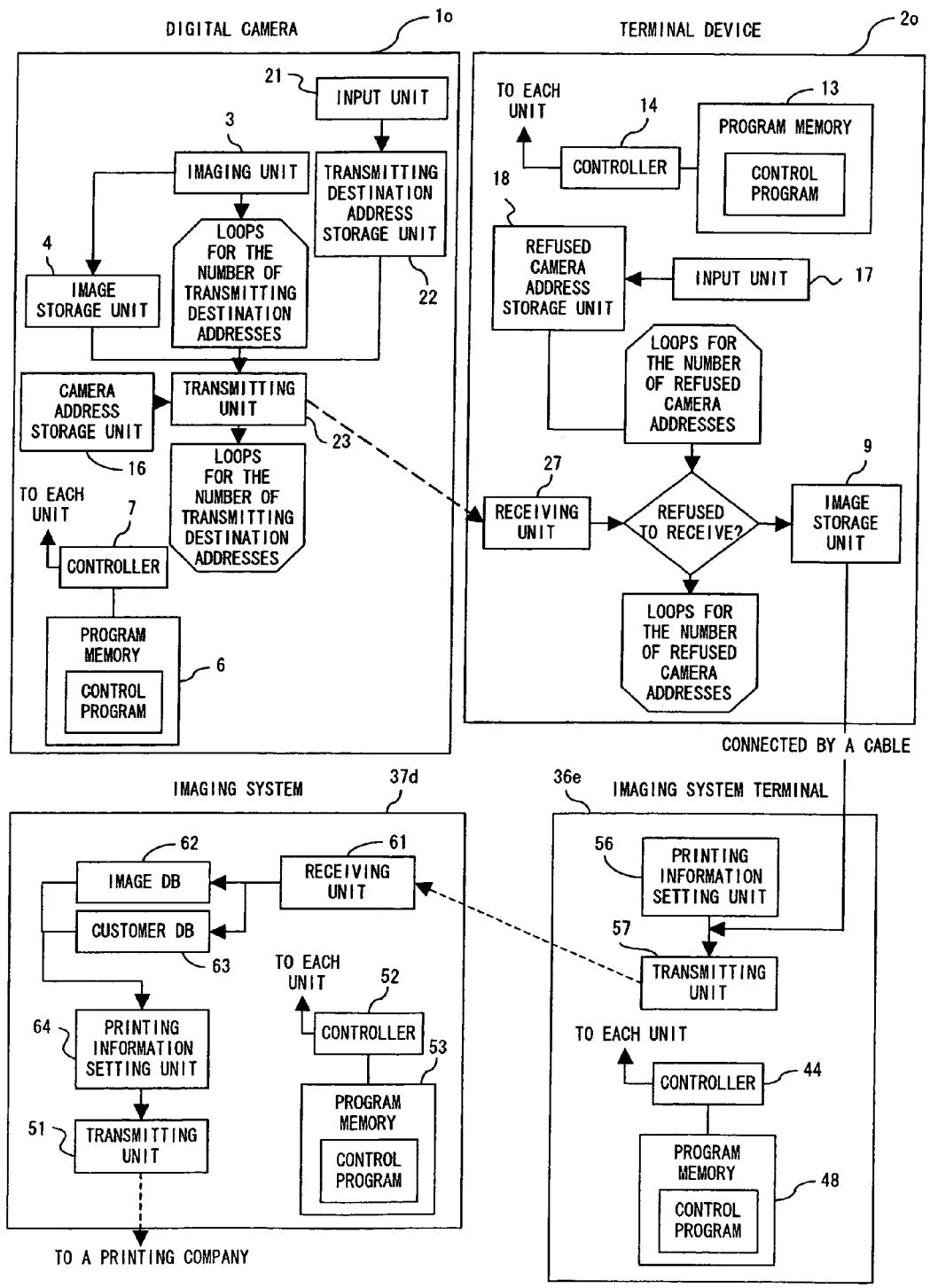
FIG. 32 shows an example of the configurations of the digital camera, portable information terminal device, an imaging system terminal device and imaging system which are included in the information system of the sixteenth preferred embodiment.

FIG. 32 shows an example of the configurations of digital camera, terminal device, imaging system terminal and imaging system included of the information system of the sixteenth preferred embodiment.

In FIG. 32, a digital camera 1*o*, terminal device 2*o* and imaging system terminal 36*e* has the same configurations as the digital camera 1*m*, terminal device 2*m* and imaging system terminal 36*c* of the fourteenth preferred embodiment (see FIG. 28). However, the transmitting unit 57 of the imaging system terminal 36*e* transmits printing information set by the printing information setting unit 56 to the imaging system 37*d*.

The imaging system 37*d* has the same configuration as the imaging system 37*c* of the fifteenth preferred embodiment (see FIG. 30).

Next, the operations of the digital camera 1*o*, terminal device 2*o*, imaging system terminal 36*e* and imaging system 37*d* are described.

In this case, as in the third preferred embodiment, a shooter shots a person being an object (souvenir picture), using the digital camera 1*o*, and requests a printing company to print desired shooting image data via the imaging system terminal 36*e*.

Figure 33:
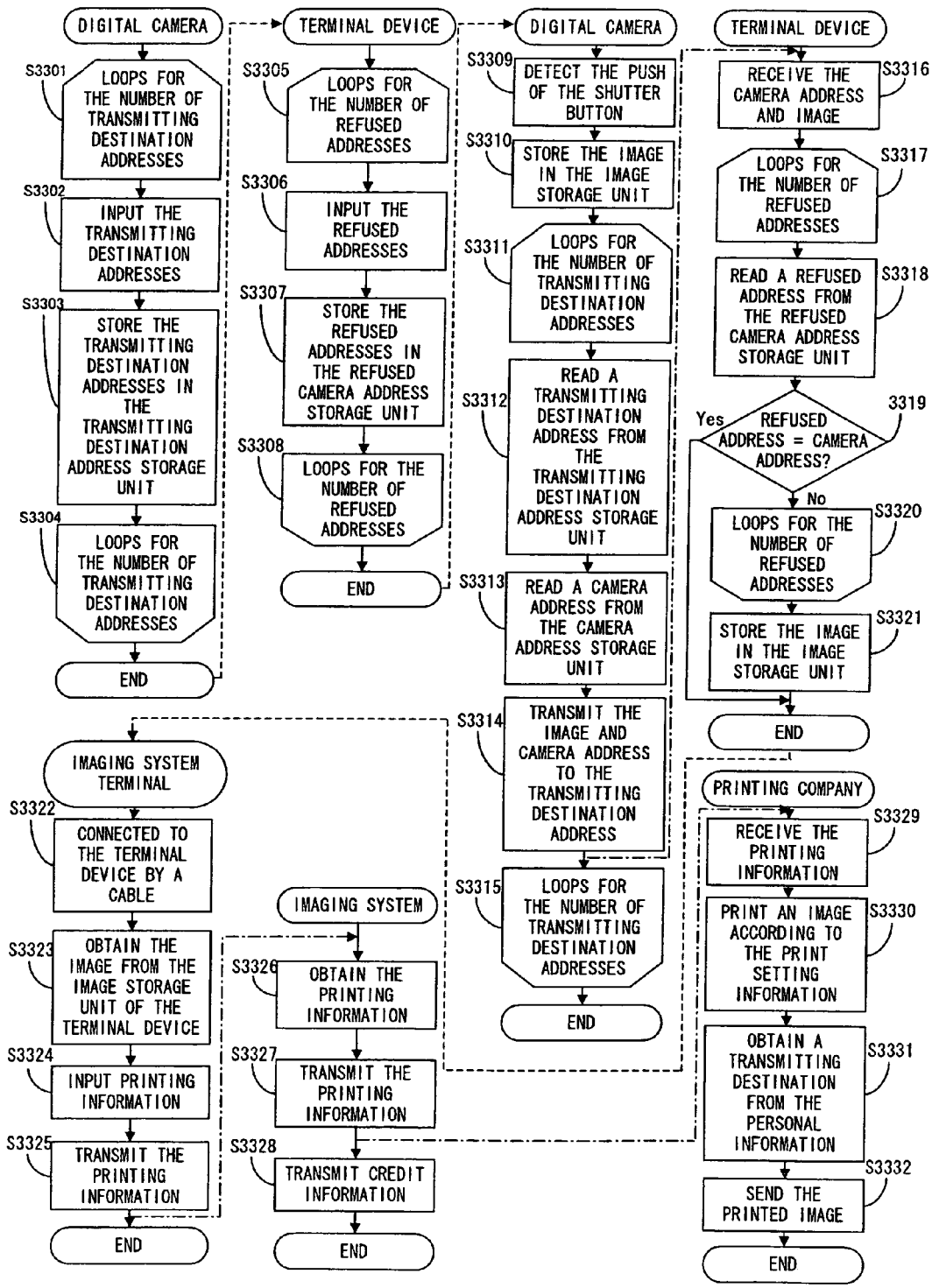
FIG. 33 is a flowchart showing the operations of the digital camera, portable information terminal device, imaging system terminal device and imaging system of the sixteenth preferred embodiment.

FIG. 33 is a flowchart showing the operations of the digital camera 1*o*, terminal device 2*o*, imaging system terminal 36*e* and imaging system 37*d* in such a case.

In FIG. 33, processes in S3301 through S3304 and S3309 through S3315 are the operations of the digital camera 1*o*, those in S3305 through S3308 and S3316 through S3321 are those of the terminal device 2*o*, those in S3322 through S3325 are those of the imaging system terminal 36*e*, those in S3326 through S3328 are those of the imaging system 37*d* and those in S3329 through S3332 are those of the image printing system, which is not shown in FIG. 32, of the printing company.

Firstly, the processes in S3301 through S3304 of the digital camera 1*o*, in which a transmitting destination address is inputted to the digital camera 1*o*, and those in S3305 through S3308 of the terminal device 2*o*, in which a refused camera address is inputted to the terminal device 2*o*, are performed. Any of the processes in S3301 through S3304 of the digital camera 1*o* and those in S3305 through S3308 of the terminal device 2*o* can be performed first. Alternatively, they can be performed in parallel.

Firstly, in the digital camera 1*o*, in S3301 through S3304, the same processes as those in S2901 through S2904 of FIG. 29 are performed.

Then, in the terminal device 2*o*, in S3305 through S3308, the same processes as those in S2905 through S2908 of FIG. 29 are performed.

Then, the processes in S3309 through S3315 of the digital camera 1*o*, in which a shooter shots a person being an object, and those in S3316 through S3321 of the terminal device 2*o* are performed.

Firstly, in the digital camera 1*o*, in S3309 through S3315, the processes as those in S2909 through S2915 of FIG. 29 are performed.

Then, in the terminal device 2*o*, in S3316 through S3321, the same processes as those in S2916 through S2921 of FIG. 29 are performed.

In this case, the number of shots can be one or more. In the case of a plurality of shots, a plurality of pieces of image data is stored in the image storage unit 9.

After shooting, the processes in S3322 through S3325 of the imaging system terminal 36*e*, in which a person being an object (user of the terminal device 2*o*) requests for printing, and those in S3326 through S3328 of the imaging system 37*d* are performed.

In the imaging system terminal 36*e*, in S3322 through S3325, the same processes as those in S3106 through S3109 of FIG. 31 are performed.

Then, in the imaging system 37*d*, in S3326 through S3328, the same processes as those in S3110 through S3112 of FIG. 31 are performed.

In the printing company, the processes in S3329 through S3332 of the image printing system are performed. In S3329 through S3332, the same processes as those in S3113 through S3116 of FIG. 31 are performed. Thus, a printed image is delivered to the address of the user of the terminal device 2*o* later.

Thus, by registering in advance a transmitting destination address being the transmitting destination of image data in the digital camera 1*o*, a signal including image data is wirelessly transmitted only to the transmitting address. By registering in advance the address of the digital camera whose signals are not desired to receive in the terminal device 2*o* as a refused camera address, the signals transmitted from the digital camera is refused to receive and signals transmitted from digital camera other than the digital camera are allowed to receive. Thus, only image data included in a signal that is allowed to receive is stored in the image storage unit 9.

As described above, according to the information system of the sixteenth preferred embodiment, a digital camera can transmit image data only to a specific terminal device, while a terminal device cannot receive image data transmitted from the specific digital camera. Thus, only image data included in the signal that is addressed to the terminal device and that is transmitted from a digital camera other than the specific digital camera can be targeted to print.

So far the present invention has been described in detail. However, the present invention is not limited to the above-described preferred embodiments and can also be improved and modified in various ways as long as the subject matter of the present invention is not deviated.

As described above, according to the present invention, image data obtained by shooting can be sent to a specific person, such as a person being an object or the like. An image represented by image data obtained by shooting can be easily requested to print.

What is claimed is:

1. An information terminal device for receiving signals transmitted by a camera device, comprising: information memory for storing information; a receiving unit for receiving signals wirelessly transmitted by the camera device; a transmitting unit for attaching information stored in the information memory to image data included in the signal received by the receiving unit and transmitting the image data with the information attached, to a prescribed address; and device information memory for storing device information for specifying the camera device, wherein when device information for specifying a transmitting source camera device of the signal included in a signal received by the receiving unit coincides with one piece of device information stored in the device information memory, the transmitting unit transmits the image data and the information, and when the device information does not coincide with any one piece of device information stored in the device information memory, the transmitting unit does not transmit the image data and the information.

2. The information terminal device according to claim 1, further comprising image memory for storing image data included in the signal received by the receiving unit, wherein the transmitting unit transmits the image data stored in the image memory and the information stored in the information memory.

3. The information terminal device according to claim 2, wherein the information memory stores personal information of a user, including information for specifying a user of the information terminal device, and the transmitting unit transmits image data received by the receiving unit or stored in the image memory and personal information stored in the information memory.

4. The information terminal device according to claim 3, further comprising an input unit for inputting at least one of a transmitting destination address of the image and the personal information, wherein the information memory stores at least one of the transmitting destination address and the personal information which are inputted by the input unit.

5. The information terminal device according to claim 4, further comprising a printing information setting unit for setting printing information about print setting of image data received by the receiving unit or stored in the image memory, wherein the transmitting unit transmits the image data, the printing information set for the image data by the printing information setting unit and the personal information stored in the information memory.

6. An information system including a camera device and an information terminal device, the camera device, comprising:

an imaging unit for imaging an object and obtaining image data;

a first transmitting unit for wirelessly transmitting a signal including the image data obtained by the imaging unit; and device information memory for storing device information for specifying the camera device, wherein the first transmitting unit transmits a signal including image data obtained by the imaging unit and device information stored in the device information memory, and the information terminal device, comprising:

information memory for storing information;

a receiving unit for receiving the signal wirelessly transmitted by the first transmitting unit of the camera device;

a second transmitting unit for attaching the information stored in the information memory to image data included in the signal received by the receiving unit and transmitting the image data with the information attached, to a prescribed address; and device information memory for storing device information for specifying the camera device, wherein when device information for specifying a transmitting source camera device of the signal included in a signal received by the receiving unit coincides with one piece of device information stored in the device information memory, the second transmitting unit transmits the image data and the information, and when the device information does not coincide with any one piece of device information stored in the device information memory, the transmitting unit does not transmit the image data and the information.

7. The information system according to claim 6, wherein the information terminal device further comprises image memory for storing image data included in the signal received by the receiving unit, and the second transmitting unit transmits image data stored in the image memory and information stored in the information memory.

8. The information system according to claim 7, wherein in the information terminal device, the information memory stores personal information of a user, including information for specifying the user of the information terminal device, and the second transmitting unit transmits image data received by the receiving unit or stored in the image memory and personal information stored in the information memory.

9. The information system according to claim 8, wherein the information terminal device further comprises an input unit for inputting at least one of a transmitting destination address of the image and the personal information, and the information memory stores at least one of the transmitting destination address and the personal information which are inputted by the input unit.

10. The information system according to claim 9, wherein the information terminal device further comprises a printing information setting unit for setting printing information about print setting of image data received by the receiving unit or stored in the image memory, and the second transmitting unit transmits the image data, the printing information set for the image data by the printing information setting unit and the personal information stored in the information memory.

11. A method by which an information terminal device receives image data transmitted by a camera device and processes the received image data, wherein the camera device stores device information for specifying the camera device in device information memory and transmits a signal including shot image data and the device information stored in the device information memory, and the information terminal device stores address and information in information memory, receives the signal transmitted by the camera device, and when device information for specifying a transmitting source camera device of the signal included in the received signal coincides with one piece of device information stored in advance in the information terminal device, attaches the information stored in the information memory to the received image data to transmit the image data with the information attached to a predetermined address, and when the device information does not coincide with any one piece of device information stored in advance in the information terminal device, does not transmit the image data.

12. The method according to claim 11, wherein
the information terminal device stores image data included in the received signal in image memory, attaches the information stored in the information memory to the image data stored in the image memory, and transmits the image data with the information attached.

13. The method according to claim 12, wherein
the information memory stores personal information of a user, including information for specifying a user of the information terminal device, and
the information terminal device transmits the received image data or the image data stored in the image memory and the personal information stored in the information memory.

14. The method according to claim 13, wherein
the information terminal device inputs at least one of the transmitting destination address of the image data and the personal information, and stores at least one of the inputted transmitting destination address and personal information in the information memory.

15. The method according to claim 14, wherein
the information terminal device sets printing information about print setting of the received image data or the image data stored in the image memory, and transmits the image data, the printing information set for the image data and the personal information stored in the information memory.

16. An information terminal device for receiving signals transmitted by a camera device, comprising:
information memory for storing information;
a receiving unit for receiving signals wirelessly transmitted by the camera device;
a transmitting unit for attaching information stored in the information memory to image data included in the signal received by the receiving unit and transmitting the image data with the information attached, to a prescribed address; and
device information memory for storing device information for specifying the camera device,
wherein when device information for specifying a transmitting source camera device of the signal included in a signal received by the receiving unit does not coincide with any one piece of device information stored in the device information memory, the transmitting unit transmits the image data and the information, and when the device information coincides with one piece of device information stored in the device information memory, the transmitting unit does not transmit the image data and the information.

17. An information system including a camera device and an information terminal device,
the camera device, comprising:
an imaging unit for imaging an object and obtaining image data;
a first transmitting unit for wirelessly transmitting a signal including the image data obtained by the imaging unit; and
device information memory for storing device information for specifying the camera device, wherein
the first transmitting unit transmits a signal including image data obtained by the imaging unit and device information stored in the device information memory, and the information terminal device, comprising:
information memory for storing information;
a receiving unit for receiving the signal wirelessly transmitted by the first transmitting unit of the camera device;
a second transmitting unit for attaching the information stored in the information memory to image data included in the signal received by the receiving unit and transmitting the image data with the information attached, to a prescribed address; and
device information memory for storing device information for specifying the camera device, wherein
when device information for specifying a transmitting source camera device of the signal included in a signal received by the receiving unit does not coincide with any one piece of device information stored in the device information memory, the second transmitting unit transmits the image data and the information, and when the device information coincides with one piece of device information stored in the device information memory, the transmitting unit does not transmit the image data and the information.

18. A method by which an information terminal device receives image data transmitted by a camera device and processes the received image data, wherein
the camera device stores device information for specifying the camera device in device information memory and transmits a signal including shot image data and the device information stored in the device information memory, and
the information terminal device stores address and information in information memory, receives the signal transmitted by the camera device, and when device information for specifying a transmitting source camera device of the signal included in the received signal does not coincide with any one piece of device information stored in advance in the information terminal device, attaches the information stored in the information memory to the received image data to transmit the image data with the information attached to a predetermined address, and when the device information coincide with one piece of device information stored in advance in the information terminal device, does not transmit the image data.

* * * * *